United States Patent [19]
Chatwani et al.

[11] Patent Number: 5,400,325
[45] Date of Patent: Mar. 21, 1995

[54] METHOD AND APPARATUS PROVIDING FOR HUNT GROUPS IN AN ATM NETWORK OF THE LIKE

[75] Inventors: Dilip Chatwani; Rajan Subramanian, both of Newark, Calif.

[73] Assignee: SynOptics Communications, Inc., Santa Clara, Calif.

[21] Appl. No.: 86,176

[22] Filed: Jun. 29, 1993

[51] Int. Cl.⁶ .......................................... H04L 12/56
[52] U.S. Cl. .................... 370/60.1; 395/500; 370/94.3
[58] Field of Search .............. 370/60, 60.1, 62, 68, 370/119, 94.3; 395/325, 500

[56] References Cited

U.S. PATENT DOCUMENTS

| | | | |
|---|---|---|---|
| 4,545,013 | 10/1985 | Lyon et al. | 364/200 |
| 4,644,532 | 2/1987 | George et al. | 370/94.1 |
| 4,827,411 | 5/1989 | Arrowood et al. | 364/200 |
| 5,038,343 | 8/1991 | Lebizay et al. | 370/60 |
| 5,049,873 | 9/1991 | Robins et al. | 340/825.06 |
| 5,101,348 | 3/1992 | Arrowood et al. | 395/200 |
| 5,280,610 | 1/1994 | Travis, Jr. et al. | 395/500 |
| 5,303,343 | 4/1994 | Ohya et al. | 395/500 |
| 5,307,491 | 4/1994 | Feriozi et al. | 395/500 |
| 5,309,434 | 5/1994 | Maekawa | 370/62 |

OTHER PUBLICATIONS

Ross Finlayson, "Bootstrap Loading Using TFTP", Networking Group Request for Comments: 906. Jun. 1984. pp. 1-4.
J. Postel, "User Datagram Protocal", RFC 768. Aug. 28, 1980. pp. 1-3.
K. R. Sollins, "The TFTP Protocol (Revision 2)", Network Working Group Request for Comments: 783. Jun. 1981. pp. 1-9.
W. Richard Stevens, "UNIX Network Programming", Prentice Hall 1990. pp. 466-472.
Martin de Prycker, "Asynchronous Transfer Mode: Solution for Broadband ISDN" 1991. pp. 55-124.
Rainer Handel and Manfred N. Huber, "Integrated Broadband Networks: An Introduction to ATM-Based Networks" 1991. pp. 84-91 and 113-136.
B. Croft et al. "Bootstrap Protocoal", Network Working Group, RFC 951, Sep. 1985, pp. 1-12.

*Primary Examiner*—Benedict V. Safourek
*Attorney, Agent, or Firm*—Blakely, Sokoloff, Taylor & Zafman

[57] ABSTRACT

An asynchronous transfer mode (ATM) network or the like providing for formation of resource hunt groups. The hunt groups are formed by devices of the same class (e.g., servers such as multicast servers) by devices registering with a central management supervisor (also referred to herein as a hunt group manager) through communication of hunt group registration requests over the virtual service path of the switches to which devices are attached. The central management supervisor communicates with an acknowledgement message back to the requesting device, again over the virtual service path. After formation of a hunt group, devices requiring the services of a device registered in the hunt group can communicate a request for establishment of a communication path to the central management supervisor. The central management supervisor then establishes a communication path with an available one of the devices in the hunt group.

21 Claims, 53 Drawing Sheets

METHOD AND APPARATUS PROVIDING FOR HUNT GROUPS IN AN ATM NETWORK OF THE LIKE

BACKGROUND OF THE INVENTION

1. Field of the Invention

The present invention relates to the field of computer networking. More specifically, the present invention relates to methods and apparatus providing for hunt groups for providing services to in a local area network or the like.

2. Description of the Related Art

The present invention relates to the field of ATM and similar networking systems. Such systems are characterized by use of high-speed switches which act to switch message cells of a fixed size and format through the network. Below is provided a general description of ATM networks

ATM Networks

The described embodiment is implemented in an asynchronous transfer mode (ATM) network. Such networks are well-known in the art and, in fact, are described in various references. One such reference is Handel, R. and Huber, M. N., *Integated Broadband Networks, an Introduction to ATM-based Networks*, published by Addison-Wesley Publishing Company, 1991 and hereinafter referred to as the Handel et al. reference. Another such reference is de Prycher, M., *Asynchronous Transfer Mode solution for broadband ISDN*, published by Ellis Horwood Limited, West Sussex, England, 1991.

Importantly, in ATM networks information is communicated in fixed-size cells which comprise a well-defined and size-limited header area and user information area. The switch fabric of an ATM switch is designed to act upon information in the header area in order to provide for routing of cells in the network. The switch fabric is normally implemented in hardware, for example using large-scale integrated circuits, in order to provide for high-speed switching of cells in the network.

Standards have been adopted for ATM networks, for example, by the International Telegraph and Telephone Consultative Committee (CCITT). The CCITT standards require a header area comprising a fixed set of fields and being of a fixed size and a payload area, also referred to as a user information area, and also of a fixed size but allowing user-defined information fields. The CCITY standards define the header to be of a very limited size to keep at a minimum overhead associated with each cell.

ATM Ceil Format

In an ATM network, all information to be transferred is packed into fixed-size slots which are commonly referred to as cells. Of course, such fixed-size slots may be referred to with other terminology, for example, packets. In one standard ATM format (CCITT Recommendation I.150, "B-ISDN ATM Functional Characteristics", Geneva, 1991), the format is generally shown in FIG. 1(a) and includes a 5-byte (also called octet) header field 101 and a 48-byte information field 102. The information field is defined by the standard to be available to the user and the header field is defined by the standard to carry information pertaining to ATM functionality, in particular, information for identification of the cells by means of a label. See, Handel et al., at pages 14-17.

The standardized format for the header field 101 is better shown in FIG. 1(b) and 1(c) and is described in greater detail with reference to Handel et al., at pages 84-91. The header field 101 will be discussed in greater detail below; however, it is worthwhile mentioning here that the header field 101 comprises two fields: (1) a virtual channel identifier (VCI) and (2) a virtual path identifier (VPI). The VPI field is defined as an eight-bit field in one format (see FIG. 1(b)) and as a twelve-bit field in another format (see FIG. 1(c)) and is defined to be used for routing of the cell. The VCI field is also used for routing in the defined format and is defined as a sixteen-bit field.

The de Prycher reference further describes the format of the ATM cell, for example at pages 55-124 and, especially at pages 106-108.

ATM Switching

Two primary tasks are accomplished by an ATM switch: (1) translation of VPI/VCI information and (2) transport of cells from the input port to the correct output port. The functions of an ATM switch are more fully described in Handel et al. at pages 113-136.

A switch is typically constructed of a plurality of switching elements which act together to transport a cell from the input of the switch to the correct output. Various types of switching elements are well-known such as matfix switching elements, central memory switching elements, bus-type switching elements, and ring-type switching elements. Each of these are discussed in greater detail in the Handel et al, reference and each carries out the above-mentioned two primary tasks.

Translation of the VPI/VCI information is important because in a standard ATM network the contents of these fields only has local meaning (i.e., the same data would be interpreted differently by each switch). Thus, the VPI/VCI information is translated by each switch and changed prior to the cell being output from the switch. This translation is accomplished through use of translation tables which are loaded into the switch fabric, generally under control of a switch controller.

ATM Service Providers

An ATM network typically includes at least one service provider whose function it is to provide various services to devices in the network. These services may include, for example, support of a meta-signalling channel specified by the CCITI standard (channel having a VPI:VCI value of 0:1) and supervisory and configuration management functions for internal operations of the devices and for reporting of status of the devices to the service provider.

The various devices (e.g., switches and clients) are interconnected in the network through external ports on the various switches. In the network, these external ports are the lowest addressable unit addressable by the service provider. Importantly, each of the various devices in the network must communicate with the service provider during operation of the network. The communication between the devices and the service provider may be viewed as system overhead and, although necessary, such overhead should be minimized. One area in which an overhead penalty may be paid is in set-up and tear down of communications links between the various devices and the service providers. Typically, it is required to set up at least one communication link per active port. Another area of significant resource overhead is the allocation of VPI/VCI translation table entries and bandwidth utilization on the physical links. For example, each time a communication link is set-up or torn down, translation tables in each switch involved in the communication link must be allocated and updated. Updating of the translation tables and other types of allocation overhead, of course, requires system resources which could be better spent on providing user communication in the network.

Topology Discovery

Topology discovery and, in fact, automatic topology discovery is known in the field of computer networking. For example, U.S. patent application Ser. No. 07/526,567 titled "Apparatus and Method for Monitoring the Status of a Local Area Network" filed May 21, 1990, hereinafter the '567 application, which application is assigned to the assignee of the present invention, describes an inventive automatic topology discovery system. Topology discovery relates generally to the area of obtaining information on devices (e.g., switches, hubs, repeaters, bridges, etc.) in a network and reporting the information in some form such as by display of a graphical representation of the network on a display device.

The following United States Patents are also understood to relate to the area of topology discovery:

| U. S. Pat. No. | Issue Date | Title |
| --- | --- | --- |
| 4,545,013 | 10/1/85 | Enhanced Communications Network Testing and Control System |
| 4,644,532 | 2/17/87 | Automatic Update of Topology in a Hybrid Network |
| 4,827,411 | 5/2/89 | Method of Maintaining a Topology Database |
| 5,049,873 | 9/17/91 | Communications Network State and Topology Manager |
| 5,101,348 | 3/31/92 | Method of Reducing the Amount of Information included in Topology Database Update Messages In a Data Communications Network |

Importantly; although each of these references relate to the area of topology discovery, the references do not approach the difficult issues raised by ATM networks when attempting to provide for topology discovery.

Certain prior art topology discovery methods utilize a process of flooding of topology information within the network. In such systems, each device transmits on each of its links link state information to each of its neighbors and each of its neighbors, in turn, transmit the message to each of its own neighbors. In this manner, eventually, the entire network topology can be computed at each device in the network. It will be readily seen that in such systems, the use of a flooding technique can lead to infinite loops, in the absence of some control. Further, even with such control, a large number of messages are generated.

In addition, certain prior art topology discovery methods require some intervention, knowledge or processing power on the part of the "neighbor" switches when topology information is advertised. Of course, this has obvious performance implications.

It is also noted that in certain prior art topology discovery methods, topology information is transmitted in the form of messages to, for example, a central management unit which is capable of receiving, storing and displaying the topology information. In such systems, the topology message may be altered, to include additional information on the transmission path, as it is transmitted from device to device until it finally reaches the central management unit. In such systems, the topology message length is dependent on the number of hops between the originally transmitting device and the central manager or on the number of nodes in the network or on the number of neighbor nodes. Of course, in systems, such as ATM systems, offering a limited message size per transmitted cell, this offers disadvantages.

Dynamic Client Discovery

Devices (e.g., computers, work stations, printers, facsimiles, telephones, modems, etc.) need a method of identifying other devices in the network. As a matter of terminology herein, such devices will generally be referred to as clients. A client may generally be referred to in one of two ways: (1) by what the client is, and (2) by where the client is. In identifying the client "by what it is", it is known to identify the client, for example, by a logical address or by a physical address. Examples of logical addresses are IP addresses, DECnet addresses, AppleTalk addresses, etc. Examples of hardware addresses are the ATM adapter card physical address or a hardware address on an Ethernet interface card. In identifying a client by "where it is", the client may be identified by where it attaches to the network, for example by the switch number and port number (in a multidomain network, the switch number may in fact comprise a domain number and a switch identifier.)

Importantly, in the "by where it is" approach, although relatively simple, a disadvantage is offered in that clients have to know about other clients in terms of a generally proprietary, location dependent, addressing scheme. In an ATM network, this may require preconfiguration of equipment at user's sites. In addition, if a client is moved from one switch/port to another, its address changes and this information must be conveyed to all of the other clients. This approach is, of course, time consuming and unduly restrictive.

Addressing based on a client's hardware address allows a client to move from one switch/port to another. However, some form of re-registration must occur after each move, such as with a central manager in order for other clients to be able to find the client after a move. Further, use of hardware addresses may not always be acceptable because different types of devices may have different formats of hardware addresses. Thus, interoperability is an issue.

Logical addresses supplied by the client may also present interoperability problems.

It might be noted that in certain prior art non-shared media, like a PBX, a telephone network, or the like, the location of a client is preconfigured. For example, a telephone number is allocated to a fixed location. In addition, callers must address each other using telephone numbers as the network assigned address.

In contrast, it is important in appreciating the described system to recognize that it will be advantageous to allow users to dynamically move devices from location to location in the network while still allowing communication with those devices over the network.

Formation of Client Hunt Groups

Prior art telephone systems have utilized a concept which is often referred to as "hunt groups" in which a single telephone number may be dialed by a user and the telephone system provides for access to devices (e.g., telephones, facsimile machines, etc.) at any of a number of telephone numbers or telephone extensions. For example, an office environment may have three facsimile machines due to the volume of facsimile messages received. However, it may wish to advertise only one facsimile number. In this case, a hunt group may be established where the first facsimile machine may be connected to a telephone line which is assigned the number 555-1111, a second telephone facsimile machine is connected to a telephone line which assigned the number 555-1112 and the third telephone facsimile machine is connected to a telephone line which is assigned the number 555-1113. In this case, the company may advertise, for example, the number 555-1111. If a caller dials 555-1111 and the first facsimile machine is busy, for example sending a facsimile message, the call is automatically routed to the next telephone number in the hunt group, e.g., 555-1112, and is therefore received by the second facsimile machine.

As one aspect of the described embodiment, use of hunt groups is extended to local area networks and, in particular, to ATM local area networks. Further, devices are able to address hunt groups based on logical addresses as well as network assigned physical addresses. Still further, prior art hunt group applications are understood to provide for relatively static set-up of hunt groups. As another aspect of the described system, devices may dynamically join and withdraw from hunt groups. These aspects of the described system will be described in greater detail below.

Bootstrapping

Many prior art networking systems require downloading of bootstrapping code prior to allowing a device in a network to become fully operational. For example, in certain prior art systems, the bootstrap code is downloaded from a neighbor switch. However, in such implementations, difficulties are presented if there are hardware or other incompatibilities between the bootstrapping switch and its neighbor.

Further, networking systems may be implemented in which a neighbor switch processes and forwards bootstrap requests and bootstrap code between the bootstrapping device and a boot server. However, difficulties exist in designing such systems at least in that there is requirement to provide for processing of the packets as they are passed through the neighbor and any intermediate nodes between the bootstrapping switch and the boot server.

In one aspect of the described embodiment, these difficulties are overcome in utilizing a method and apparatus that will be described in greater detail below.

It is worthwhile making of record the following papers which describe bootstrapping methods and related materials:

(1) *Bootstrapping Protocol*, Croft & Gilmore, September, 1985, RFC 951, Network Working Group, IEEE;

(2) *Bootstrap Loading Using TFTP*, Finlayson, June 1984, RFC 906, Network Working Group, IEEE; and (3) *The TFTP Protocol* (Version 2), Sollins, June 1981, RFC 783, Network Working Group, IEEE.

Virtual Service Paths

As will be described in greater detail below, the described embodiment takes advantage of use of virtual service paths in implementing its automatic topology discovery method and apparatus. Virtual service paths have been previously described in U.S. patent application Ser. No. 07/959,732 titled "Multiplexing of Communications Services on a Virtual Service Path in an ATM Network or the like" (the '732 application) which is assigned to the assignee of the present invention and of which this application is a continuation-in-part.

SUMMARY OF THE INVENTION

The present invention provides a method and apparatus for providing for formation of and communication with hunt groups in an ATM network or the like.

A set of devices, such as multicast servers, are grouped into a single hunt group through registration with a multicast server. The process of registering as a member of a hunt group is accomplished by a device communicating a registration request to a central management supervisor which then registers the device by storing information identifying the device as a member of the hunt group in a hunt group table. The central management supervisor then communicates a registration acknowledgement back to the device. The communication of the request and the acknowledgement occurs over the virtual service path of the switch to which the device is coupled.

Requests for establishment of a communication path with a device in the class are controlled by the central management supervisor. The central management supervisor receives a request for communication with a device in the class, determines which of the devices in the class are available and establishes a communications path with an available one of the devices in the class.

BRIEF DESCRIPTION OF THE DRAWINGS

FIGS. 22, 23(a), 23(b), 24 and 25 are useful for illustrating the concept of booting of switches in the described system with:

Figure 22:
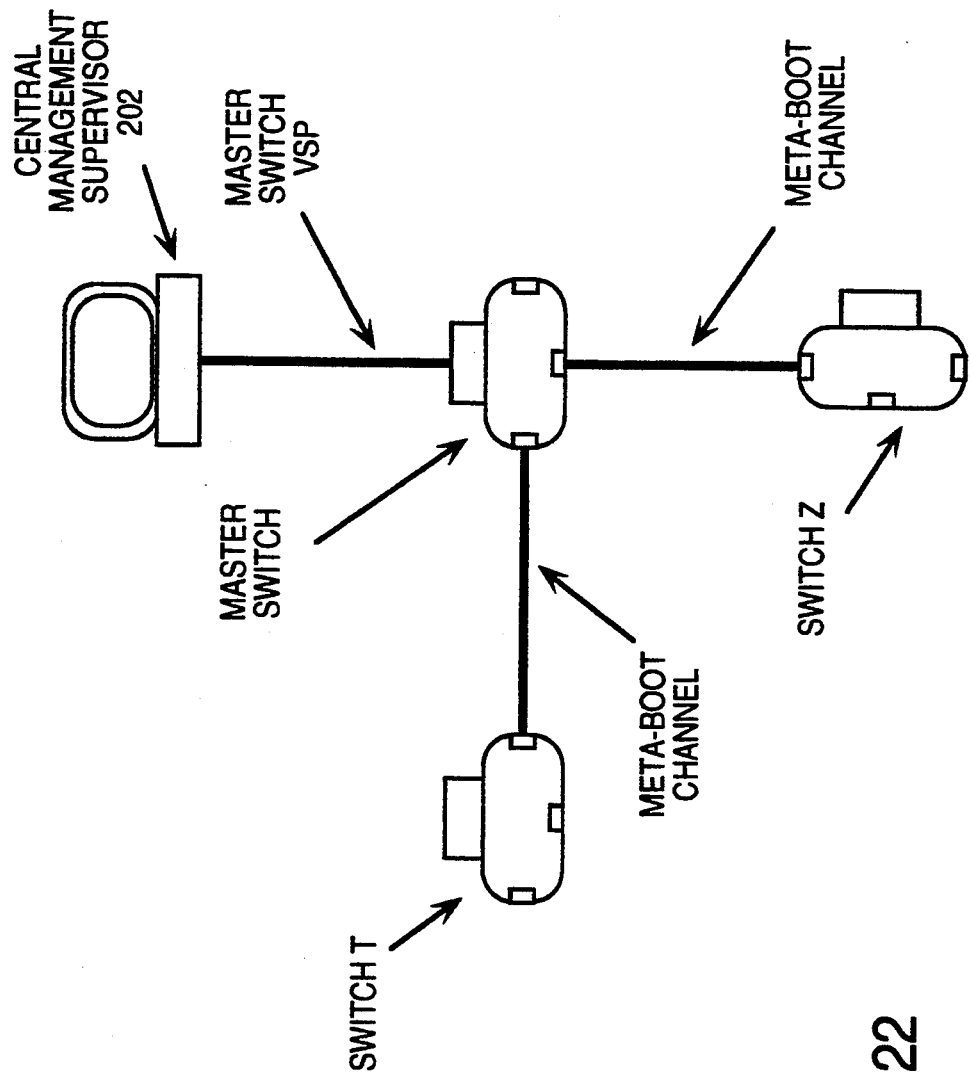
Figure 23A:
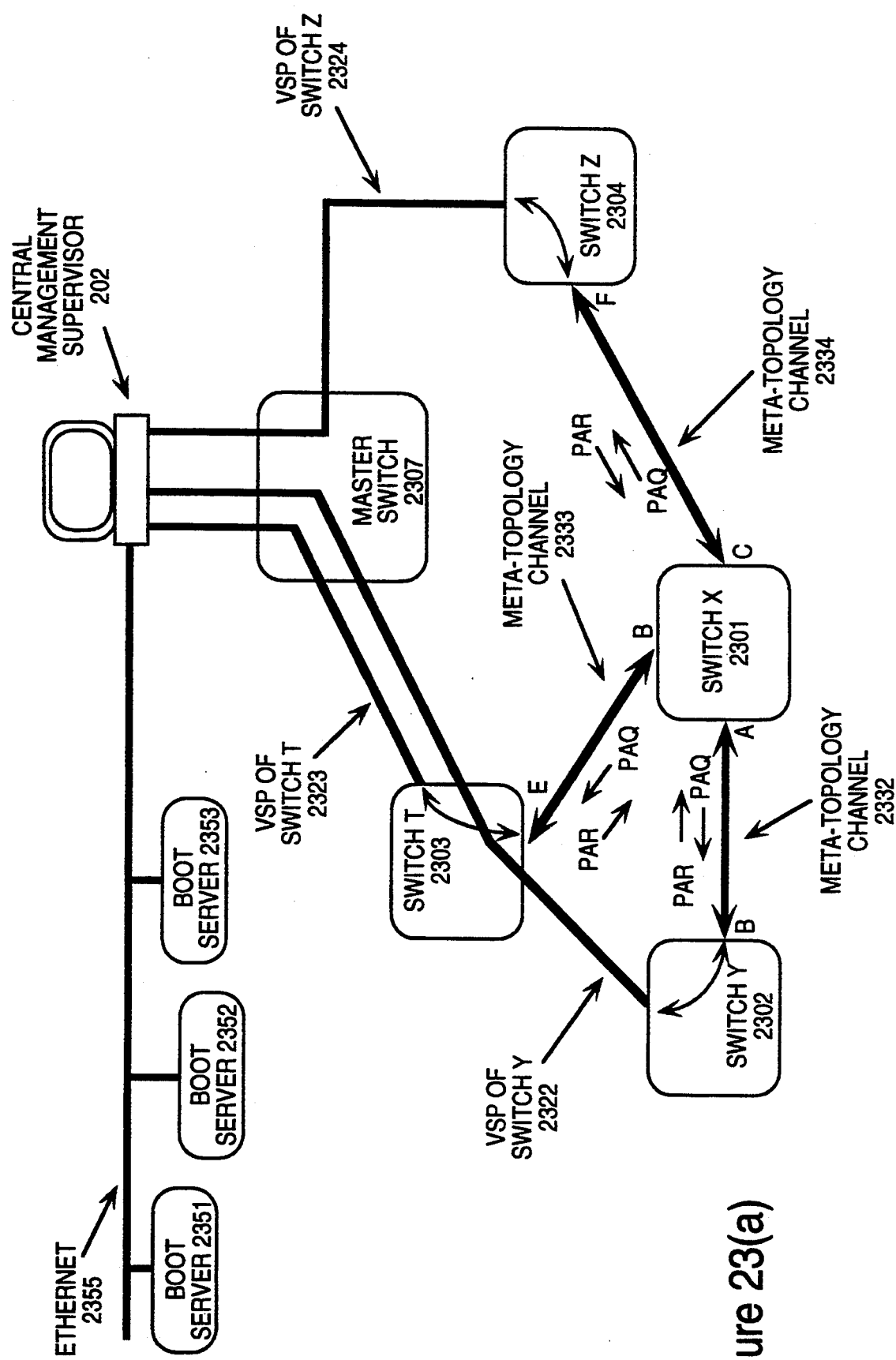
Figure 23B:
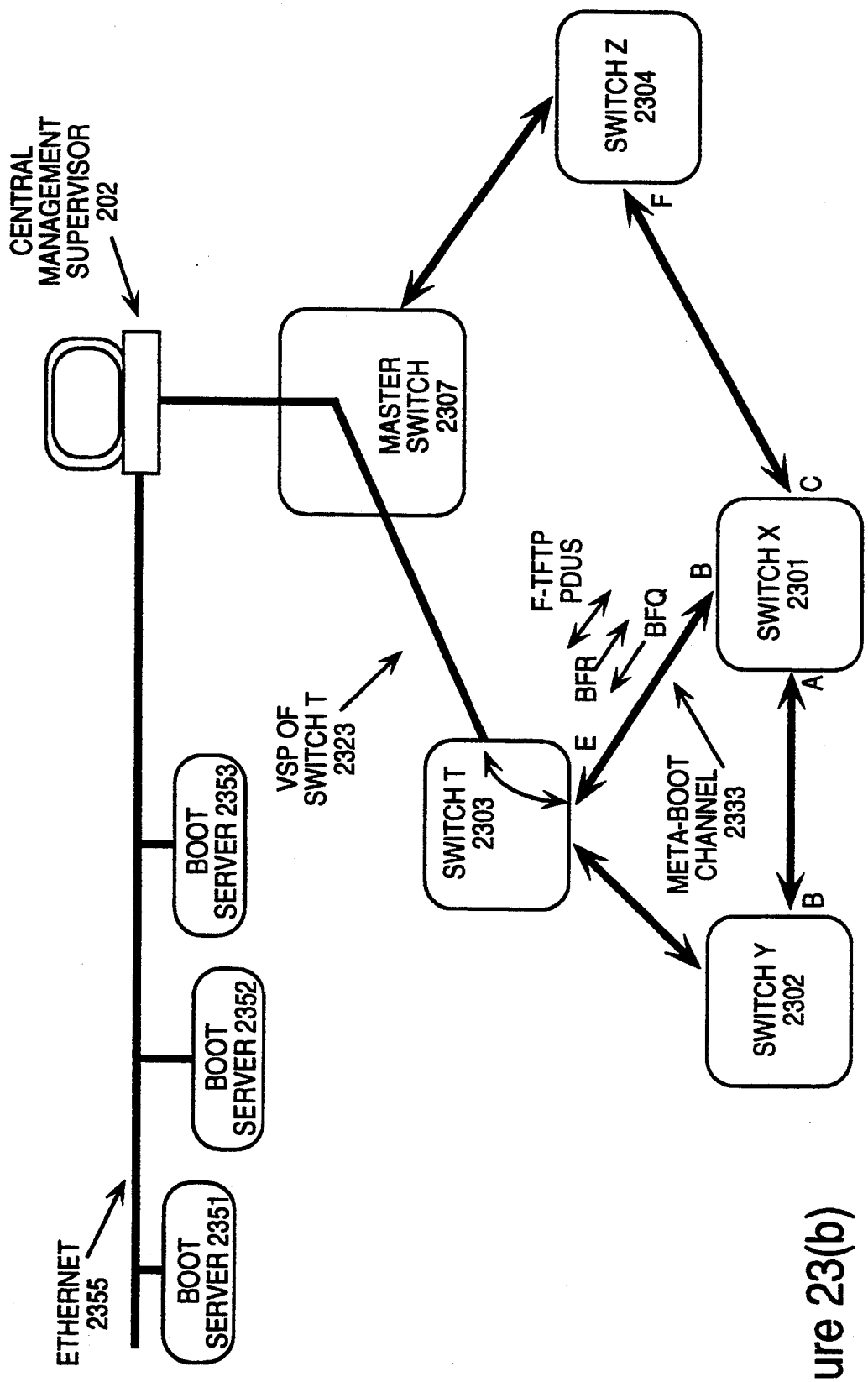
Figure 24:
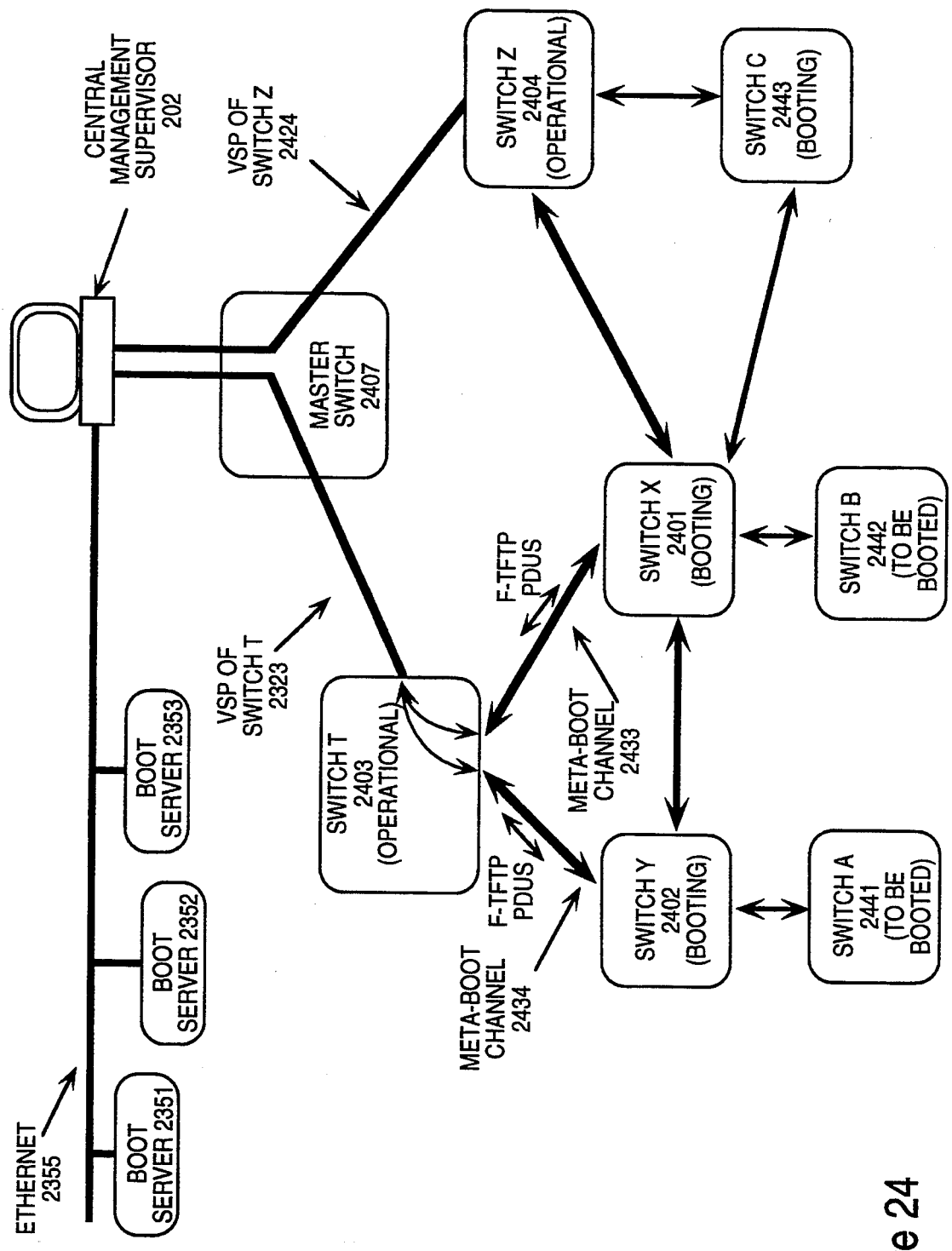
Figure 25:
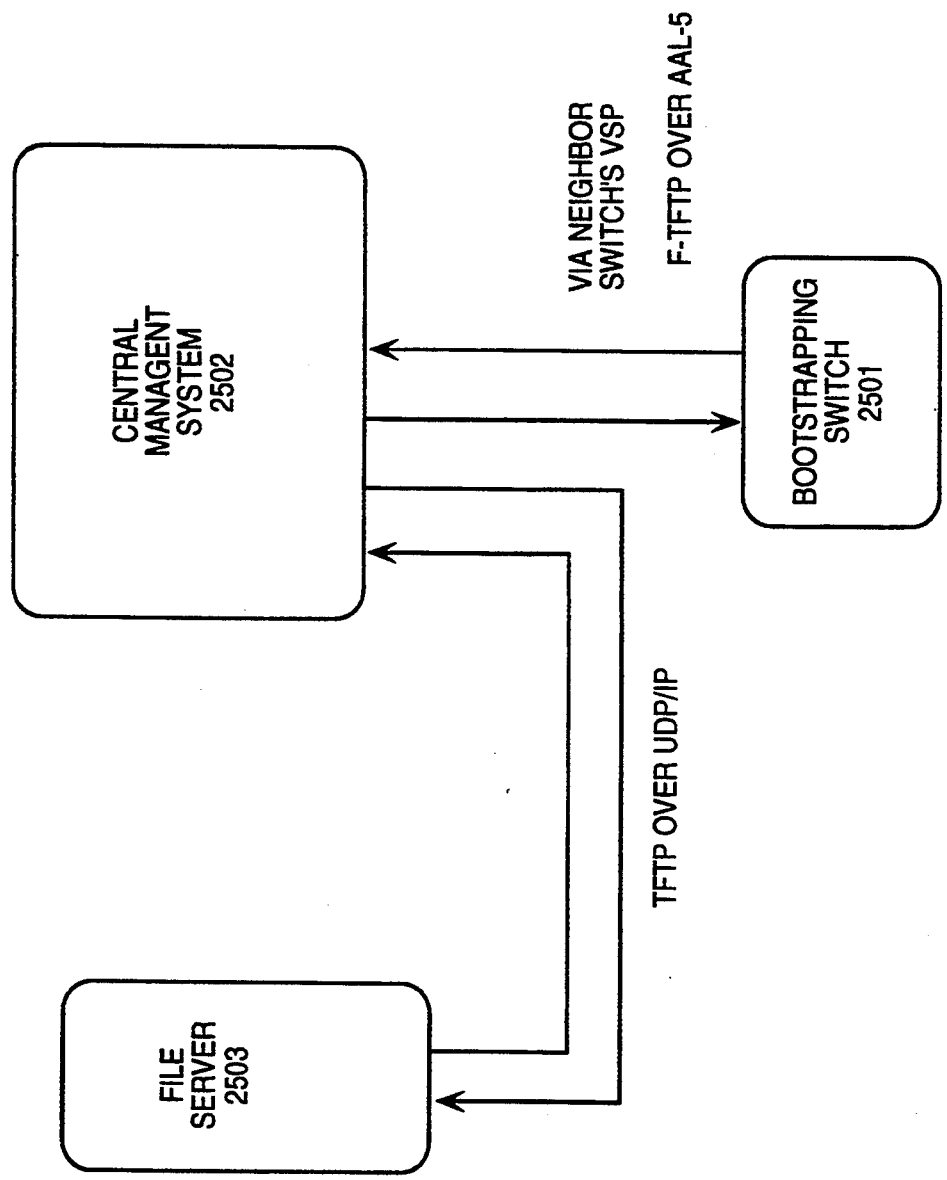

(a) FIG. 22 being useful for general illustration of the concept of booting over the meta-path channels (meta-topology and meta-boot) and the VSP of a neighbor, (b) FIG. 23(a) illustrating transmission of path access query (PAQ) messages and receipt of path access response (PAR) messages;

(c) FIG. 23(b) illustrating transmission of boot file query (BFQ) messages and receipt of boot file response (BFR) messages as well as transmission of boot code over the network;

(d) FIG. 24 illustrating the concept of concurrent booting of switches in the described system; and (e) FIG. 25 illustrating a network having a boot server coupled in communication with a central management system and a booting switch also coupled in communication with the central management system.

Figure 26:
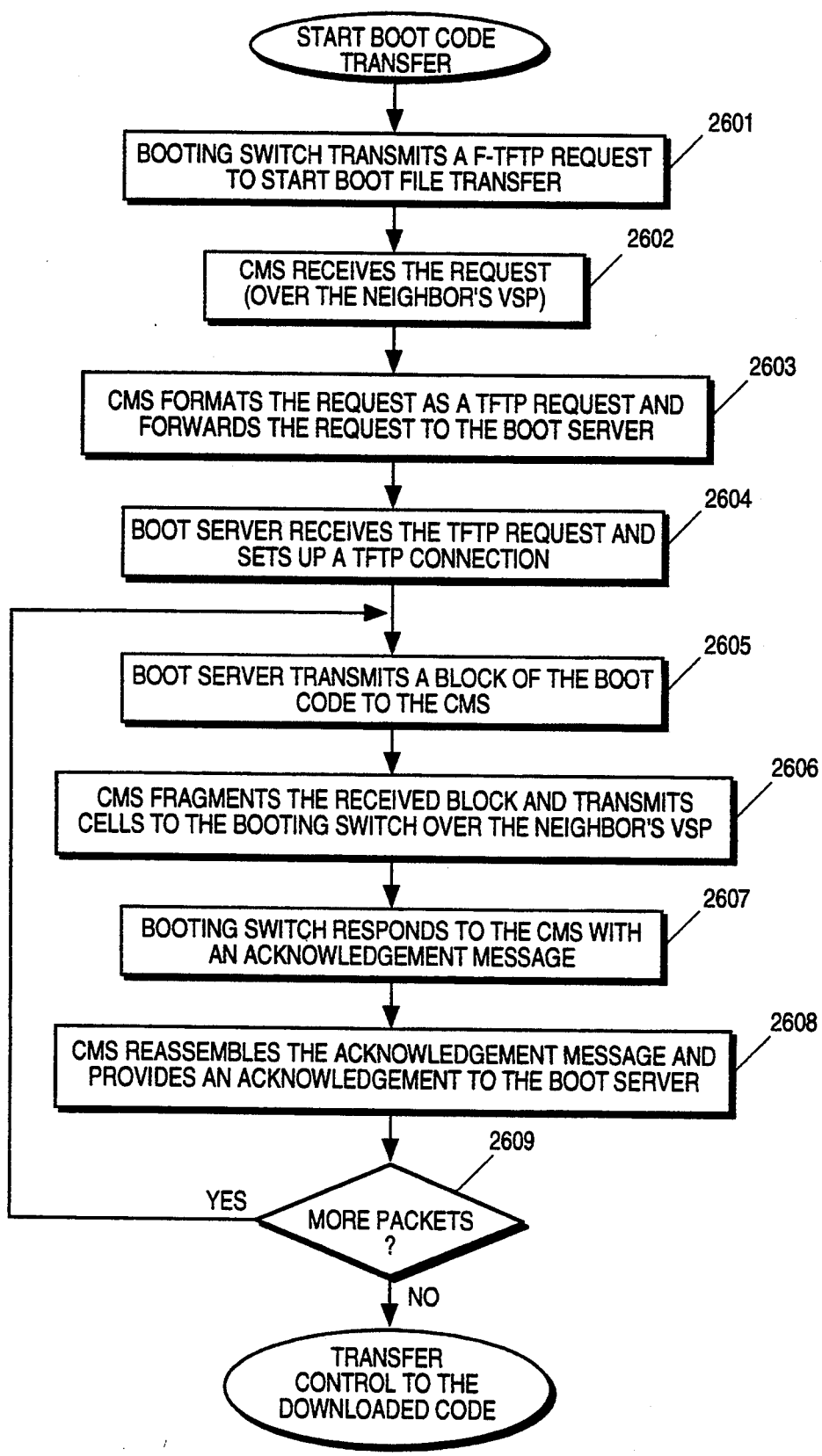

FIG. 26 illustrates a boot file transfer.

Figure 3A:
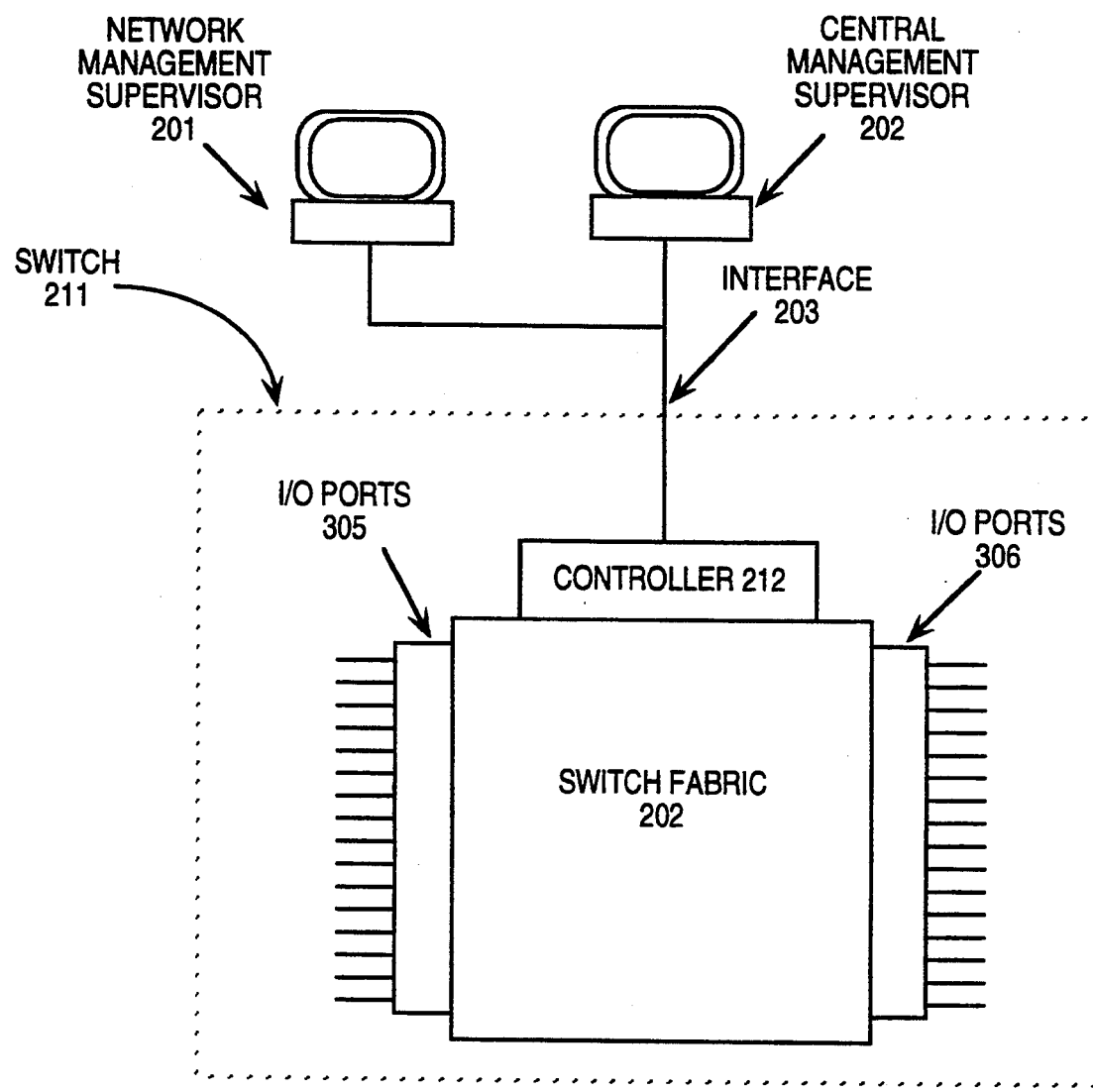
FIG. 3(a) is a diagram illustrating details of a switch as may be utilized by the described system.

For ease of reference, it might be pointed out that reference numerals in all of the accompanying drawings typically are in the form "drawing number" followed by two digits, xx; for example, reference numerals on FIG. 1 may be numbered 1xx; on FIG. 3, reference numerals may be numbered 3xx. In certain cases, a reference numeral may be introduced on one drawing and the same reference numeral may be utilized on other drawings to refer to the same item.

DETAILED DESCRIPTION

What is described herein is a method and apparatus for formation of client hunt groups in an ATM network or the like. In the following description, numerous specific details are set forth in order to provide a thorough understanding of the described system. It will be obvious, however, to one skilled in the art that the present invention may be practiced without these specific details. In other instances, well-known circuits, structures and techniques have not been shown in detail in order not to unnecessarily obscure the present invention.

I. OVERVIEW OF ATM NETWORKS

The described system relates to methods and apparatus multiplexing of communication services in an ATM network or the like. ATM networks are more fully described in, for example, de Prycher at pages 55–89 and, more specifically with reference to standards adopted by the International Telephone and Telegraph Consultative Committee (CCITT), at pages 97–124. Briefly, it should be understood that ATM is a telecommunication technique or transfer mode implemented to facilitate a broadband network such as the Broadband Integrated Services Digital Network (B-ISDN) in which cells of data are asynchronously transferred between two switching devices without the need to synchronize the clocks of the sender and the receiver packet.

Of course, alternatives to ATM networks have been proposed which employ principles similar to the principles employed by ATM networks. In general, when the term "ATM networks and the like" or the term "ATM Network" is used herein, such term may be thought of as covering networks having the basic characteristic of packet switching with minimal functionality in the network. More specifically, an ATM network may be thought of as a circuit-oriented, low-overhead concept of providing virtual channels which have no flow control or error recovery wherein communication in the virtual channels is accomplished with fixed-size (and relatively short) cells. The virtual channels provide the basis for both switching and for multiplexed transmission. Another important feature of an ATM network is the possibility to group several virtual channels into one so-called virtual path. ATM networks are perhaps better generally defined at Handel et al., pp. 14–17.

ATM has been the official name adopted by the CCITT for such a network. Asynchronous Time Division (ATD) and Fast Packet Switching are terms which have been employed to describe similar network transfer modes. These alternative networks are discussed in de Prycker at pages 55–56.

A. General Overview of an ATM Network

Figure 2:
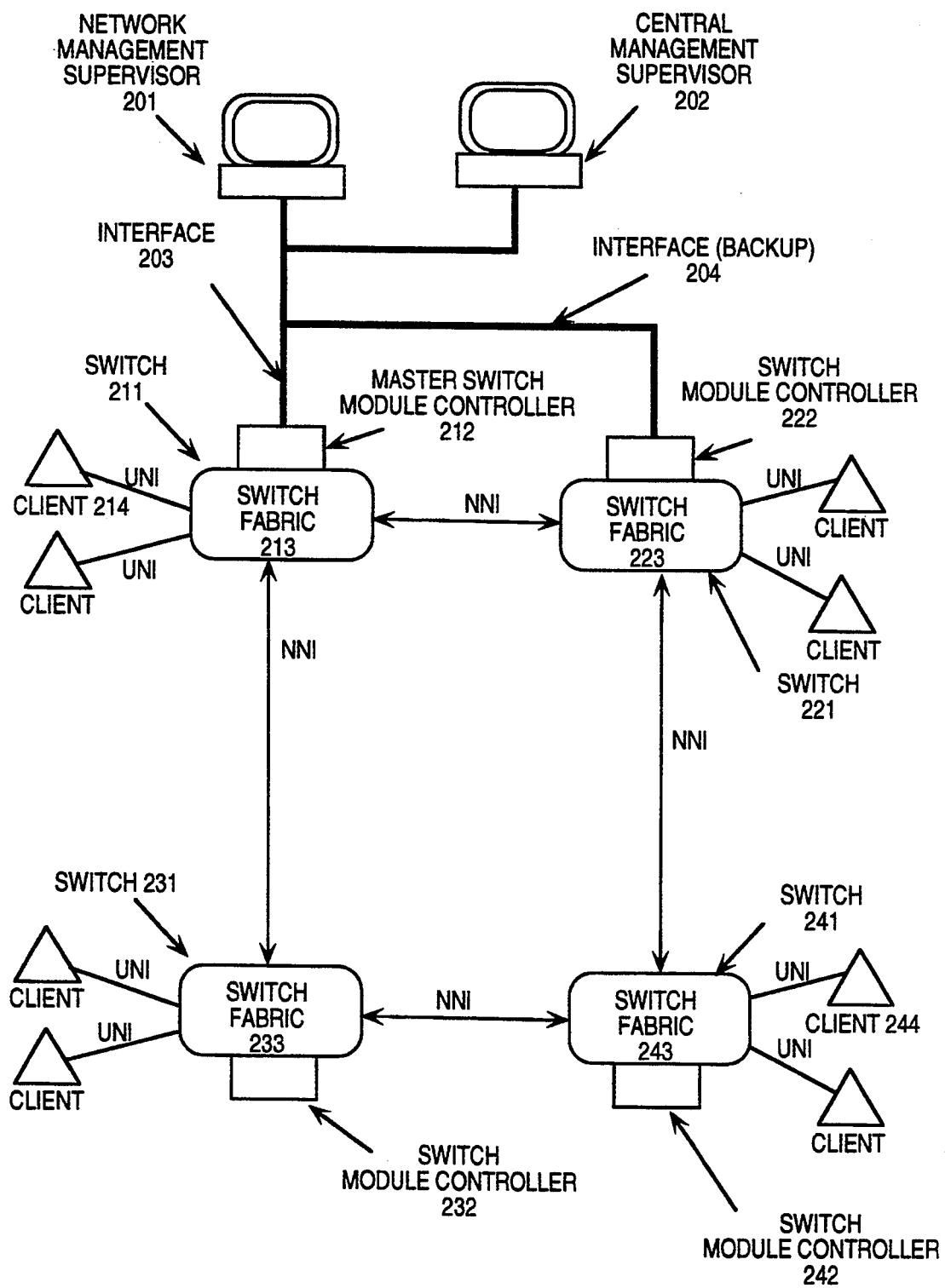
FIG. 2 is an overall diagram illustrating a network as may be implemented using the methods and apparatus of the described system.

It may now be useful to describe in greater detail a network implementing asynchronous transfer mode such as may be used by the described system. FIG. 2 is a diagram illustrative of a typical ATM network. The diagrammed network comprises 4 switches 211,221,221,231, and 241. These switches 211,221,231, and 241 may be of the type described below in connection with FIG. 3(a) including a plurality of bi-directional I/O ports 305, 306. The ports 305, 306 are used for interconnecting the switches 211,221,231 and 241 with each other as well as for interconnecting the switches 211, 221, 231 and 241 with various clients, such as client 214 and client 244. The physical links between the switches 211, 221, 231 and 241 are referred to as Network-Network Interface (NNI) links while the physical links between a switch and a client (such as between switch 211 and client 214) are referred to as User-Network Interface (UNI) links.

Thus, information may be transmitted from, for example, client 214 to client 244 by transmitting the information first from device 214 to switch 211 over the connecting UNI connection. (The information transmitted will be in the form of an ATM cell. ATM cells will be described in greater detail below.) The information will then be transmitted, for example, from switch 211 to switch 221 over the connecting NNI connection and then from switch 221 to switch 241 over the connecting NNI connection and, finally, from switch 24 1 to client 244 on the connecting UNI connection. Alternatively, the cell may be transmitted from switch 211 to switch 231 and then onto switch 241. This path may be chosen, for example, because the connection connecting switch 211 and switch 241 is busy or unavailable while the connection connecting switch 211 and switch 231 and the connection connecting switch 231 and 241 is available.

In an ATM network, the information is actually transmitted through the network in fixed-length cells through virtual paths/virtual channels which are set up to facilitate such communications. These fixed length cells are discussed herein in connection with FIGS. 1(a)-(c). The virtual paths may comprise a plurality of virtual channels. The use of virtual channels/virtual paths allows a large number of connections to be supported on a single physical communications link. Virtual Path/Virtual channels are generally allocated during set-up of a communication transmission between two devices (e.g., between two clients) and "torn down" after the communication has completed. For example, in an ATM network implemented to support telephone communications, virtual channels may be set up along the communications link between the caller and the called party at the time the call is placed and then torn down when the telephone conversation ends.

As will be seen, in the described system, use of virtual paths/virtual channels allows a large number of services to be supported on a plurality of ports, each on an individual virtual channel, inside a single virtual path which will be referred to herein as a virtual service path or VSP.

The process of setting up and tearing down a virtual path and/or virtual channel will be described in greater detail below-however, generally this process involves updating translation tables stored in the switch fabric of each switch involved with each virtual path/virtual channel link of the virtual path or virtual channel. In the described embodiment, table updates are transmitted from the supervisor 202 to each involved switch controller over a virtual service channel and the switch controllers attend to controlling of the updates to the switch fabric of their switches.

Thus, in our example of FIG. 2, one virtual path link may exist from client 214 to switch 211; another virtual path link may exist from switch 211 to switch 221, and so forth. Each of these virtual path links may comprise a plurality of virtual channels-for example, one virtual channel may be set up on each of the various virtual path links between client 214 and client 244 to allow communication of multiple cells which make up the information to be communicated from client 214 to client 244. The various virtual channels (and the virtual path links) set up for this communication may then be torn down after the complete message (comprising any number of cells) has been transmitted.

Importantly, set up and tear down of the various virtual path links and virtual channels requires some form of control. In the described system, overall control of the network is provided by a central management supervisor 202 whose function will be described in greater detail below. In addition, each switch comprises a controller, such as controllers 212, 222, 232 and 242 to allow for local control of each individual switch. These controllers will also be described in greater detail below. It is noted that, although the invention as described herein implements the functions of the central management supervisor 202 in a separate computer hardware device, these functions may be alternatively implemented in one of the switch module controllers (e.g., the master switch module controller 211 discussed below), or in the network management supervisor hardware 201.

One switch module controller is used as an overall master controller 212 and controls communication with the central management supervisor 202 while the remaining module controllers 222, 232, and 242 communicate with the supervisor 202 through the master controller 212. The master controller 212 is coupled, in the described system, with the supervisor 202, over an interface 203. A backup interface 204 may be provided to connect an alternate controller, such as controller 222 to the supervisor 202 which allows for redundant communication with the supervisor 202.

In one embodiment of the described system, interface 203 is provided as an Ethernet interface; however, it is obvious to one skilled in the art that the interface with the master controller 212 could be implemented in other ways, for example, as an UNI or NNI link. In fact, implementation of the interface 203 as a UNI link is expected to offer advantages over use of an Ethernet interface. In an embodiment utilizing a UNI link, the interface 203 may be coupled through one of the ports 305, 306 of the switch to the CMS 202 rather than through the master switch module controller 212.

In the preferred system, a network management station 201 may also exist on the interface 203 to provide network management functions such as performance monitoring, configuration management, and diagnostic and fault detection information.

It is noted that a typical switch in the described system comprises 16 input/output ports 305, 306; although it will be obvious to one of ordinary skill that the total number of ports supported by a switch may vary from implementation to implementation and such variance should not be considered a departure from the present invention.

In addition, each switch comprises switch fabric, such as switch fabric 213, 223, 233 and 243. Switch fabric is well described with reference to both the Handel et al. and the (de Prycher et al. references.

B. The Central Management Supervisor 202

In the described system, a single central management supervisor 202 provides management and services for a multi-switch network. As has been discussed, an ATM-network is a "connection-oriented" network. The supervisor 202 provides for central management of calls, connection resources, point-to-point or multi-point routing, topology, and fault-recovery. Importantly, in the described system, all communication and connectivity of the switched network is centrally managed by the supervisor 202.

In the presently preferred system, the central management supervisor 202 is implemented as a process running on a Sun Sparc 2 or an IPX workstation. It is, of course, possible to run the supervisor 202 on a workstation concurrently with other processes. For example, it may be desirable to run processes implementing the functions of the network management system 201 on the same workstation, thus eliminating the expense of hardware for one workstation.

The supervisor 202 provides a number of services to devices, such as switches and clients, in the network. For example, the supervisor 202 of the described system provides various services such as:

(1) supervisory services allowing a switch module controller to communicate with the supervisor 202 regarding network supervisory and control functions such as allowing reporting of status information to the network management system 201 and updating the switch fabric translation tables;

(2) signalling services allowing each client to communicate with the supervisor 202 to establish user-to-user connectivity (e.g., call set-up and tear-down). For example, network clients, such as client 214, can request the supervisor 202 to set-up and tear down virtual paths/virtual channels over a signalling channel. The supervisor 202 ensures the proper resources are available to support the data transfer. The supervisor then notifies each intermediate switch to update broadcast and translation tables in the switch to allow for proper switching of cells transmitted by the client; and (3) boot services allowing a controller to download software from the supervisor 202 or from a boot file server.

C. The Master Switch Module Controller 212 and Switch Module Controllers 222, 232, and 242

As has been discussed, each switch, such as switch 211, comprises a switch fabric, such as switch fabric 213, and a controller such as controller 212. Switching of cells through the ATM network is accomplished based on translation and broadcast tables loaded into the switch fabric through the controller 212 and based on virtual path identifiers (VPI) and virtual channel identifiers (VCI) in each ATM cell header. The tables are updated under control of the supervisor 202. Use of VPI/VCI information and translation/broadcast tables for accomplishing cell switching and point-to-point or multi-point communications will be well understood, for example, with reference to either Handel et at, or de Prycher et A fundamental responsibility of a switch controller, such as controller 212, is to update the translation and broadcast tables in the switch fabric based on configuration management decisions made and communicated by the supervisor 202. Using the centralized supervisory approach of the described system, each switch controller does not need to be aware of the overall network configuration and topology. Each controller 212 is also responsible for other control, monitoring and diagnostic functions for its switch.

As has been stated, in addition to its responsibility for management of its own switch, in the described system, one controller acts as a master controller and interfaces directly with the supervisor 202 over an interface 203. The controllers begin communications with the supervisor 202 through a bootstrap process. The master controller 212 is bootstrapped first and the remaining controllers 222, 232, and 242 are bootstrapped in a cascaded order. Communications between the various controllers is perforated through use of ATM cells over virtual paths/virtual channels while communication between the master controller 212 and the supervisor is interface 203.

D. The ATM Cell as Defined by the CCITT

Figure 1A:
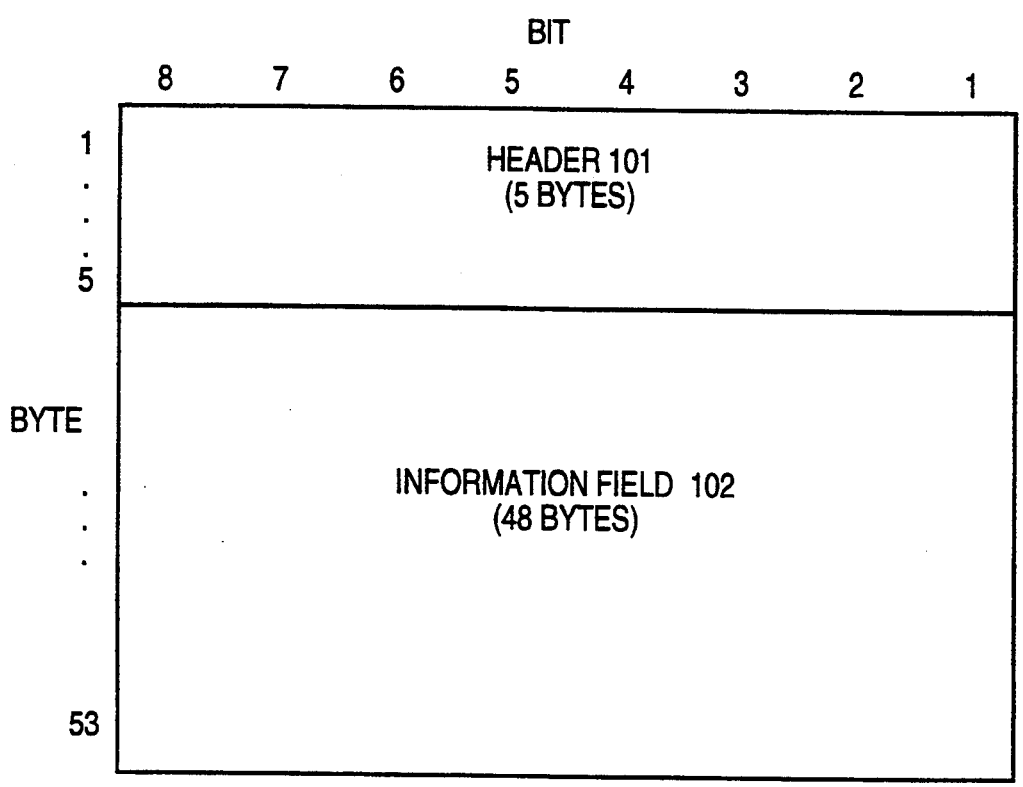
FIGS. 1(a), (b) and (c) are diagrams illustrating the format of an ATM cell as may be utilized in the described system.

It may be worthwhile to briefly describe the basic cell structure of an ATM cell as defined by the CCITT and as used by the described system. Such a cell structure is illustrated by FIG. 1(a) and includes a fixed-size header area 101 and a fixed-size information field or payload area 102. The header area 101 is defined to include 5 8-bit bytes while the information field 102 is defined to include 48 8-bit bytes for a total of 53 8-bit bytes per cell. The information field 102 is available for user information while the header field is well-defined by the CCITT standard and includes necessary overhead dam. In fact, two header definitions are set forth by the CCITT standard and these header definitions are described in connection with FIG. 1(b) and FIG. 1(c). The first header definition is used at the B-ISDN user-network interface and the second header definition is used at the B-ISDN network-node interface. The two formats only differ in the first byte.

Figure 1B:
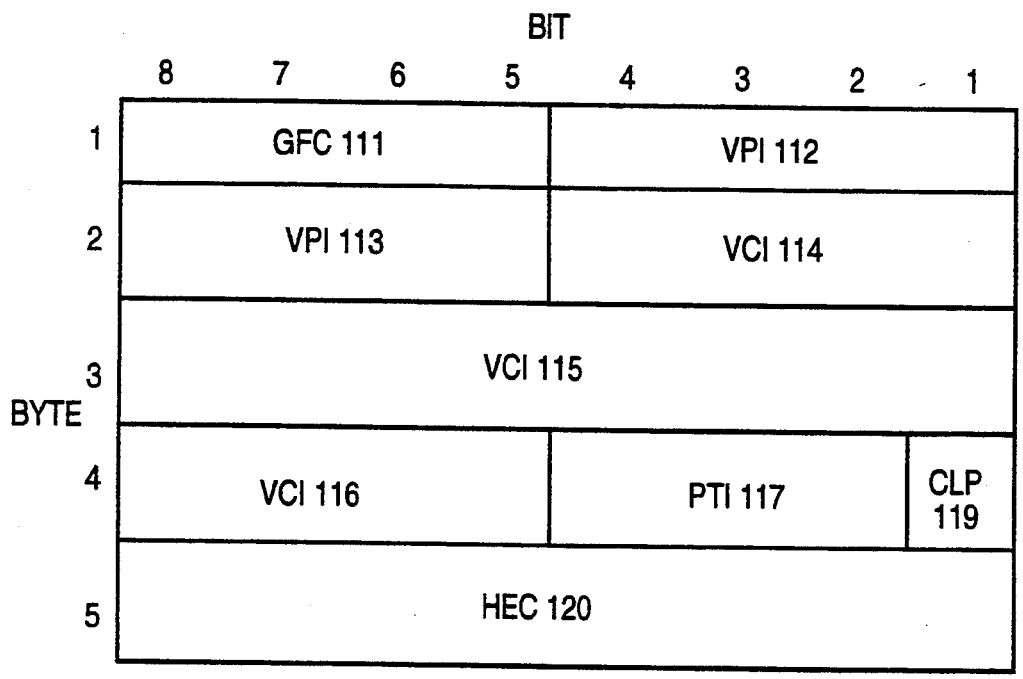

FIG. 1(b) illustrates an ATM cell header for a B-ISDN user-network interface. Field 111 is a 4-bit field used for generic flow control (GFC) which assists in control of traffic flow from ATM connections at the user-network interface. ATM networks do not provide for flow control of the type which is implemented in some packet networks and ATM networks have no facility to store cells over a long period of time. Therefore, inside an ATM network there is no need for generic flow control. Thus, in the header definition of FIG. 1(c), there is not GFC field and the virtual path identifier field 112 is expanded to use the bits made available by elimination of the GFC field 111.

Figure 1C:
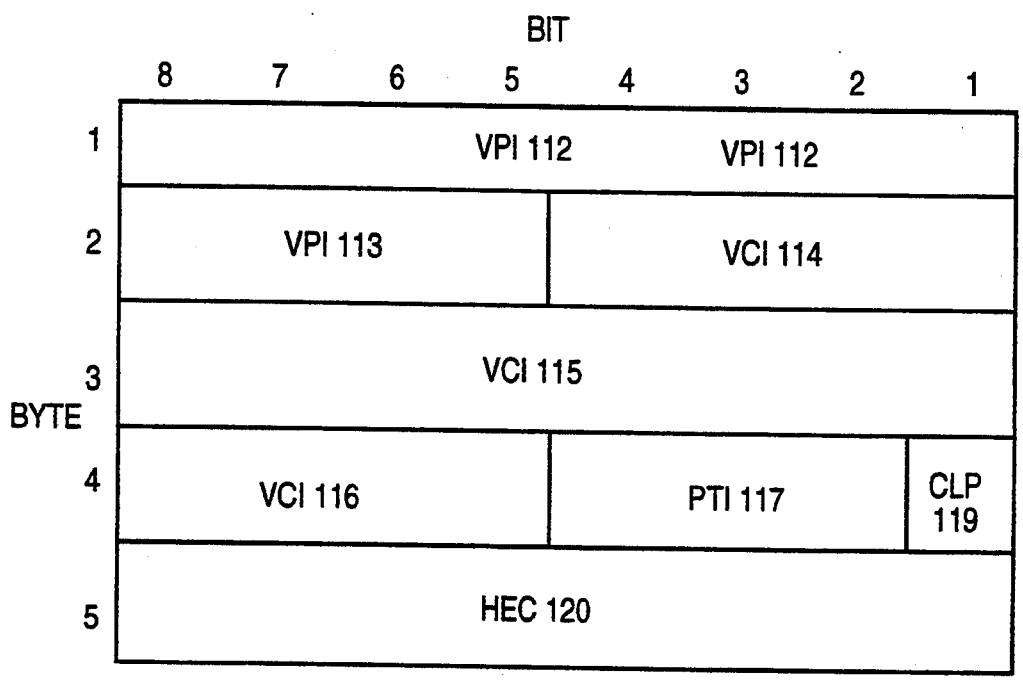

The virtual path identifier (VPI) comprises either 8-bits, in the case of user-network interface headers, or 12-bits, in the case of node-network interface headers. As illustrated in FIGS. 1(b) and 1(c), the 8- and 12-bits respectively are broken down in a first field 112 of either 4- or 8-bits in the first byte of the header and the high order 4-bits in a second field 113 of the second byte of the header. The VPI field identifies a virtual path for routing the cell through the network.

The virtual channel identifier (VCI) comprises 16-bits broken down in three fields, a first field 114 being the low order 4-bits in the second byte of the header, a second field 115 being the 8-bit third byte of the header, and a third field 116 being the high order 4-bits in the fourth byte of the field. The VCI identifies the virtual channel for routing of the cell. Certain values have been defined by the CCITT standard, including use of the value 0000 0000 0000 0010$_2$ (i.e., $2_{10}$), to indicate the cell is a broadcast cell.

Bits 2–4 of the fourth byte of the header comprise the payload type (PTI) field 117 which indicates whether the cell contains user or network management related information.

Bit 1 of the fourth byte is the cell loss priority (CLP) field 119. If the value of the field is 1, the cell is subject to discard, depending on network conditions. If the value of the field is 0, the cell has high priority and, therefore, sufficient network resources have to be allocated to it.

Finally, the header error control field 120 takes the entire fifth byte of the header. It contains the header error control sequence to be processed by the physical layer of the network and is specified in CCITT Recommendation 1.432.

As can be appreciated, header functionality has been kept to a minimum by the standard in order to provide for fast processing in the network. The main functions of the header are identification of the virtual connection and certain maintenance functions. By keeping these functions to a minimum, header processing in the ATM nodes is simple and can be done at very high speeds.

II. MULTIPLEXING/DEMULTIPLEXING OF SERVICES ON A VIRTUAL SERVICE PATH

The described system provides for multiplexing of services on what is termed herein a "virtual service path" or VSP. This may sometimes also be referred to as a "virtual control path" or VCP. The described systems use of virtual service paths provides for a number of advantages including (1) the ability to multiplex/-demultiplex a number of services originating from various external I/O ports or from within the switch module controller over a single virtual path (for each switch) which reduces system overhead and set-up times; (2) providing for a single set-up of all virtual service channels within the virtual service path thus avoiding the need for additional set-up and tear down overhead; and (3) the ability to logically organize and view the network, from the standpoint of the supervisor 202, as a star configured network.

A. Meta channels

In the described system, at the time a switch is booted, the switch preconfigures certain "meta-channels" for each of the 16 ports on the switch. It is noted that, dependent on the device attached to the port, all of these meta-channels may not be used by each channel. However, for reasons of efficiency and simplicity in booting, the preferred system provides for pre-configuring each of the meta-channels for each of the ports. This is illustrated with reference to FIG. 3(b) which shows the switch 201 and illustrates the meta-channels of one of the ports in detail. Of course, as just described, it will be understood that the other ports are similarly configured with meta-channels. The preconfigured meta-channels comprise a meta-signalling channels 321, a meta-boot channel 322, a meta-topology channel 323 and a meta-supervisory channel 324. It is noted that, preferably, the meta-supervisory channel exists on an integral port between the switch module controller (such as controller 222) and the switch fabric (such as fabric 223) and not on the external ports.

Each of these channels are configured to be on VPI=0 and are assigned virtual channel identifiers (VCIs) as shown in Table I below. The switch 201, and more particularly the switch fabric 202, is responsible for translation, through use of translation tables, of the VCIs of the meta-channels to VCIs of a particular virtual service path (VSP).

Translation of VCIs received from devices attached to ports of the switch will now be described. Translation of cells received from the CMS by the switch will be described in greater detail below. As has been stated, all meta-channels are preconfigured to be on VPI=0. The meta-channel information is convened to VCI information on the VSP by converting the meta-channel VCI information to service type information for inclusion in the VCI of the VSP. The service types and type numbers of the VSP of the preferred system are given in Table I. This translation process will further include port identifier information in the VCI of the VSP. A better understanding of the format of the VCI of the VSP is gained with reference to FIG. 7(b) which illustrates the VCI field is comprised of two parts: (1) a service type 704 and (2) a port ID 705. Thus, the translated channel number is placed in the service type field 704 and the port number on which the cell was received by switch 201 is placed in the port ID field 705. For example, a cell received by switch 201 from a device on port 5 with topology information will be received on VCI=220 and, by convention, on VPI=0 (as stated earlier, by convention, all meta-signal channels are pre-configured on VPI=0). This is referred to in Table I as 0:220. This VCI/port information will be translated on the outgoing VSP to include, in service type field 704, the value 2 and in port D field 705, the value 5. Thus, when this cell is finally received by the CMS (having been multiplexed on the VSP), the CMS will be able to identify the service type and port number of the request.

TABLE 1

| Meta channel | VPI:VCI | VSP Service Channel | Number |
|---|---|---|---|
| Meta-signalling | 0:1 | Signalling service channel | 0 |
| Meta-boot | 0:200 | Boot service channel | 1 |
| Meta-topology | 0:220 | Topology service channel | 2 |
| Meta-supervisory | 0:240 | Supervisory service channel | 3 |

It is noted that the VPI:VCI for the meta-signalling channel is defined by the CCITT standards; the remaining meta-channel VPI:VCI numbers were assigned to be high enough values to avoid future conflict with definitions that may be given by the various standards.

As stated above, translation also occurs when cells are returned to switch 201 from the CMS. In the case of cells being returned from the CMS to the VSP input port (e.g., as illustrated by FIG. 5(b)), translation occurs for 49 channels in the current implementation of the described system (3 meta service channels, i.e., meta signalling, meta-topology, and meta-boot, per port for each of the 16 ports plus 1 meta-supervisory channel for an internal port to allow communication with the switch controller, e.g., controller 212). The VCIs are assigned according to a formula as follows:

$$VCI = (service\ type\ number * 16) + port\#$$

The service type numbers are given in Table I under the column labeled "Number". The constant 16 is used as a multiplier because there are 16 ports supported in each switch of the current embodiment. Of course, in alternative embodiments supporting a different number of ports, the constant utilized in this formula would be varied. As examples of the VCI calculation, topology service channel data intended for port 3 is addressed on VCI 35 (i.e., (2 * 16)+3); boot service channel data intended for port 7 is addressed on VCI 23 (i.e., (1 * 16)+7).

B. Virtual Service Path and Service Channels

Figure 4A:
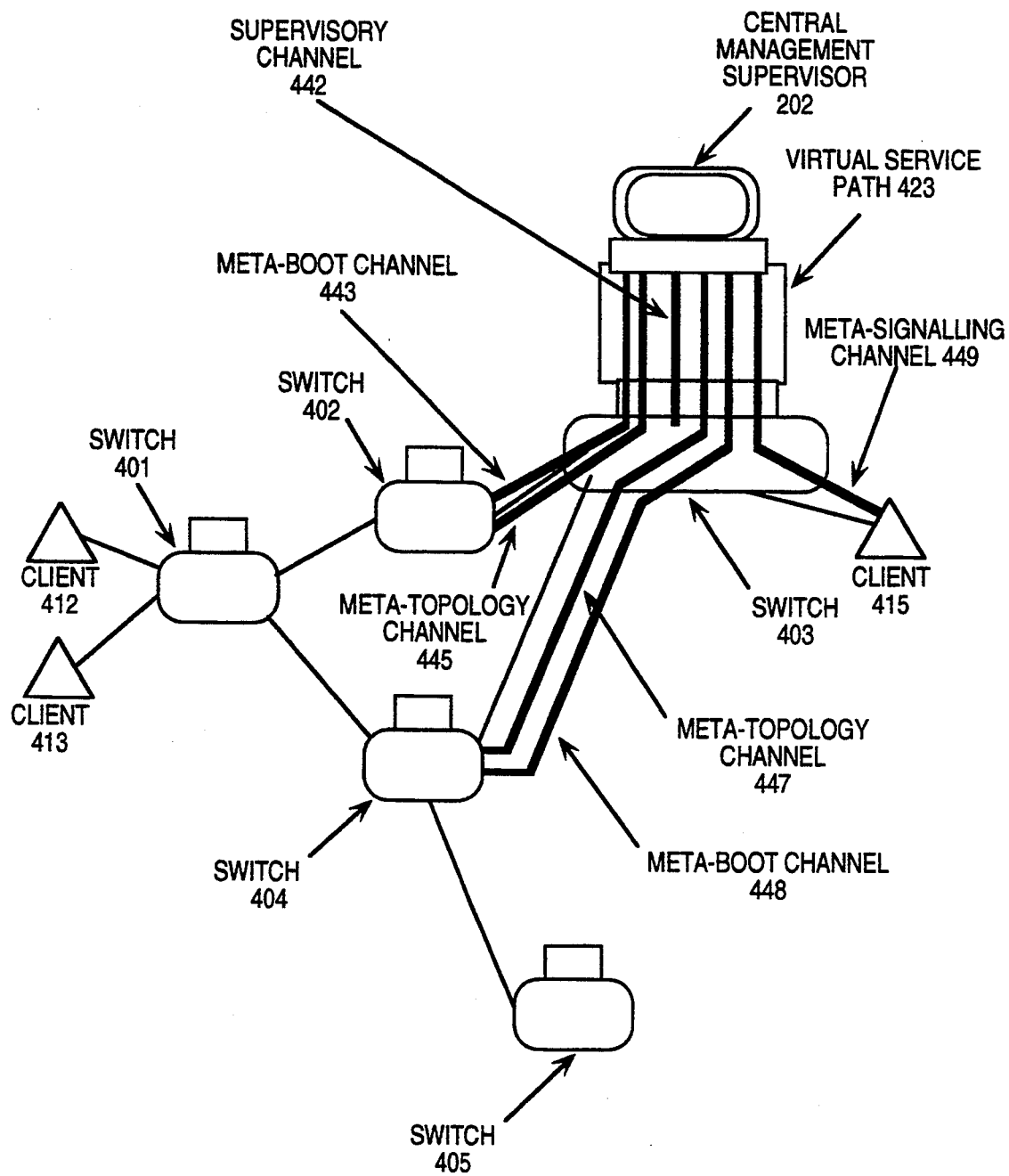
FIG. 4(a) is a diagram illustrating a network as may be implemented in accordance with the described system including details on a virtual service path of the described system.

Having now described the concept of conversion of meta-channel/port information to service type/port ID information for the VSP, it is useful to further discuss the concept of virtual service paths with reference to FIG. 4(a). FIG. 4(a) illustrates a network having a supervisor 202 which is coupled through a master switch module controller to a switch 403. A first virtual service path 423 is illustrated coupling the supervisor 202 with the master switch module. The VSP 423 provides illustration of the various channels which exist within each VSP of the system of the described system. In particular, the channels comprise:

1) a supervisory channel 442 which provides for communication of the supervisory functions discussed above;
2) a signalling channel 449 which provides for the signalling functions between the supervisor 202 and client 415 (in practice as discussed above, a plurality of signalling channels may be provided one for each client coupled with the switch 403. The various signalling channels are further identified by including port ID information in field 705.);
3) topology channels 445,447 which allow each "neighbor" controller to provide connectivity and topology information to the supervisor 202 (a virtual service path may have multiple topology channels depending on the number of ports on the controller); and
4) boot channels 443,448 which allow neighboring controllers to download boot software as was described above (a virtual service path may have multiple boot channels depending on the number of ports on the controller).

In the described embodiment, the boot channels, topology channels and signalling channels are preconfigured at the time of manufacture of the switch with one of each of these meta-channels being configured for each output port. It may be, for example, that certain of these preconfigured meta-channels on certain ports may not be used (such as the meta-boot channel if the port is used as a UNI port). Each of the above-identified channels are identified with a channel number as described above in connection with Table I. Significantly and, of importance to the described system, the channels are all multiplexed over a single virtual service path for each controller. Importantly, once the channel is set-up it is generally maintained and not torn down even though a particular communication may have completed. In this way, overhead for channel set-up and tear down time is reduced in the system. Of course, as a result, certain overhead is incurred to maintain the channels (and also to maintain the virtual service path) such as table space in translation tables. However, it is felt that in a typical network configuration, the overhead tradeoffs favor the technique of the described system.

It is noted that only one virtual service path is illustrated by FIG. 4(a) which is the virtual service path for switch 403; additional virtual service paths may exist for each of the other various switches 401,402, 404 and 405. In the described system, the various virtual service paths converge at the master switch module controller module 212 and communication is then effected over interface 203.

C. Channel Identification

The channel number assigned for each of the above-mentioned channels are pre-assigned by the supervisor 202. This is an inventive and important aspect of the described system because it allows the supervisor to identify the particular switch at which the service request originated based on the virtual path identifier (VPI) of the VSP, and it allows identification of the type of service requested and the port of origination of the service request based on the virtual channel identifier (VCI) of the VSP.

Figure 7A:
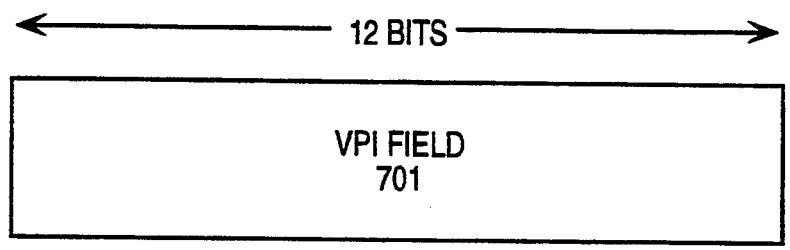
FIG. 7(a) and FIG. 7(b) illustrate formats for VCI and VPI information fields, respectively, as may be utilized by the described system when communicating along a virtual service path/virtual service channel.
Figure 7B:
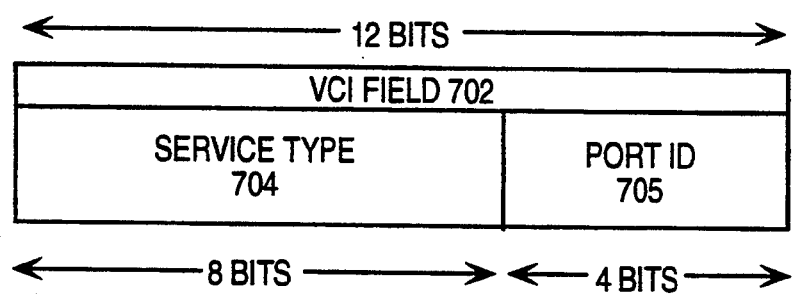

The assignment of a path number and channel number may be better understood with reference to FIG. 7(a) and FIG. 7(b). FIG. 7(a) illustrates the format of the VPI field 701 of a cell of the described system as it may be formatted when received or transmitted by the supervisor 202. The VPI field comprises 12 bits of information which uniquely, from the standpoint of the supervisor 202, identify the switch which is being serviced by the particular virtual service path. Thus, this address scheme provides for addressing of up to 4096 service paths and, therefore, up to 4096 switches may theoretically be controlled by a single supervisor 202. Of course, other limitations and performance considerations (such as table size limitations) in the system may act to limit this number.

As has been discussed, each virtual service path may support a plurality of service channels. Each service channel in a particular virtual service path is uniquely identified with information in a 12-bit VCI field 702. In the described system, for purposes of set-up and identification of service channels, the VCI field 702 is comprised of two subfields: (1) an 8-bit service type field 704 and (2) a 4-bit port ID field 705. The service type field 704 is used to identify the particular service type (e.g., supervisory channel, signalling channel, topology channel, boot channel) and the port ID field 705 is used to identify a port (if applicable) on the switch. Thus, up to 256 service types can be supported and up to 16 ports. Of course, in future generations of the described system, or in alternatives to the described system, these particular field sizes may be varied, for example to accommodate a larger number of ports. In addition, the order of the fields may readily be reversed without departure from the spirit and scope of the present invention.

Figure 4B:
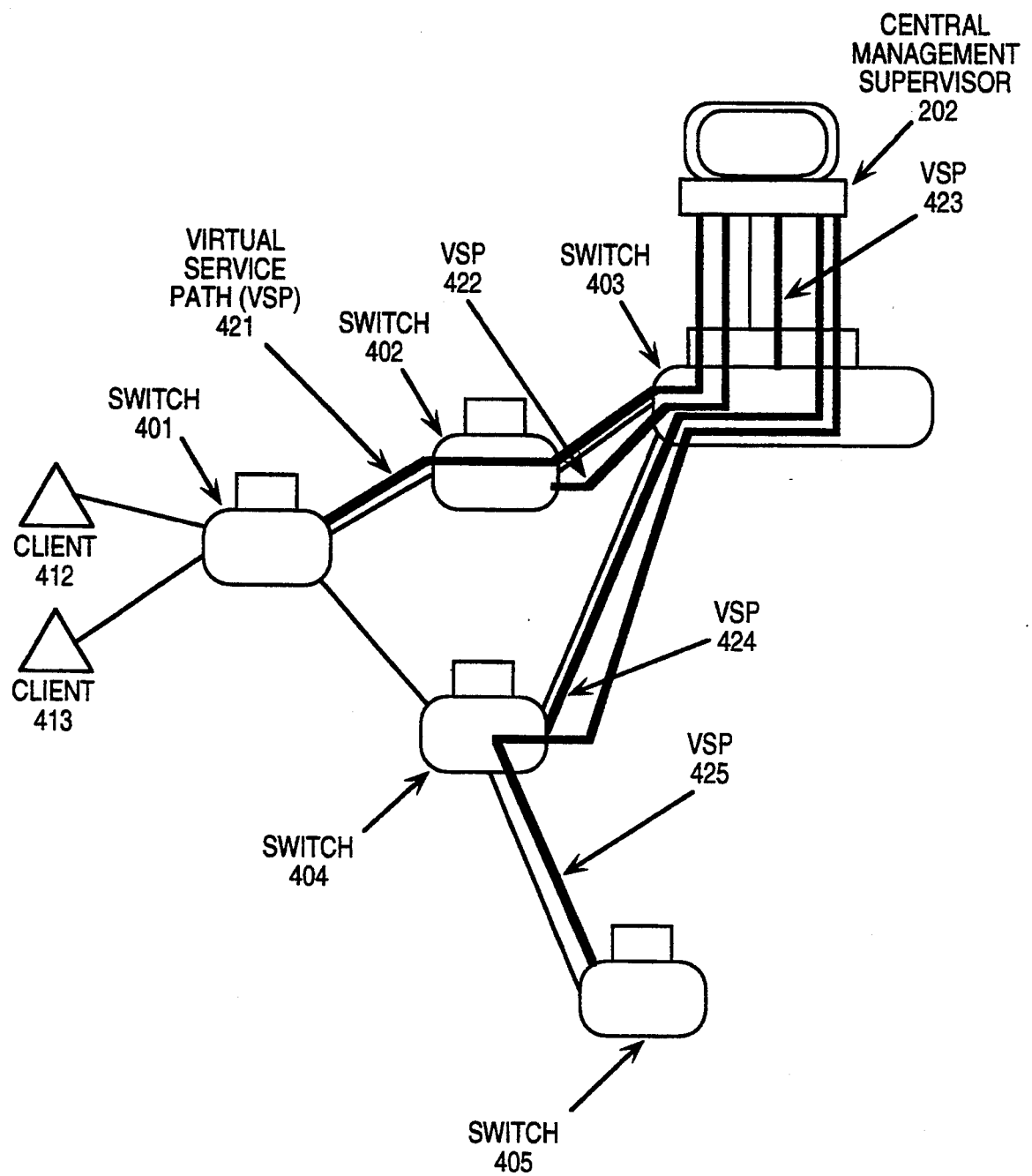
FIG. 4(b) illustrates the network of FIG. 4(a) showing virtual service paths coupling each of various switches with a service provider.

D. Service channel numbers stay constant throughout transmission in the virtual service path Important to the described system, a virtual service path may be thought of as comprising one or more virtual path links in the network. However, even where the virtual service path comprises a number of virtual path links, the channel numbers assigned for each of the service channels remains the same in each of the virtual path links of the virtual service path. This may be best illustrated with reference to FIGS. 4(b), 4(c) and 4(d). FIG. 4(b) illustrates the network of FIG. 4(a) and imposes thereon five virtual service paths. Virtual service path 423 was described in greater detail with reference to FIG. 4(a). Virtual service paths 421,422, 424 and 425 couple switches 401,402, 404 and 405 in communication with the central management supervisor 202. Each of these virtual service paths have a plurality of channels with preassigned channel numbers as was described in connection with FIG. 4(a) for virtual service path 423 and each may be comprised of a plurality of virtual path links (one virtual path link between each set of switches along the VSP).

Figure 4C:
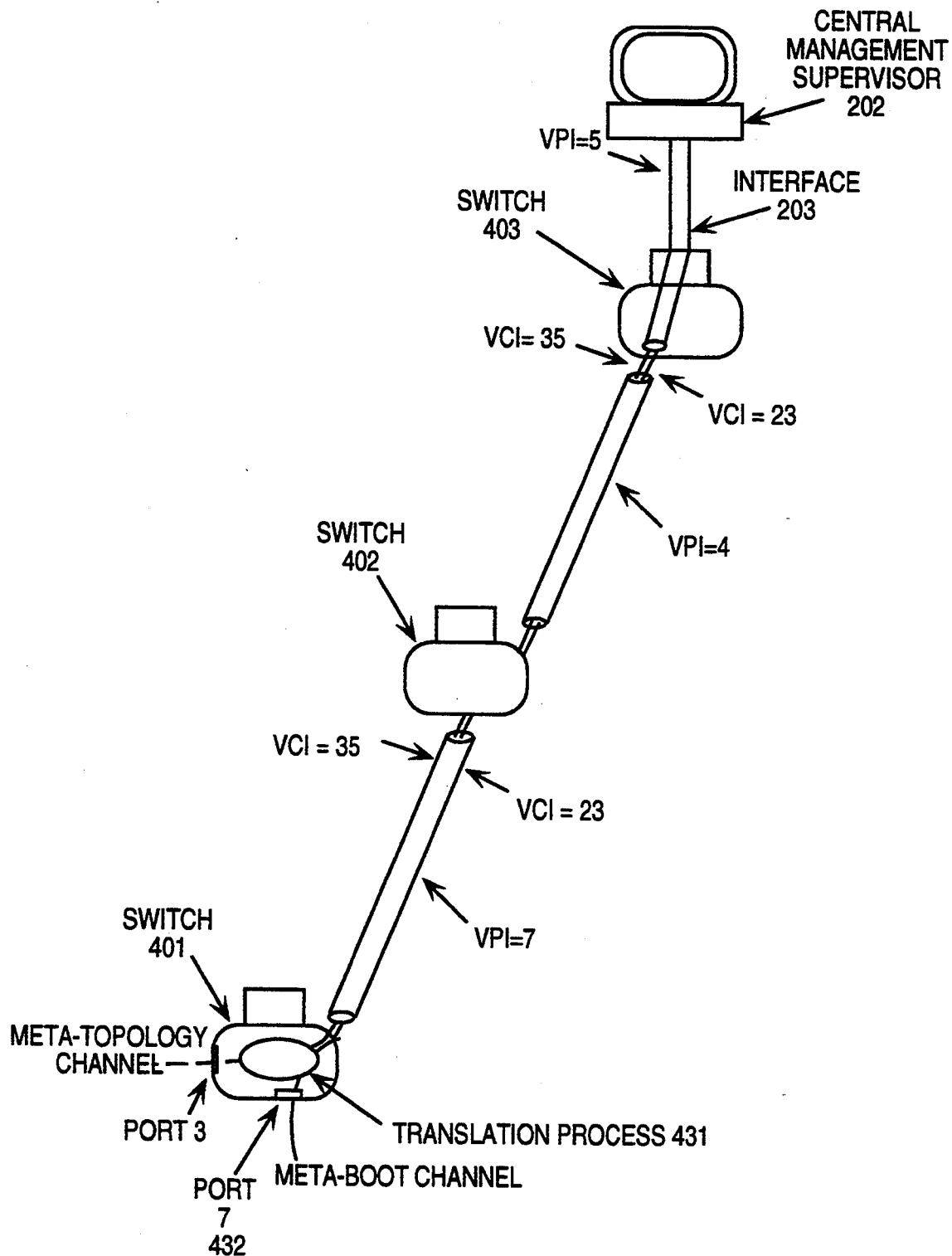
FIG. 4(c) illustrates a portion of the network of FIG. 4(b) showing virtual paths and virtual channels used to implement a virtual service path.
Figure 4D:
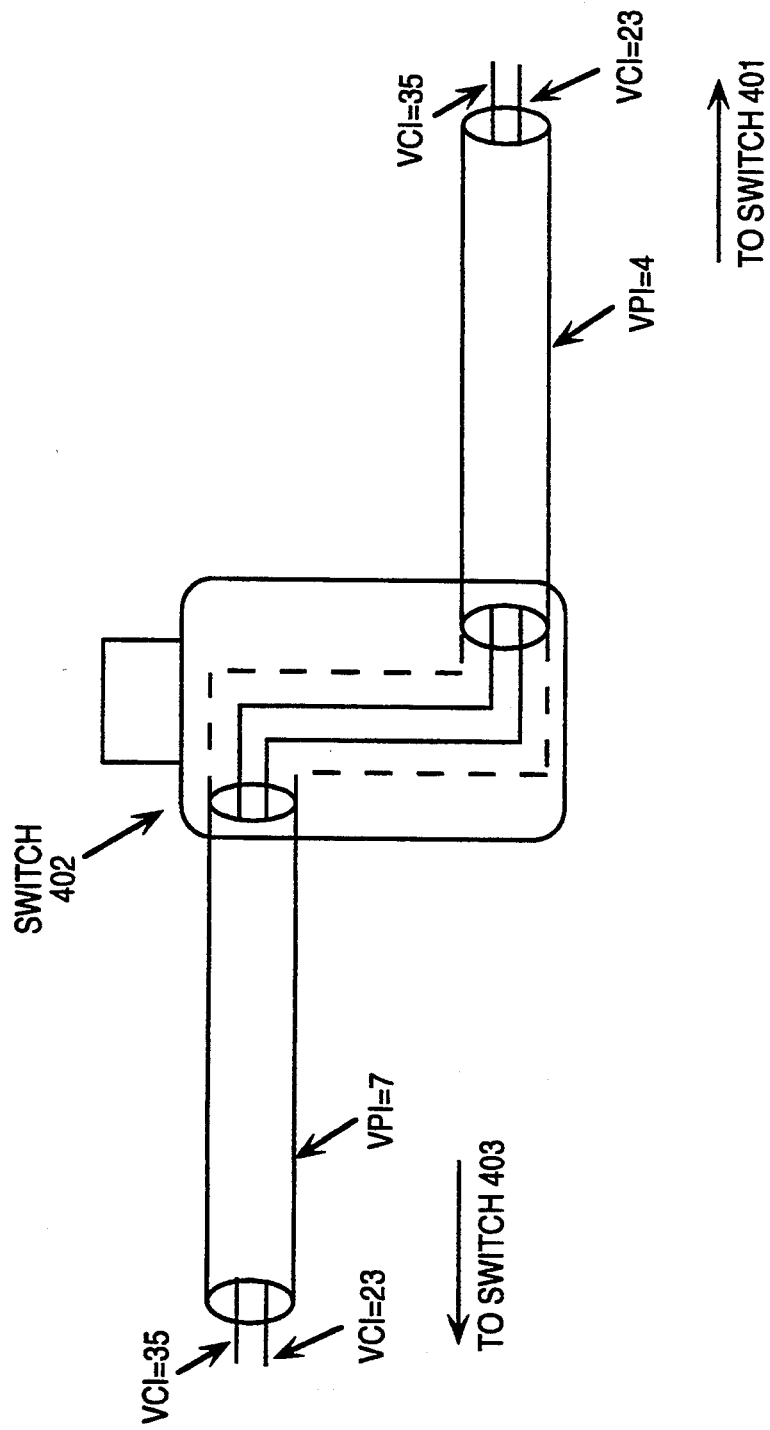
FIG. 4(d) illustrates a portion of the network of FIG. 4(b) showing virtual paths and virtual channels used to implement a virtual service path.

FIGS. 4(c) and 4(d) illustrate a portion of the network of FIG. 4(a) including supervisor 202, interface 203, switch 403, switch 402, switch 401 and a portion of virtual service path 421. The illustrated portion of virtual service path 421 comprises a virtual path identified with VPI=7 which couples switch 402 with switch 403 and a virtual path identified with VPI=4 which couples switch 402 with switch 401. Importantly, this figure also illustrates two channels, a first channel identified with VCI=23 and a second channel identified with VCI=35. The first channel is the boot channel on port 7 432 for virtual service path 421 and the second channel is the topology channel on port 3 for virtual service path 421.

Figure 3B:
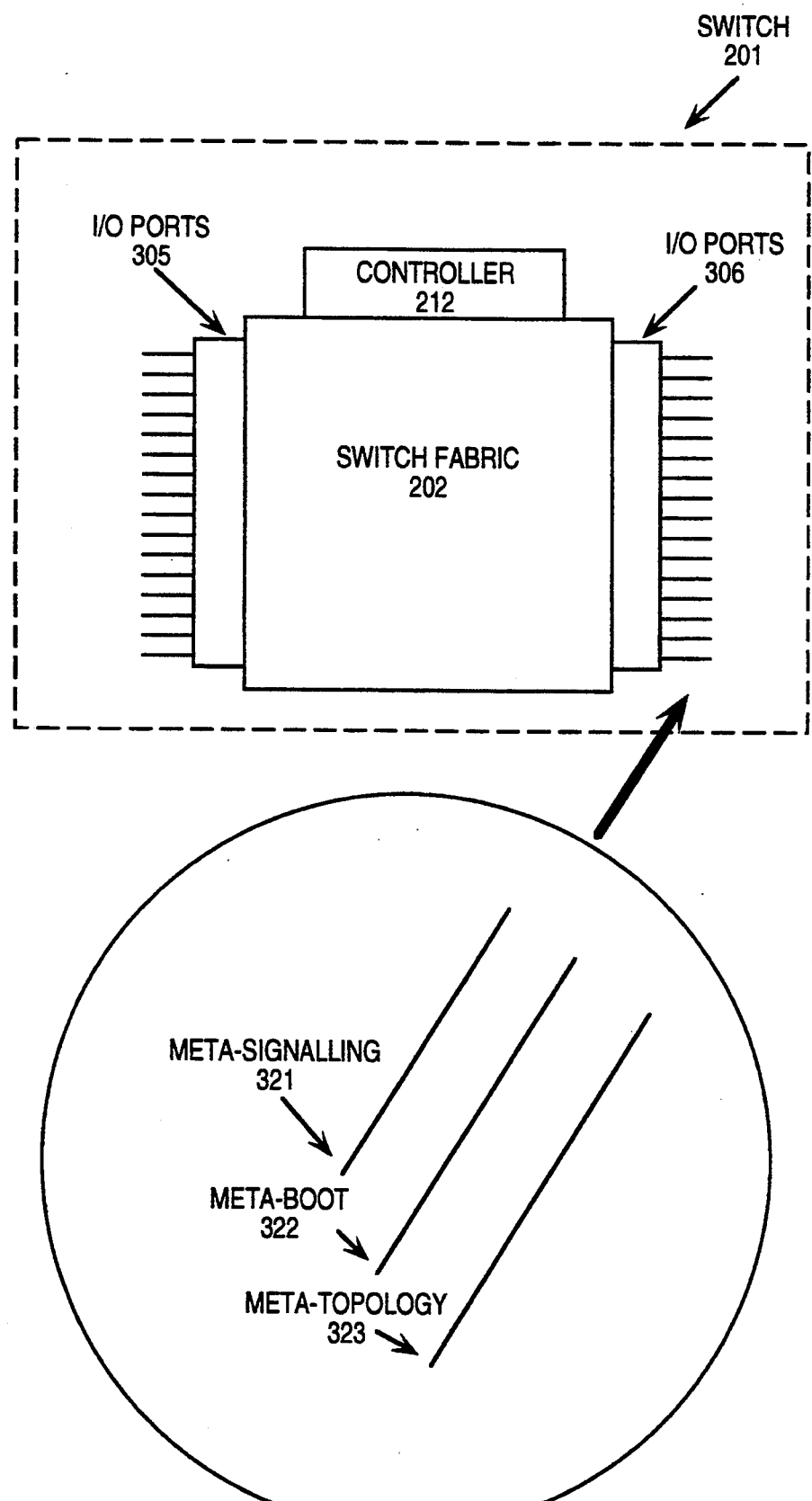
FIG. 3(b) is a diagram illustrating meta channels configured for the various ports of an ATM switch in the described system.

FIG. 4(c) further illustrates the translation process 431 which was described in connection with FIG. 3(b) being carried out through use of VSP translation tables on switch 401. For example, a cell received on port 7 432 having VPI:VCI equal to 0:220 (as will be remembered, this represents a request on the meta-topology channel) will be translated by the translation process 431 to VPI=7 and the VCI having its service type field 704 set to 2 and its port ID 705 set to 7.

Thus, these figures illustrate two features of the described system. First, multiple services are multiplexed over the same virtual path. As has been discussed, this multiplexing is accomplished in an efficient manner in that the virtual service path and service channels are not set-up and torn down for each individual communication but rather are set up a single time, for example, when the switch 401 is initially installed and the channels are then not torn down during normal operation of the network.

Second, the VCI identification of the channel remains the same through each of the various virtual paths in the virtual service path. In this way, the supervisor 202 may preassign the VCI numbers for service channels in the virtual service paths and may then readily identify the nature of any request arriving on a particular service channel based on the VCI information in the cell header of the request.

It might be noted that in typical ATM networks, there is not necessarily any direct correlation between the VCI numbers in a communications link, for example between two clients, as that communication link switches through the various switches in the link. Rather, the translation tables in the various switches provide for the translation of a VCI number from an incoming virtual path to a VCI number on the appropriate outgoing virtual path. Thus, the described system clearly represents, at least in this regard, a departure from the prior art.

Figure 5A:
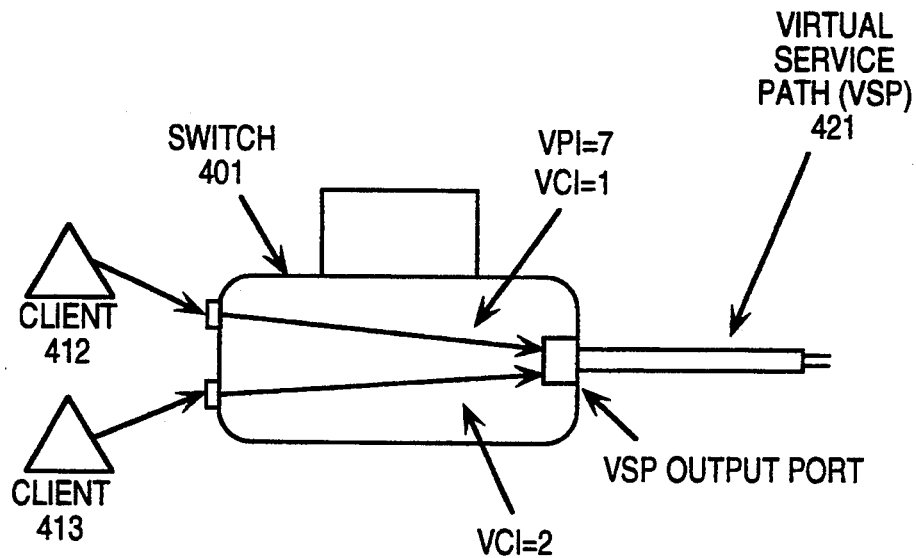
FIG. 5(a) is useful for illustration of multiplexing service channels onto a virtual service path as may be accomplished in the described system.
Figure 5B:
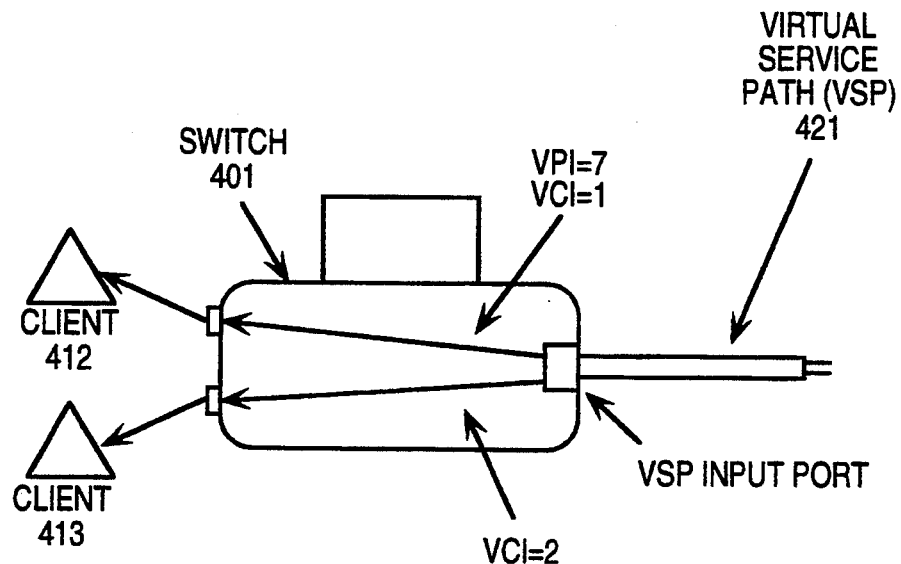
FIG. 5(b) is useful for illustration of demultiplexing service channels onto a virtual service path as may be accomplished in the described system.

FIGS. 5(a) and 5(b) are useful for illustration of multiplexing and demultiplexing of a plurality of signalling channels onto a single virtual service path, such as VSP 421, with FIG. 5(a) illustrating multiplexing signalling channels from client 412 and 413 onto VSP 421 with channels identified as VCI 1 and VCI 2, respectively, and the VPI identified as VPI 7, and FIG. 5(b) illustrating demultiplexing of the signalling channels identified as VCI 1 and VCI 2 from VSP 421. In these figures, there is one virtual channel illustrated associated with each of the two illustrated ports. This is done for purposes of simplification of the illustration. In fact, in the preferred system, there are typically multiple virtual channels which may be associated with each port. This was discussed above, in particular with reference to FIG. 3(b). For example, there may be a signalling service channel, a boot service channel and a topology service channel associated with each port. It is noted that dependent on the device attached to the port (i.e., whether it is a switch or a client), not all of these channels may actually be utilized. However, in the described system, various standard channel types (such as those just mentioned) are configured for each port on the switch regardless of whether the device coupled with the port will actually utilize the channel. Of course, in alternative embodiments, ports may be more custom configured dependent on device type.

III. CONFIGURATION OF AN ATM NETWORK AS A VIRTUAL STAR NETWORK

Figure 6:
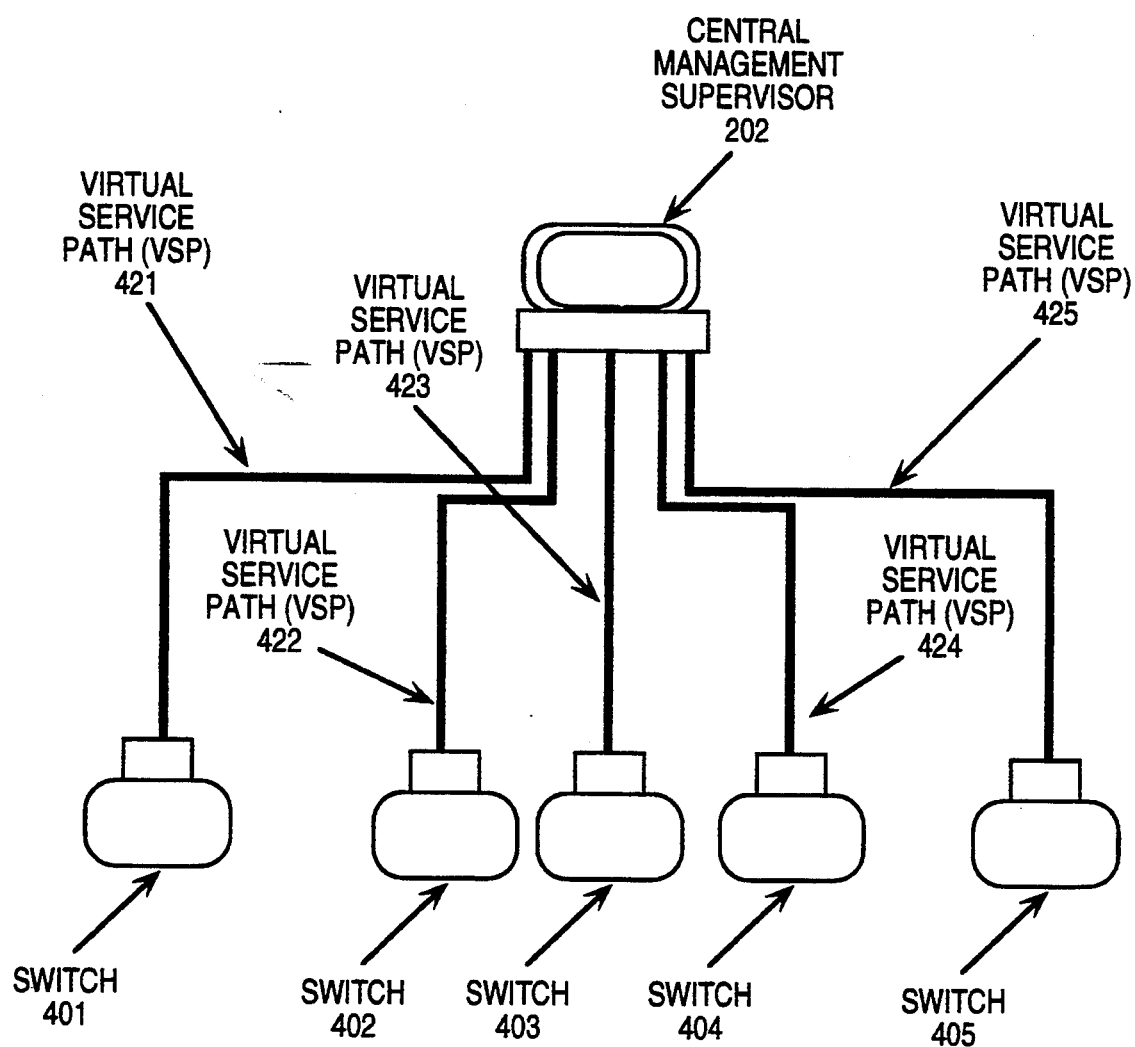
FIG. 6 illustrates logical organization of a network of the described system in a star topology.

As an important aspect of the described system, and as illustrated by FIG. 6, the use of virtual service paths provides the ability to logically view a network implemented in accordance with the described system as a star network having the supervisor 202 as the hub, and the VSPs/switches as the spokes. This star configuration allows for centralized control and provision of services in much the same manner as a logical star network as may be found in other local area networking systems.

FIG. 6 illustrates a logical view of the network of FIG. 4(b) showing the supervisor 202 at the hub of a logical star; and showing each of switches 401,402, 403, 404 and 405 coupled in communication with the supervisor 202 over virtual service paths 421,422, 423,424 and 425, respectively.

IV. AUTOMATIC TOPOLOGY DISCOVERY

There has been discussion above of use of virtual service paths (VSPs) for multiplexing of services in the system of the described embodiment. In addition, set-up of meta-topology channels and use of a topology service channel has been discussed in some detail. It is now worthwhile to describe in greater detail the described system's method and apparatus for automatic topology discovery. Generally, the described system utilizes the meta-topology channels and topology service channels to provide for automatic topology discovery. However, it will become apparent that certain features of the described system may be utilized in systems which do not include VSPs, meta-topology channels and/or topology service channels.

A. Overview of Automatic Topology Discovery

Figure 9:
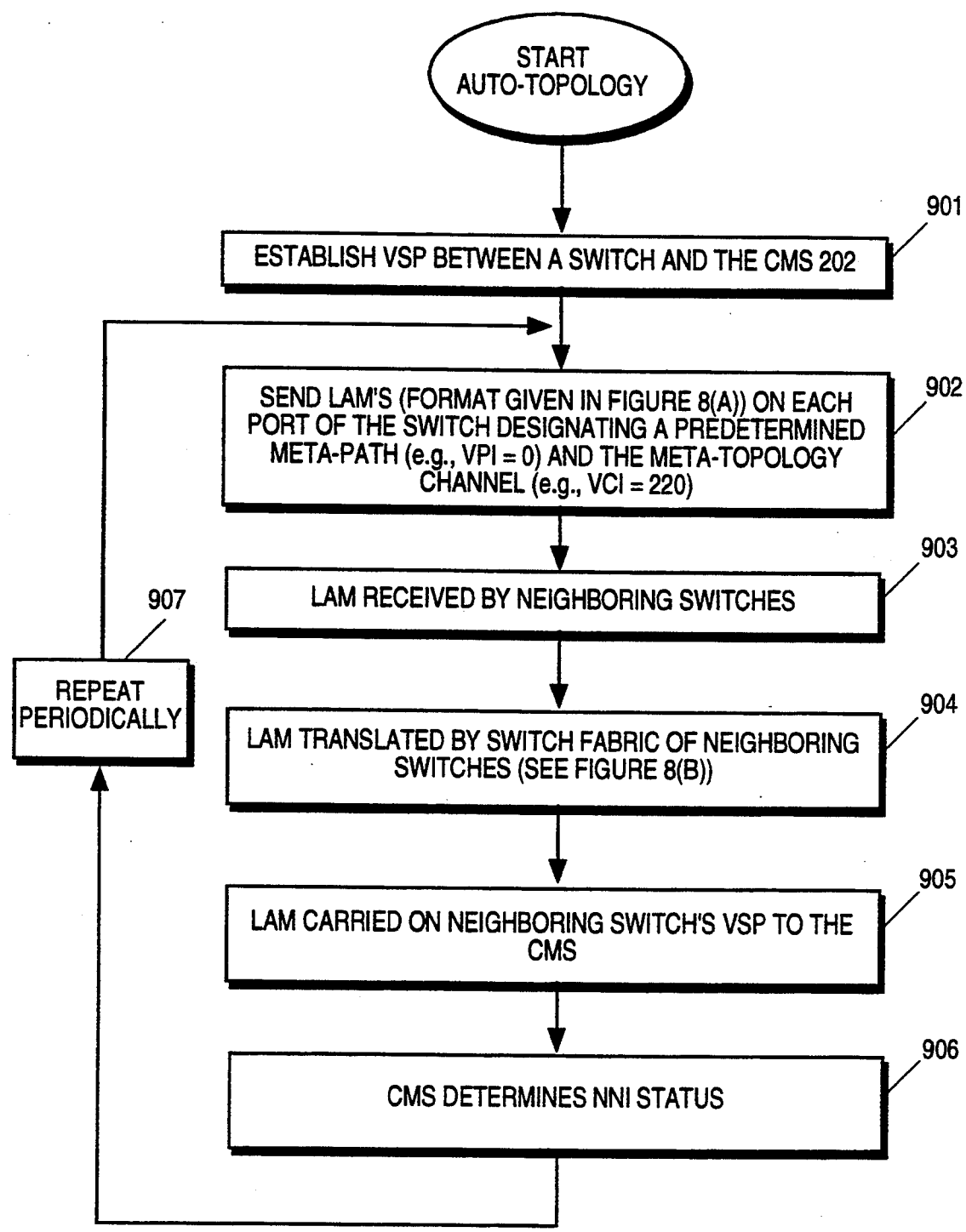
FIG. 9 is an flow diagram providing an overview of an automatic topology determination feature of the described system.

FIG. 9 is useful to provide an overview of the auto-topology discovery method and apparatus of the described system. Initially, a virtual service path (VSP) is established between a switch and the central management supervisor 202, block 901. VSPs have been discussed in some detail above. Bootstrapping of switches and initial establishment of VSPs will be discussed in greater detail below.

After establishment of a VSP, each switch in the system begins periodically transmitting on each of its ports what is termed herein a link advertisement message (LAM) which may be thought of as a message comprising topology information, block 902. The switch controller (e.g., switch controller 212) is responsible for initiating transmission of the LAM message.

The format of the LAM, as transmitted by the original transmitting switch will be described below in greater detail in connection with the discussion of FIG. 8(a). In the LAM, a predetermined meta-path and meta-topology channel is designated. As has been discussed above, in the described embodiment, the meta-path is designated as VH=0 and the meta-topology channel is designated as VCI=220. (See, e.g., Table I, given above.)

It is noted that the LAM messages are in the general format of an ATM cell which has been previously discussed and, therefore, are of a fixed length. Use of fixed length messages in ATM networks has important implications for topology discovery because messages communicating topology information can not be readily updated as they are passed from intermediate switch to intermediate switch on their way to a topology manager with additional link information as has been done in certain prior an systems. Doing so would soon result in the fixed length message area becoming full which would necessarily limit the size of the network supportable by the topology discovery system. Further, updating of the message information at each intermediate switch may, and very well would, consume processing resources of the intermediate switch. Therefore, as will be seen and appreciated, the described system utilizes a fixed length and fixed format message to communicate necessary information to a topology manager and does not require update or intervention by the controllers (e.g., controller 212) of the intermediate nodes in transmission of the topology message. Importantly, the message does not change in size or format regardless of network size or the number of neighboring nodes to the originating node.

In any event, the LAMs are then received by each neighboring switch attached to a port on which a LAM is transmitted by originating switch, block 903. The neighboring switches then each translate the appropriate header information in accordance with their established translation tables (discussed above), block 904. As has been discussed, the VPI information contained in the header is translated to identify the VSP of the intermediate switch and the VCI information is translated to designate the topology service channel (e.g., VCI=2). (See again,, e.g., Table I, given above.) Importantly, this translation occurs within the switch fabric of the intermediate switch and without intervention of the switch controller, e.g., controller 212). The format of the translated LAM is illustrated by FIG. 8(b) and will be discussed in greater detail below.

The LAM is then carried on the neighboring switches VSP to the CMS, block 905. Transmission of information on the VSP of a switch to the CMS has been previously discussed. The format of the LAM as received by the CMS is illustrated by FIG. 8(c) and will be discussed in greater detail below.

A topology manager, executing as part of the CMS, is then able to determine NNI status information, based on the received LAM, block 906. This will be discussed in greater detail below.

Periodically, the switch controller of each active switch in the network causes LAM messages to be transmitted on the switch's active ports, repeating the above-described steps, block 907. The topology manager determines that a LAM is received periodically from each active switch and, if the LAMs are not received, it is interpreted as a problem with the link/-switch requiring some corrective action. Thus, further diagnostics can be initiated, the network manager can be notified or, at the extreme, the link can be removed from the active topology. In the described system, LAM messages are initiated every few seconds by active switch controllers and the CMS interprets missing more than approximately 10 LAMs over any given link (in either direction) as a problem with the link requiring corrective action.

B. Formats of the Link Advertisement Message (LAM)

Figure 8A:
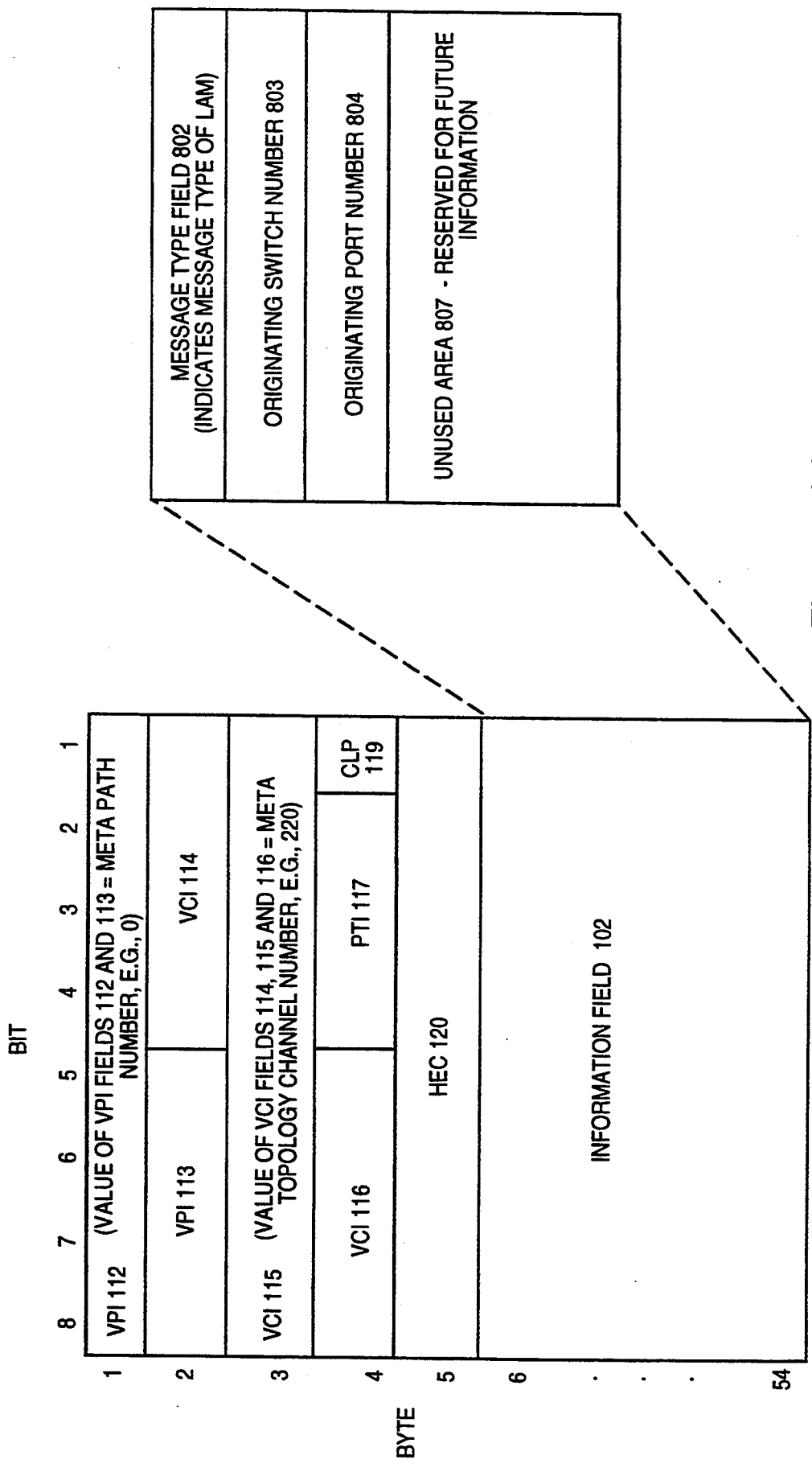
FIGS. 8(a) through 8(c) illustrate formats of the link advertisement message (LAM) cell as it is transmitting from an originating cell to the central management supervisor (CMS).
Figure 8B:
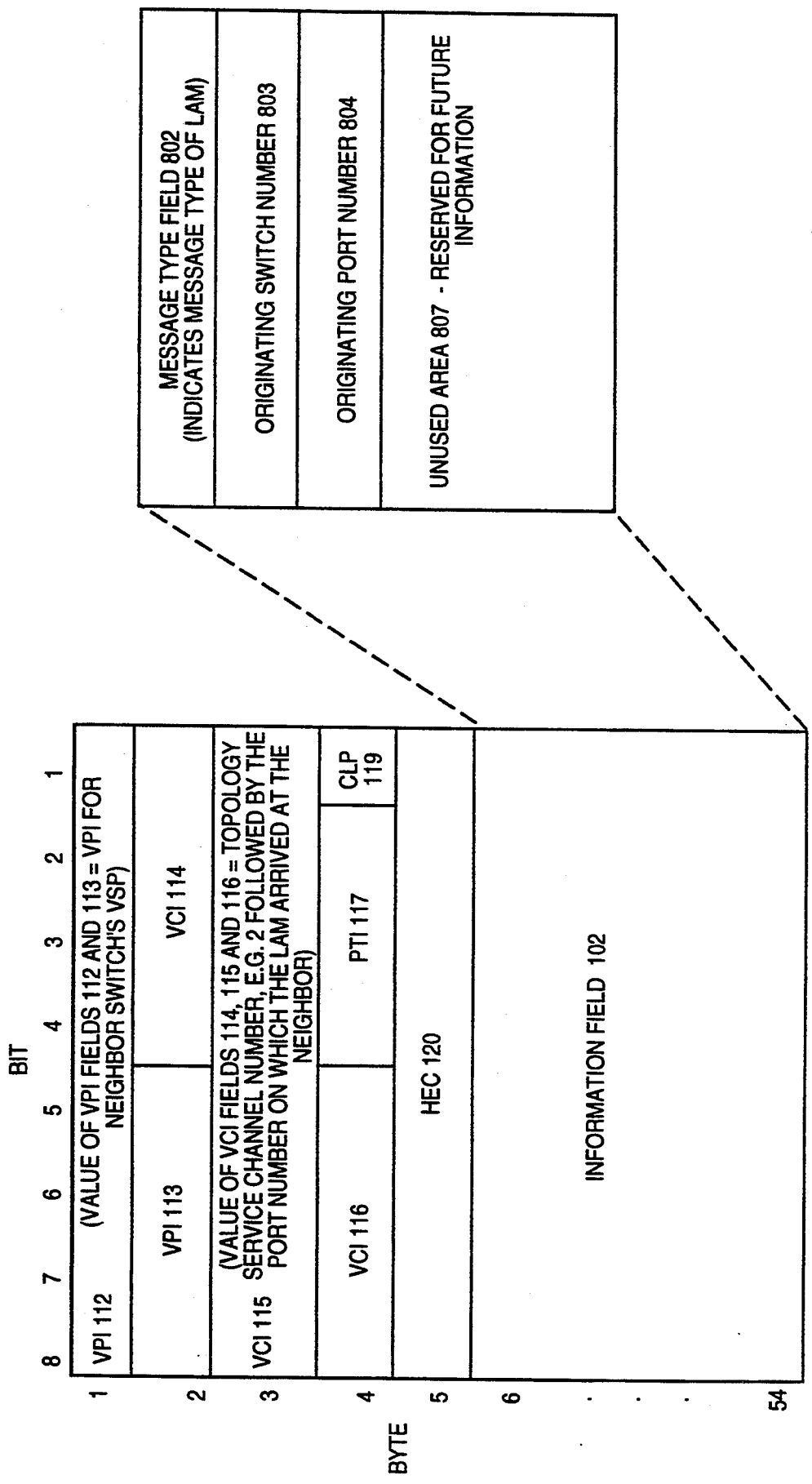
Figure 8C:
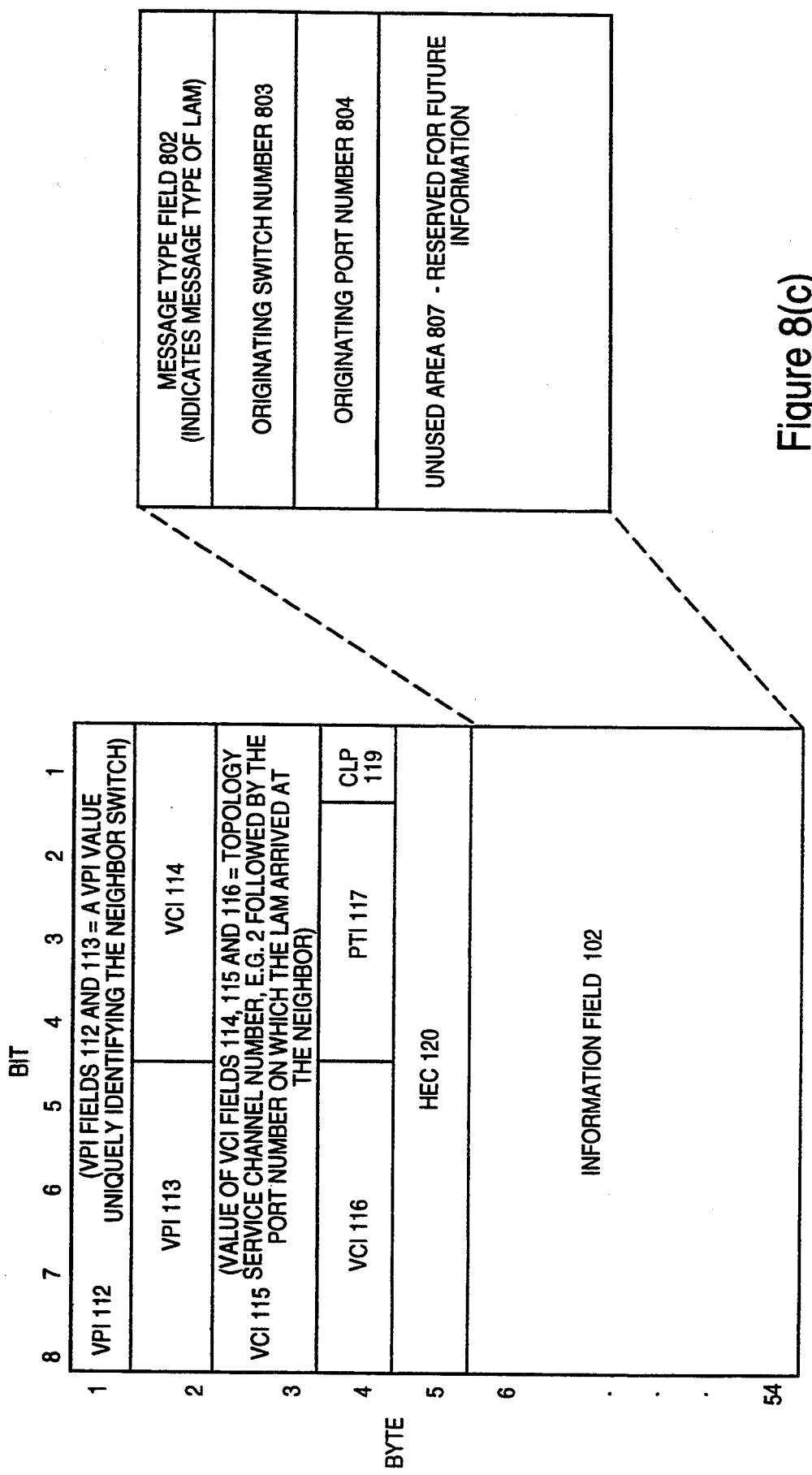

FIGS. 8(a)-(c) are useful for describing the link advertisement message (LAM) as it is transmitted from the originating switch, to an intermediate switch and, finally, to the CMS.

Referring first to FIG. 8(a), the format of the LAM, as transmitted from an originating switch is illustrated. As has been discussed, LAMs, in the described embodiment, follow the previously discussed general format of ATM cells including a five byte header portion having a VPI field (illustrated as fields 112 and 113), a VCI field (illustrated as fields 114 and 115), a PTI field 117, a CLP field 119 and a HEC field 120 and, in addition, having a 48 byte information field 102.

The controller of the originating node (e.g., controller 212) formats the VPI field to indicate the meta-path number (as has been stated for example in connection with the discussion above of Table I, in the described embodiment, the meta-path number is designated as 0). The controller of the originating node also formats the VCI field to indicate the LAM message is to be transmitted on the meta-topology path (e.g., in the described embodiment, VCI=220).

LAMs, in the described embodiment, comprise in their information field 102, the following information:
(1) a message type field 802 indicating the message is a link advertisement message;
(2) a field 803 identifying the originating switch (as will be described, switches are provided with an identification number at the time they are booted up);
(3) a field 804 indicating the port on which the originating node is transmitting the particular LAM; and
(4) an unused area 807; this area is reserved for future uses and may, for example, later include additional topology information.

As was mentioned above and as will be discussed in greater detail below, the originating switch then transmits the message on to its neighbor on the designated port. This process is repeated by the controller for each of the switches ports and, as has been mentioned is also repeated again periodically. In any event, the LAM is then received by the neighboring switch (assuming the port is attached to an active switch) and the header of the LAM is translated in accordance with the translation tables established for the switch fabric.

In particular, as illustrated by FIG. 8(b), the VPI field (i.e., fields 112 and 113) are translated to include the VPI for the neighboring switches virtual service path (VSP) and the VCI field (i.e., fields 114, 115 and 116is translated to comprise two pieces of information; first, the topology service channel number (as shown in Table I, in the described embodiment the topology service channel number is 2) and second the port number on which the LAM arrived at the neighbor switch.

Importantly, it is seen that because the only changes to the cell are in cell header and are carded out by the neighbor's switch fabric, there is no need for any processing by the neighboring switch's controller. Thus, the processing time and requirements expended by the neighboring switch is minimized. It will also be seen that other intermediate nodes operate similarly by translating the header of the cell with their respective switch fabrics and without intervention from their controllers.

The LAM is then transmitted through any number of intermediate switches. At each of the VPI is be changed in accordance the switch's translation tables in order to continue to transmit the LAM along the neighbor switches VSP. (It is worth noting here that the term intermediate switch is used herein to include all switches between the originating switch and the CMS and, therefore, would generally include the neighbor switches; however, as has been described, processing of the header is different at the neighbor switch because the header is formatted for transmission on the neighbor's VSP.)

As noted by FIG. 8(b), when the LAM arrives at the master switch, the VPI field is translated by the master switch's switch fabric, in accordance with its translation tables, to a value which identifies the neighbor switch. In the described system, this value is simply the neighbor switch's identification number (which was assigned at boot time). However, in other embodiments this could be some other value and this other value could then be mapped by the CMS to the switch identification number. Eliminating this mapping saves processing time at the CMS.

In any event, the information field has remained unaltered from the original transmission by the originating switch until the LAM is received by the CMS. Therefore, it can now be seen that the CMS (and the topology manager which executes as pan of the CMS), have access to information identifying the originating switch number (field 803), the originating port number (field 804), the port on which the LAM arrived at the neighbor (contained within the VCI field), and the information identifying the neighbor (contained within the VPI field). Thus, the CMS has access to information uniquely identifying a NNI and, in the described embodiment, this identification may be set forth in the format:

<originating switch #:originating port #>,<neighbor switch #:neighbor port #>

C. Illustration of Transmission of LAMs

Figure 10:
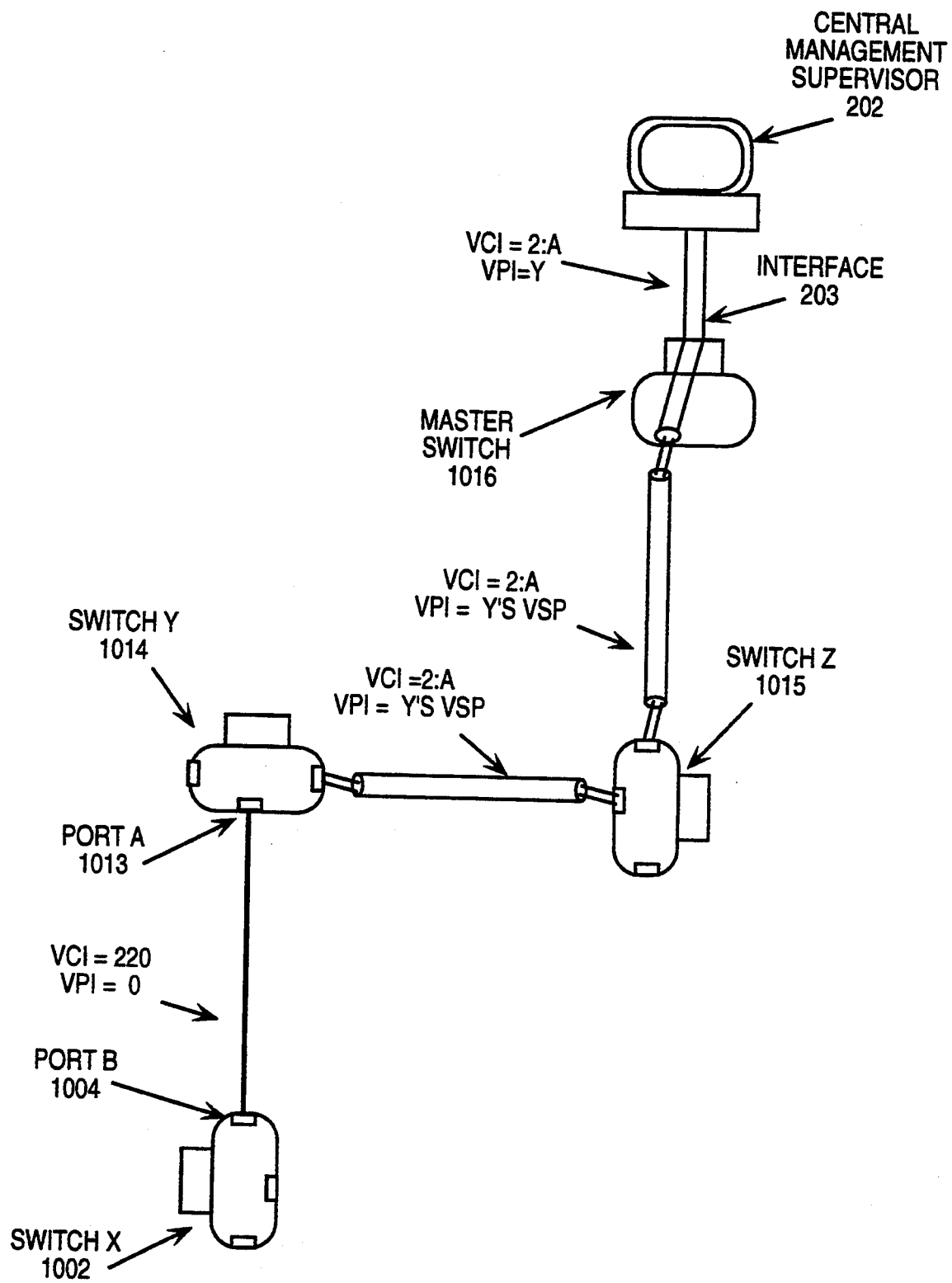
FIG. 10 illustrates transmission of a link advertisement message (LAM) from an originating switch through a neighboring switch and intermediate switches to the central management supervisor (CMS).

FIG. 10 is useful for illustrating transmission of a LAM in the described network. Switch X 1002 is the originating switch and originates a LAM on port B 1004. The LAM has the format previously described in connection with FIG. 8(a) and, therefore, in the described system would have its VCI set to 220 and its VPI to 0. The LAM is received by switch Y 1014 and the header is translated as has been described into the format of FIG. 8(b). The LAM is then forwarded and, as has been described, the VCI is set to indicate transmission on the topology service channel and to indicate the LAM was received by switch Y 1014 on port A and the VPI is set to indicate switch Y's 1014 VSP. The LAM is then received by switch Z 1015 where the header may again be translated by switch Z's switch fabric and the LAM is then transmitted to the master switch 1016 where the VPI of the header is translated to indicate the neighbor switch's id (i.e., identifies switch Y) and the LAM is then forwarded over interface 203 to the CMS 202.

When this LAM is received by CMS 202, as has been discussed, the CMS 202 will have information sufficient to identify the LAM was originated by switch X 1002 on port B 1002 and the immediate neighbor, connected on an NNI with port B 1002, is switch Y 1014, which is connected to port B 1002 by switch Y's 1014 port A 1013. In the short-hand form discussed above, this NNI may be identified as:
<X:B>,<Y:A>

What has now been discussed in some detail is transmission of a LAM on single port of a single switch. It will be discussed in greater detail in connection with FIGS. 11 and 12, respectively, that (1) the LAMs are in fact transmitted on each output port of a switch and (2) each switch transmits LAMs on each of its output ports. Importantly, especially this second aspect of the described system, provides for transmission of LAMs in both directions across a link (e.g., although not illustrated, a LAM is transmitted on switch Y, port A to switch Z and is then carded across switch Z's VSP to the CMS). By transmitting LAMs in both directions across the link the integrity of the link can be verified.

Figure 11:
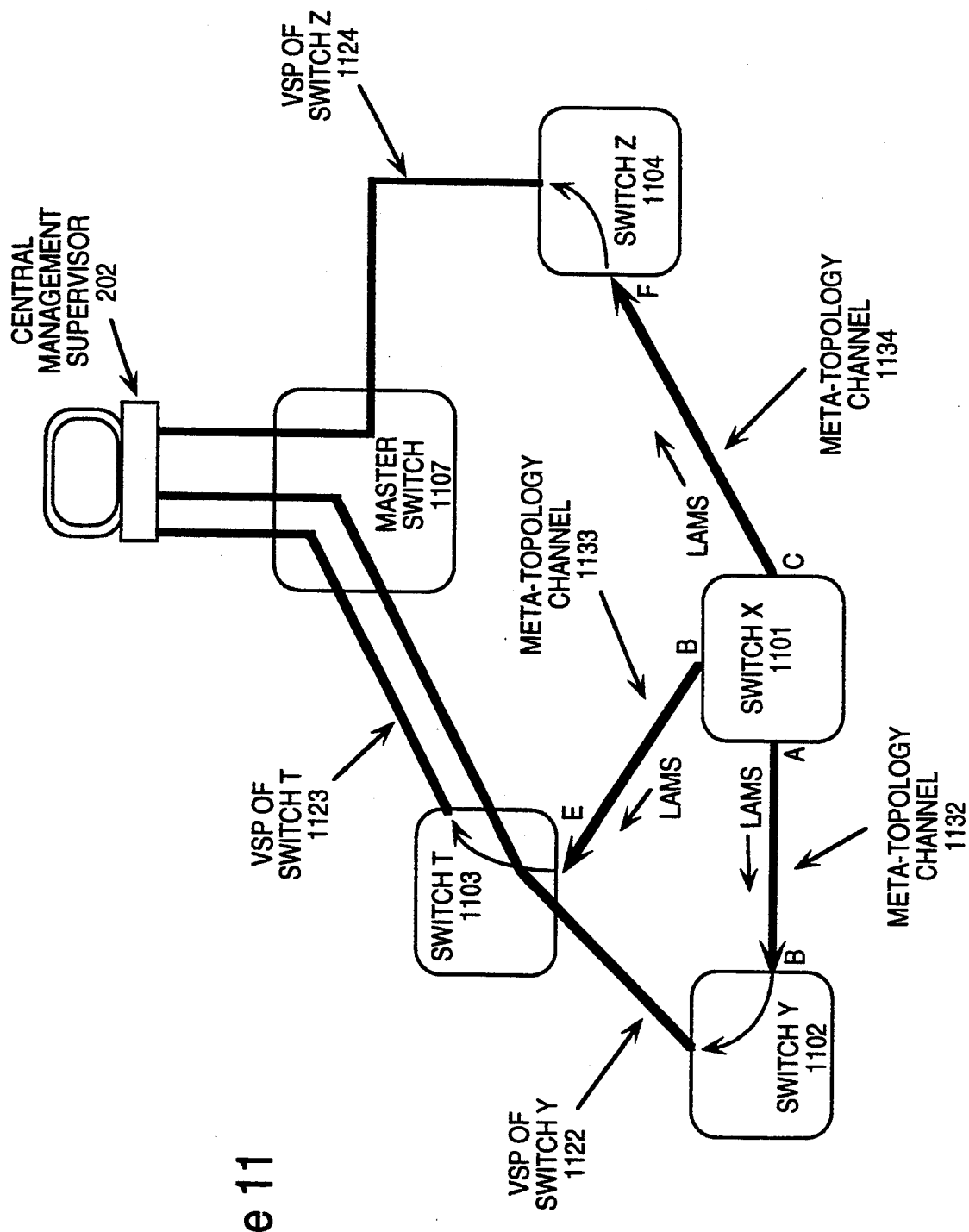
FIG. 11 illustrates transmission of LAMs from an originating switch, through each of its output ports, to its neighboring switches and on through intermediate switches to the CMS.

FIG. 11 is useful for illustrating that the switch controller of any particular switch causes LAMs to be transmitted on each of the switch 's ports. Switch X 1101 is illustrated as having three ports and generates LAMs on each for transmission over the meta-topology channels 1132, 1133 and 1134 out of ports A, B and C, respectively. The LAM transmitted over channel 1132 is received on port B of switch Y 1102 and is forwarded to the CMS 202 over the VSP 1122 of switch 1102; the LAM transmitted over channel 1133 is received on port E of switch T and is forwarded over VSP 1123 of switch T; and the LAM transmitted on channel 1134 is received on port F of switch Z and is forwarded over VSP 1124 of switch Z. Thus, the CMS 202 is provided with three LAMs which indicate the existence of the following NNI's:

<X:A>,<Y:B>

<X:B>,<T:E>

<X:C>,<Z:F> and, as a result of receiving this information, the topology manager executing in the CMS can determine topology information (e.g., identification of NNI's) regarding switch X 1101 and its neighbors. Of course, the other switches in the network also transmit LAMs in a similar manner and, as a result, topology information is made available to the topology manager for the network.

Figure 12:
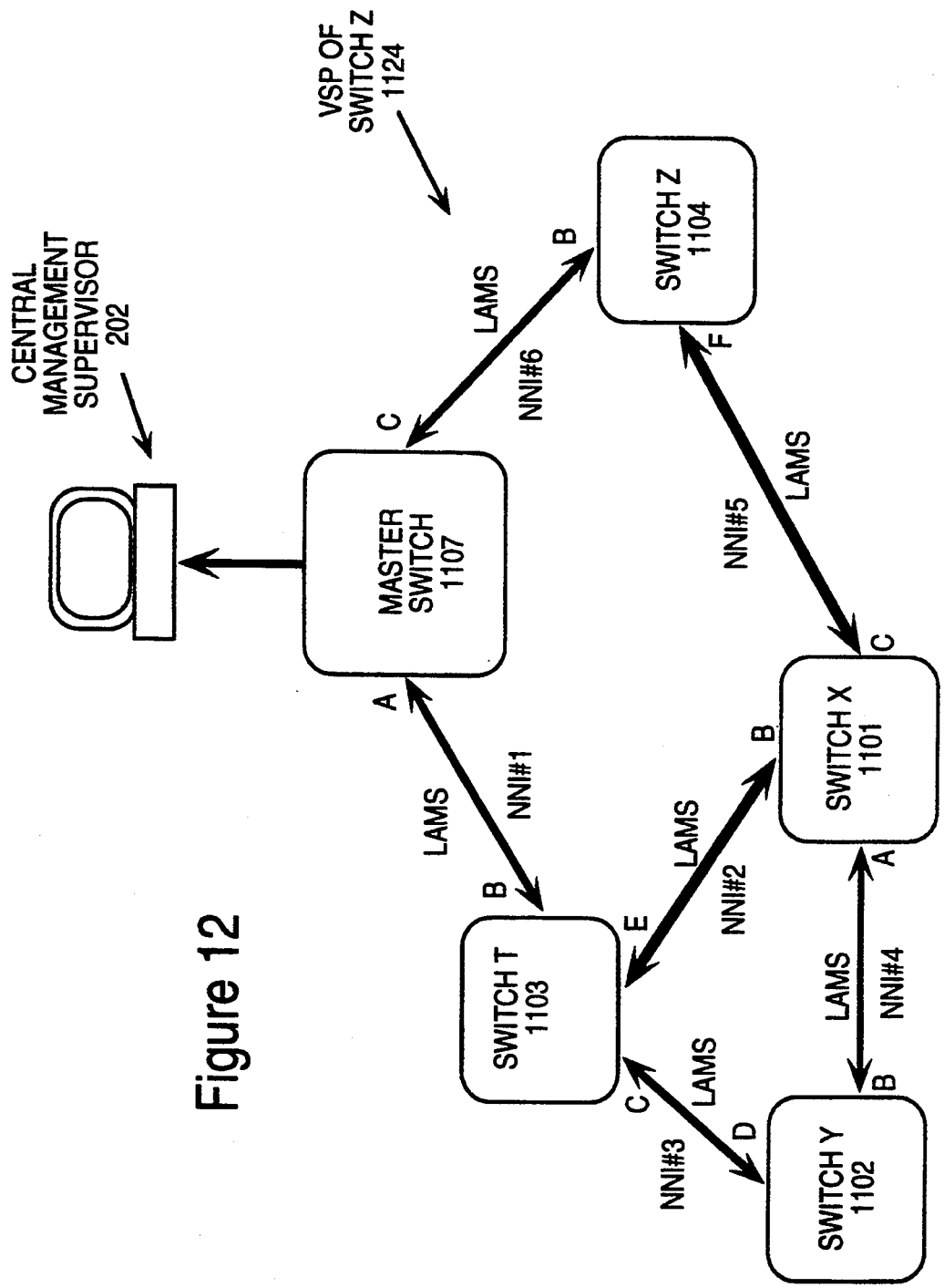
FIG. 12 illustrates a plurality of switches transmitting LAMs to a CMS.

FIG. 12 illustrates the various switches in the network each transmitting LAMs on their output ports to their neighbors for transmittal on their neighbor's VSPs to the CMS 202. Importantly, as one feature of the described system, for each NNI, the topology manager expects to receive two LAMs-one originated from each of the two switches coupled in communication over the NNI. This is because ATM networks define NNIs as bidirectional links. In the network as illustrated by FIG. 12, NNI number 6 is illustrated as a unidirection link. This represents a fault in the network and, as will be understood, is detectable with the described system.

Thus, as can be seen, when the various LAMs are received by the CMS, the topology manager will have received LAMs identifying the following NNIs:

| NNI # | First LAM identifier | Second LAM identifier |
|---|---|---|
| 1 | <master:A>,<T:B> | <T:B>,<master:A> |
| 2 | <T:E>,<X:B> | <X:B>,<T:E> |
| 3 | <T:C>,<Y:D> | <Y:D>,<T:C> |
| 4 | <Y:B>,<X:A> | <X:A>,<Y:B> |
| 5 | <X:C>,<Z:F> | <Z:F>,<X:C> |
| 6 | <master:C>,<Z:B> | not received |

Thus, it can readily be seen that by matching the LAM pairs, the topology manager can readily determine faults in the network in which uni-directional NNIs exist.

V. DYNAMIC CLIENT DISCOVERY

Figure 13:
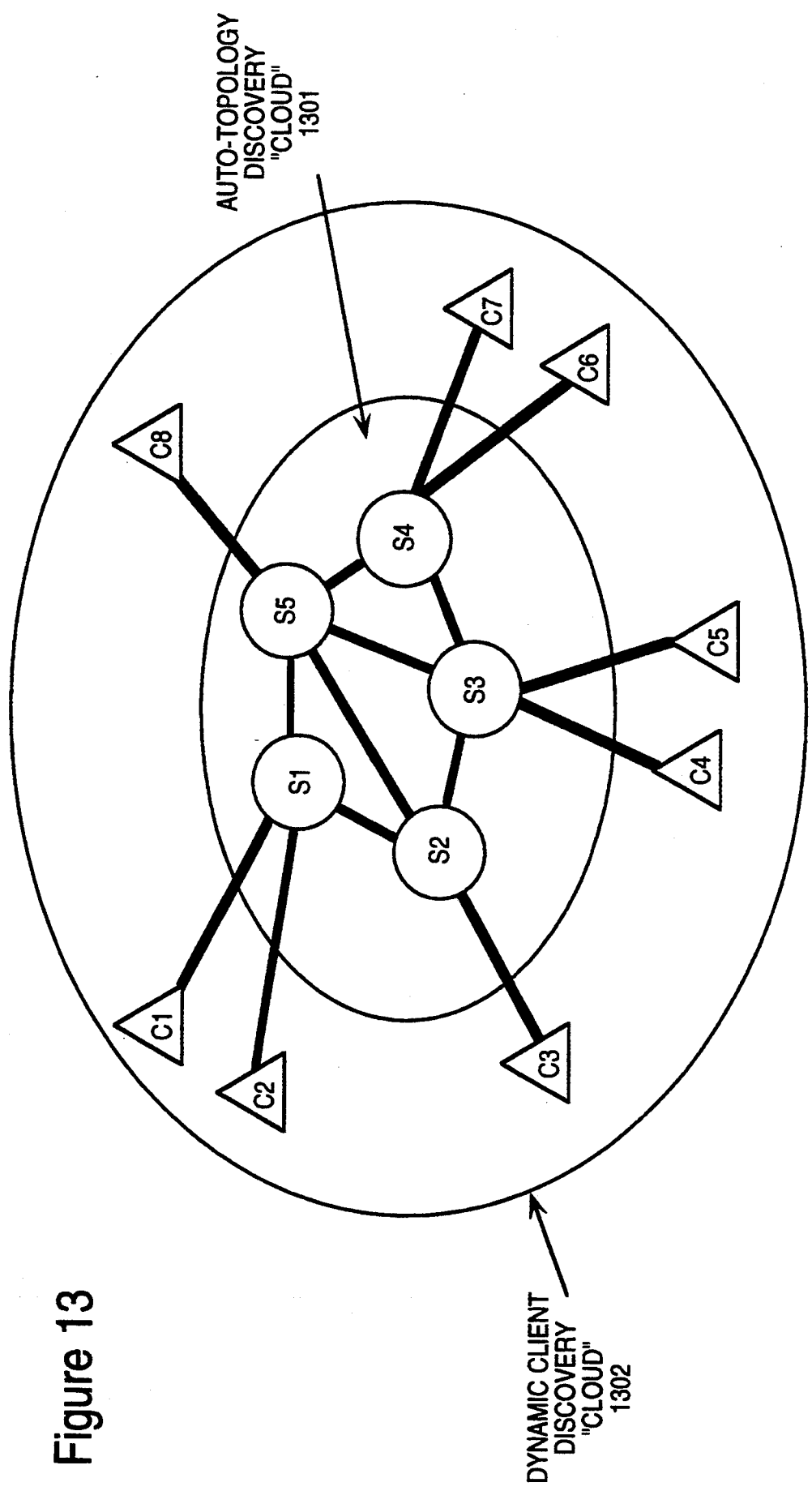
FIG. 13 illustrates an ATM switch cloud and a client switch cloud.

As has been discussed, the ATM network comprises switches interconnected in communication with each other through NNIs (and, in the case of the network described herein connected in communication with a central management supervisor (CMS)) and clients, connected in communication with the various switches. Turning briefly to FIG. 13, above, in connection with the discussion of auto-topology, it was shown how the CMS discovers the topology of the switches (illustrated as inner cloud 1301 ). Dynamic discovery of clients (shown in outer cloud 1302) is also an important feature of the described system.

Often, it is useful for a first client (e.g. C1) to be able to communicate with a second client (e.g., C8) in a network without need for the first client to have an understanding of the physical connections of the various switches in the network, or even an understanding of where the first client itself is connected within the network. This is illustrated by FIG. 13 which shows the various switches within a cloud 1301.

The described embodiment utilizes the above-described VSP concept to allow for dynamic registration of clients and to allow for client-to-client communication through cloud 1301. In broad terms, the dynamic client discovery process of the described embodiment starts by a client attempting to register itself when it is attached to the network and, in response to these attempts, the CMS registering the client and allowing later identification of the client by some address type (which may be either a logical or physical address) or by identification of a switch, module and port.

A. Overview of Dynamic Client Discovery

Figure 16:
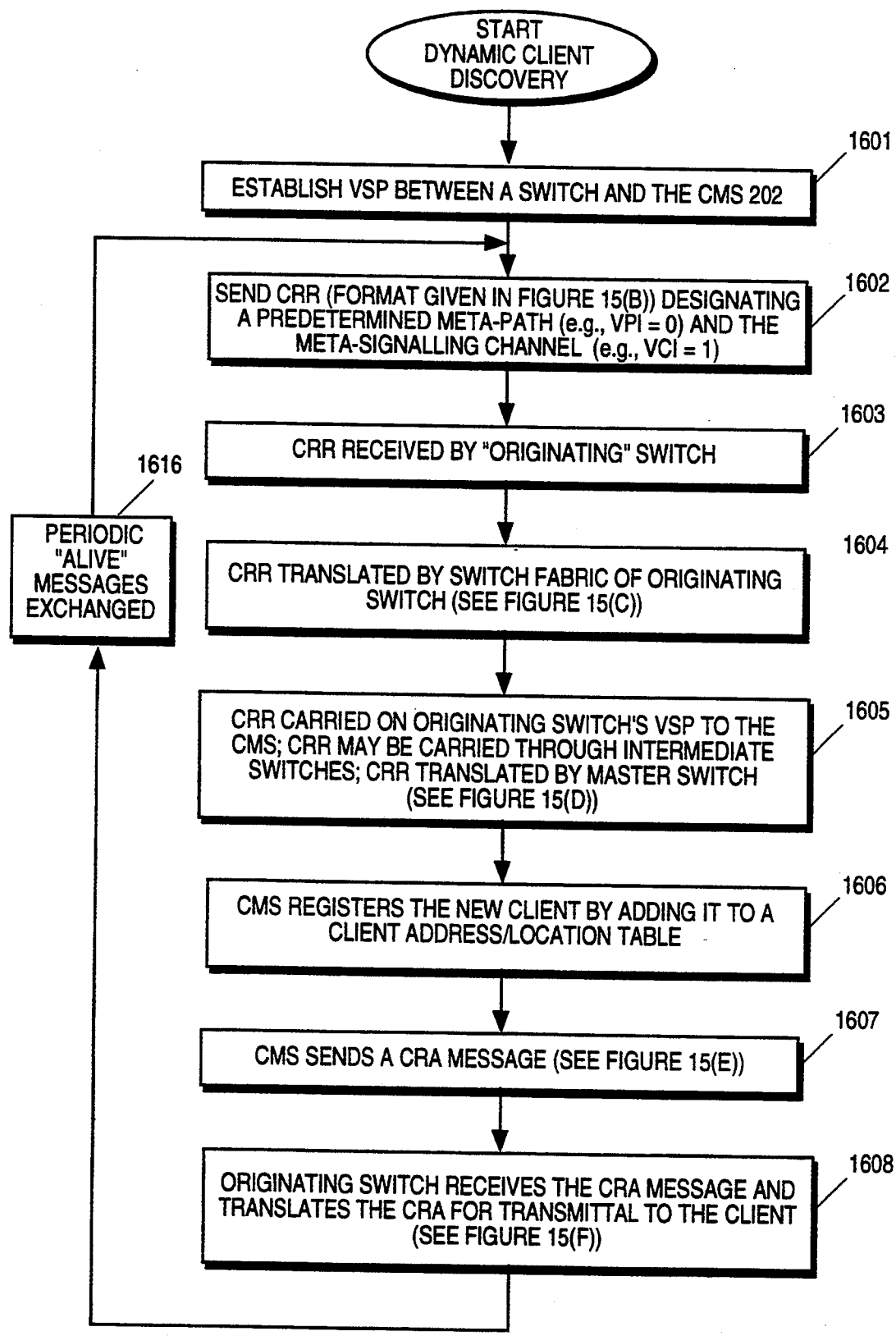
FIG. 16 is an overall flow diagram illustrating the client registration process of the described system.

FIG. 16 is useful for providing an overview of dynamic client discovery as utilized in the described embodiment. Initially, the switch to which a client is attached must have been successfully booted and a VSP for the switch have been established, block 1601 (booting of switches in the described embodiment will be discussed in greater detail below). If a client attempts to register itself prior to its switch being successfully booted, its registration messages will not be transmitted and, therefore will not be acknowledged. As a result, the client will continue to attempt to register itself until an acknowledgement is received.

A client attempts registration by transmitting a client registration request (CRR) in the format given by FIG. 15(*b*), block 1602 (this format will be discussed in greater detail below). The CRR is transmitted by the client by designating a predetermined meta-path (in the described embodiment, as discussed above in connection with Table I, the predetermined meta-path is designated with VPI=0) and by designating the meta-signalling channel (in the described embodiment, again as discussed in connection with Table I, the meta-signalling channel is designated with VCI=1).

The CRR is then received by what will be termed herein the "originating" switch the switch to which the client originating the CRR is attached, block 1603. The CRR is translated by the originating switch's switch fabric to provide a header of the format given in FIG. 15(*c*). Importantly, it will be appreciated that this translation occurs within the switch fabric and does not require intervention by the switch's controller. The CRR is translated to designate the originating switch's VSP in the VPI field and to designate the meta-signalling channel number (e.g., 1) followed by the port number on which the CRR was received by the originating switch in the VCI field.

The CRR is then transmitted on the originating switch's VSP, potentially through intermediate switches (with the appropriate translations of the VPI as have been previously discussed), and is received by the master switch where the header is again translated to have the VPI identify the originating switch (see format given in FIG. 15(*d*)), block 1605.

The CRR is then transmitted to the CMS over interface 203 and the CMS registers the new client by adding the client to a client address/location table, block 1606. The information contained in this table will be discussed in greater detail below.

The CMS then transmits a client registration acknowledgement (CRA), in the format given by FIG. 15(*e*), back over the originating switch's VSP, block 1607. The originating switch then receives the CRA and forwards the CRA for transmittal to the client (see format given by FIG. 15(*f*)), block 1608.

After successful registration, the client and CMS periodically exchange "keep alive" messages over the originating switch's VSP, block 1616. If a sufficient number of expected alive messages are not received by the CMS, the CMS deregisters the client by removing its entry from the client address/location table. Alive message may not be received for a number of reasons including, for example, that the client has been physically disconnected from the network, the switch has been disconnected, failure of any of various intermediate links, or other malfunction. If a sufficient number of expected alive messages are not received by the client, the client (in addition to initiating any internal connection related recovery) will again repeat the process outlined in FIG. 16 in order to again become registered. Alive messages may not be received by the client for a number of reasons including, for example, failure of the CMS (e.g., power failure), failure of the originating switch, or failure of any of various links.

Importantly, the client address/location table provides the CMS with a one-to-one mapping between a client supplied address and the network location (i.e., switch and port number). This information may be used by the CMS to provide services to clients. For example, client C1 may notify the CMS it wishes to establish a call between itself and client C8. However, client C1 may be unaware of client C8 's hardware address and may only be aware of its logical address. Assuming client C8 has registered with the CMS with its logical address, the CMS can facilitate set-up of a call between client C1 and client C8 based on the provided logical address. Thus, client C1 does not have to be aware of the network address of client C8 in order to establish a call with client C8.

B. CRR and CRA Formats

FIGS. 15(*a*) through 15(*f*) are useful for describing the various formats of the CRR and CRA messages. FIG. 15(*a*) provides the general format for the CRR and CRA messages. The messages each include the standard ATM cell header and an information field 102. The information field 102 comprises 4 areas: (1) a protocol discrimination field 1502; (2) a message header area 1503; (3) a message body 1504; and (4) an unused area 1506 (reserved for future use). This general message format is also used for other message types (for example, messages associated with hunt groups which will be described in greater detail below). Therefore, the protocol discriminator field 1502 designates the message as a dynamic client discovery message. The message header 1503 is further divided into five fields: (1) a message type field 1512; (2) an operation type field 1513; (3) a status field 1514; (4) a transaction field 1515; and (5) a protocol version number field 1516. It is noted that this same header format is used in other messages as will be described below.

Figure 15A:
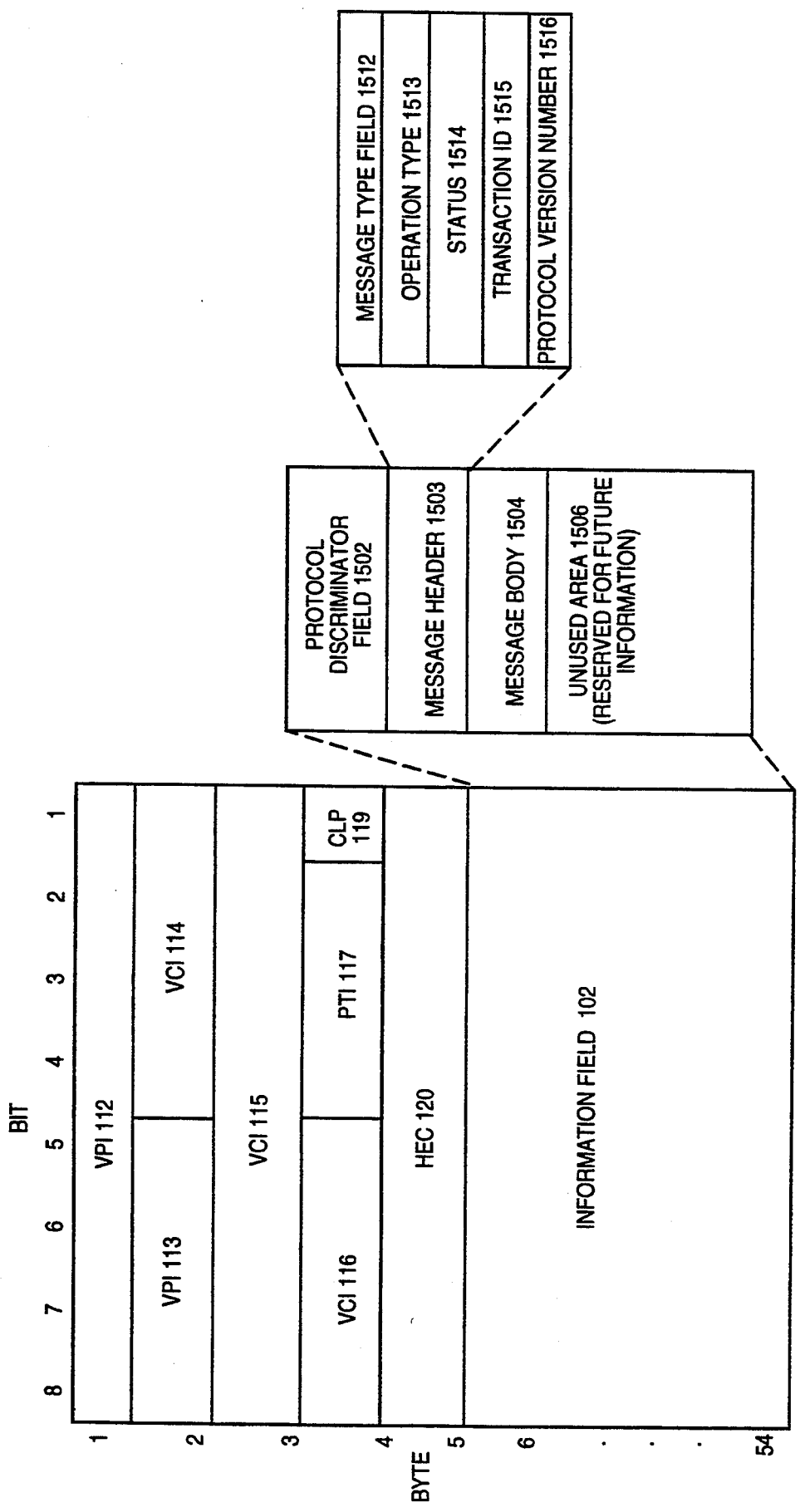
FIGS. 15(a) through 15(f) are useful for illustrating the format of client registration requests and client registration acknowledgements in the described system.
Figure 15B:
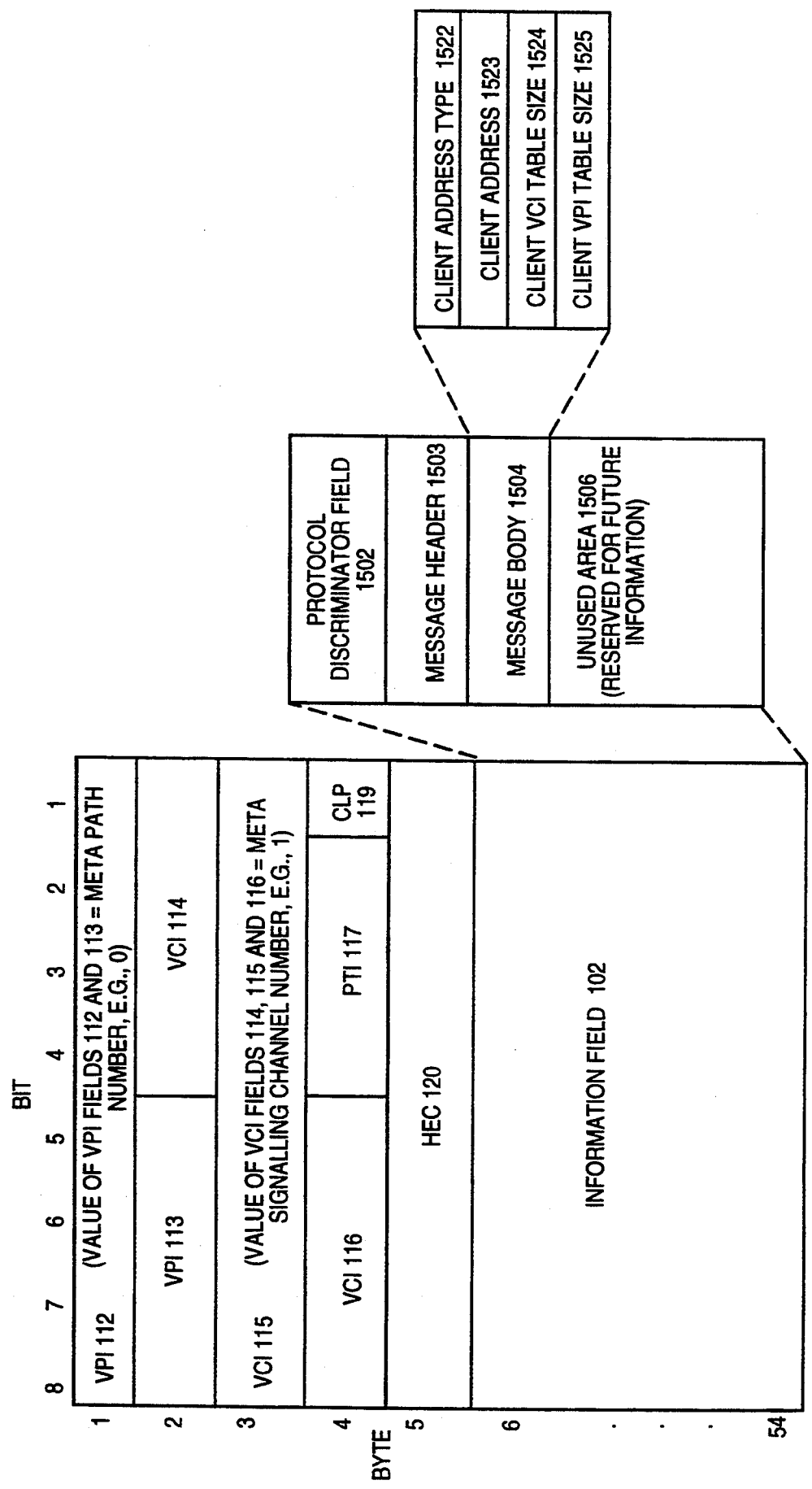

FIG. 15(b) further describes the message format of CRRs as transmitted by clients. As was discussed above in connection with FIG. 16, the client transmits the CRR over the meta-signalling channel by setting the value of VPI fields 112 and 113 to a meta-path number (e.g. 0) and by setting the value of VCI fields 114, 115 and 116 to a meta-signalling channel number (e.g., 1). The information field is defined as was discussed in connection with FIG. 15(a). In the case of a CRR message, the message body is defined to have four fields: (1) a client address type field 1522; (2) a client address field 1523; (3) a client VCI table size field 1524; and (4) a client VPI table size field 1525. The client address type field 1522 identifies the particular type of client address being transmitted (e.g., IP address, DECnet, AppleTalk, etc.). The client address field 1523 provides the transmitting client's address. If a client has multiple addresses, all of the addresses may be included in alternative formats of the CRR. Client VCI and VPI table size information is provided to allow the CMS access to resource availability information at the client. In other embodiments, additional resource information may also be provided.

Figure 15C:
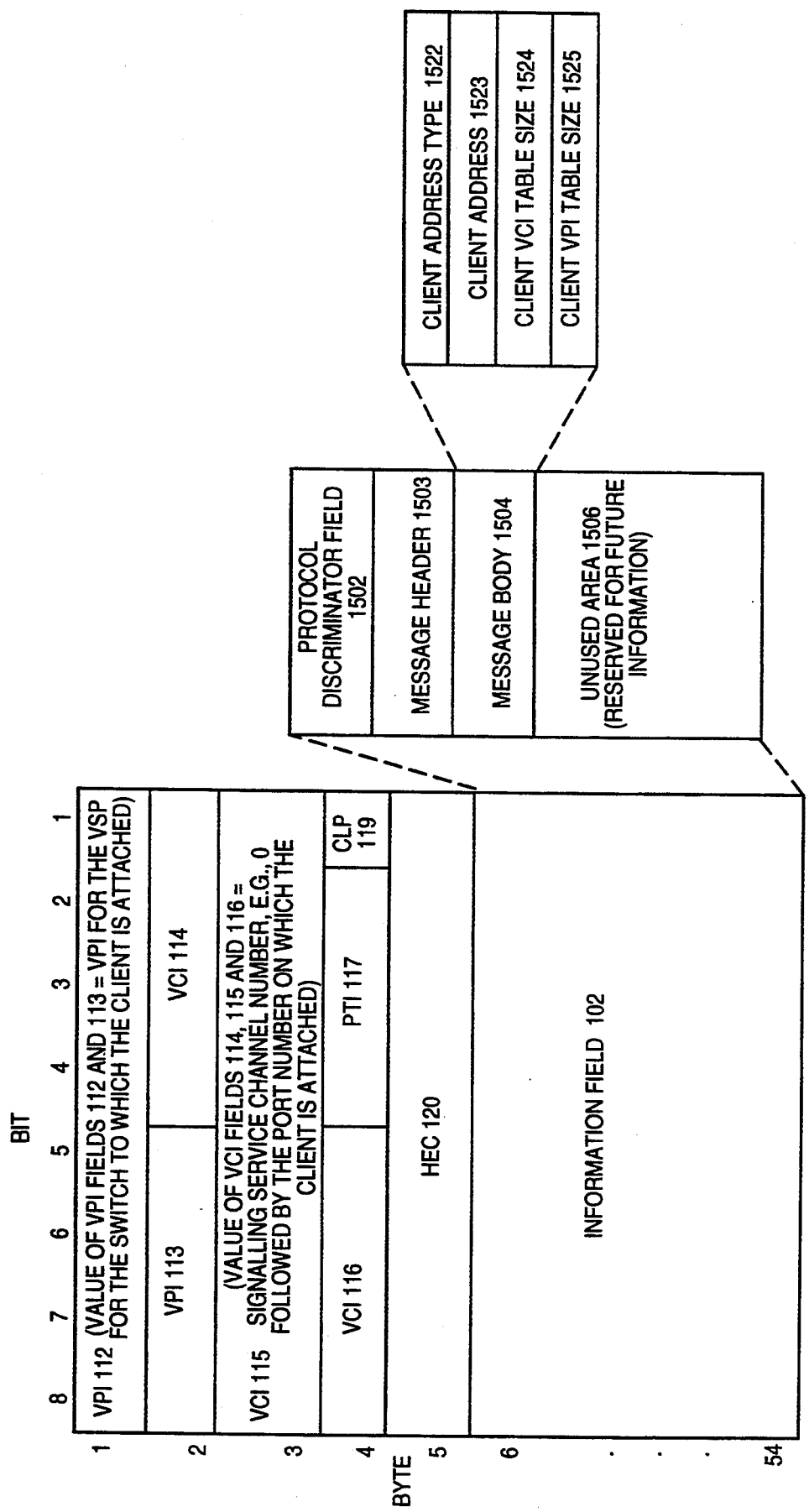

FIG. 15(c) illustrates the format of the CRR as it is forwarded by the originating switch. As can be seen, the VPI value is altered by the originating switch's switch fabric to designate the VSP of the originating switch and the VCI field is altered, again by the originating switch's switch fabric, to designate the signalling service channel (channel 0) and the port on which the CRR arrived. Importantly, the information area 102 remains unaltered and the orginating switch's controller is not required to intervene in switching the cell through the switch.

Figure 15D:
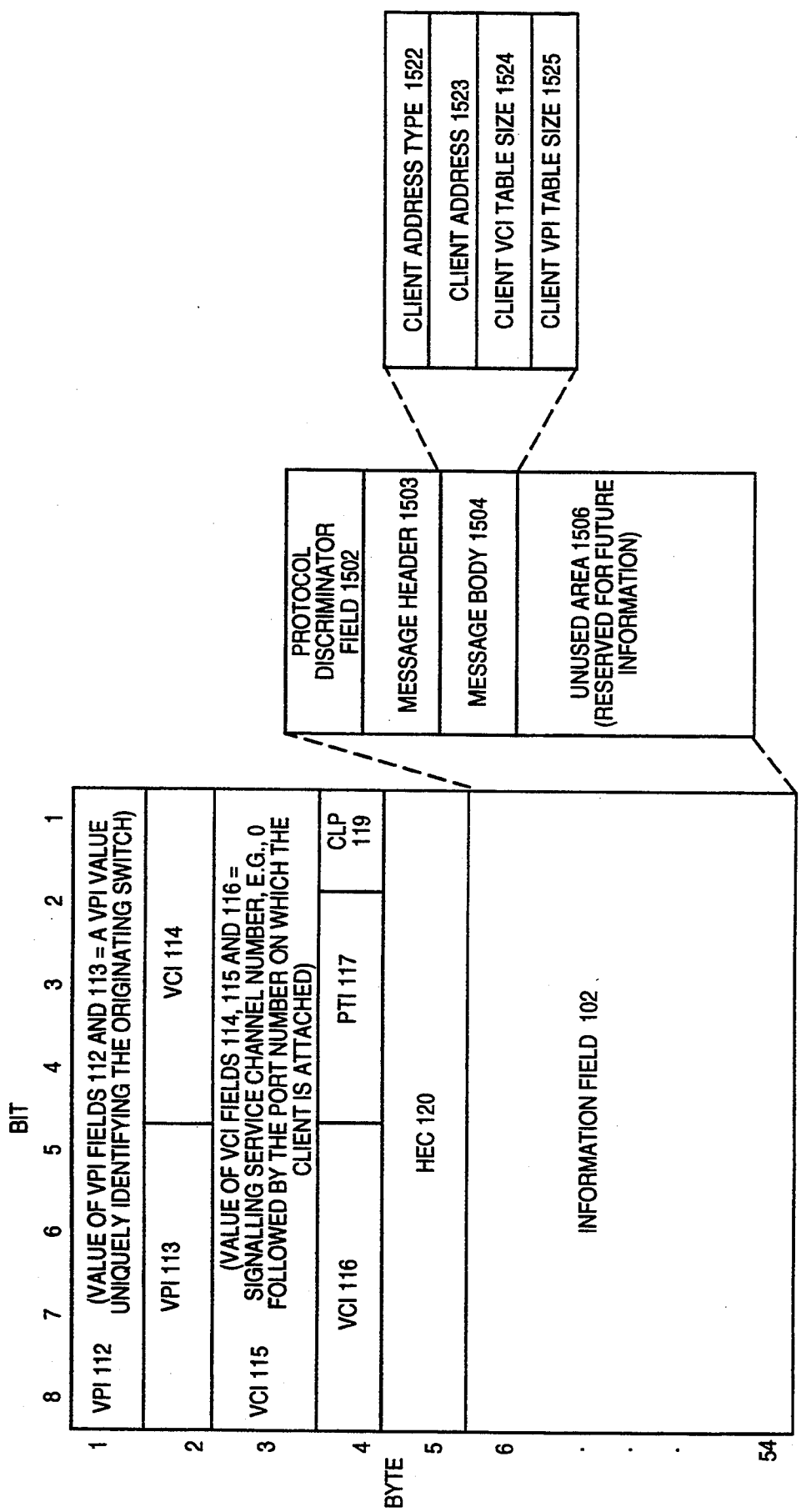

FIG. 15(d) illustrates the message as it is transmitted from the master switch to the CMS. As can be seen, there VPI is translated by the master switch's switch fabric to a value identifying the originating switch, but the message is otherwise unchanged.

Figure 15E:
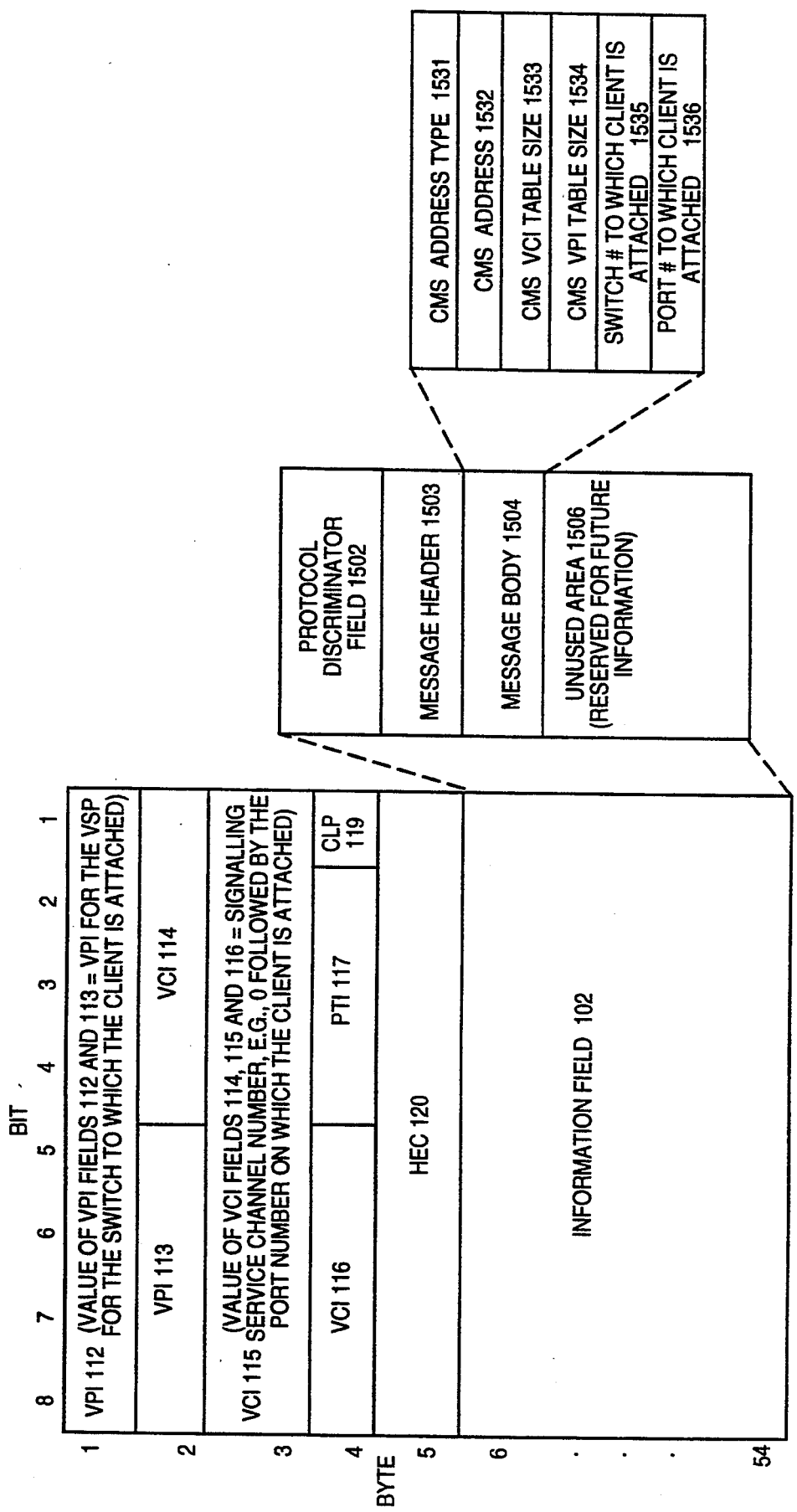

FIG. 15(e) illustrates the client registration acknowledgement (CRA) message as it is transmitted from the CMS. The header indicates, in the VPI fields, the VSP of the originating switch and, in the VCI fields, the signalling service channel number and the port on which the client is attached. The message body 1504 includes six fields: (1) a CMS address type field 1531; (2) CMS address field 1532; (3) CMS VCI table size field 1533; (4) CMS VPI table size field 1534; (5) switch number to which the client is attached 1535; and (6) port number to which the client is attached 1536.

Figure 15F:
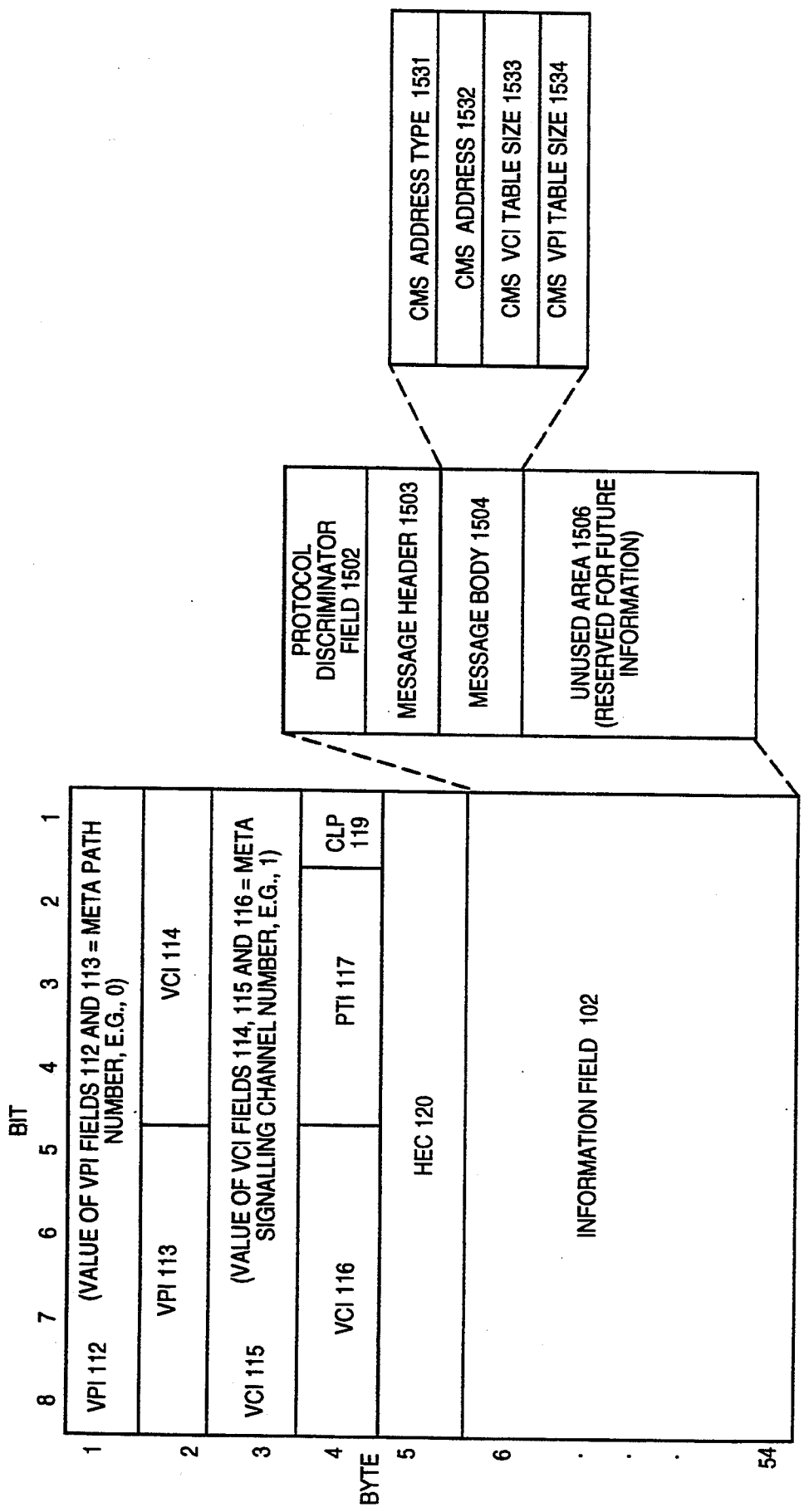

FIG. 15(f) illustrates the CRA as it is presented to the client. It is noted that the VPI value has been translated by the originating switch's switch fabric to indicate the meta-path number (e.g., 0) and the VCI field has been translated to indicate the meta-signalling channel (e.g., 1). The CMS's VCI and VPI table size information is provided to allow the client to know the switching capability of the system. Other information may also be provided in future embodiments.

It might now be noted that the formats just described in connection with FIGS. 15(a)–(f) may involve information exceeding the 48 byte maximum allotted for ATM cells. Therefore, the messages may be segmented, transmitted as multiple cells, and reassembled. In the described implementation, this is done in accordance with ATM Adaption Layer 5 (AAL5). Of course, segmentation and reassembly with other techniques, such as use of other AAL models, may be utilized without departure from the spirit and scope of the present invention.

C. Illustration of Dynamic Client Discovery

Figure 14:
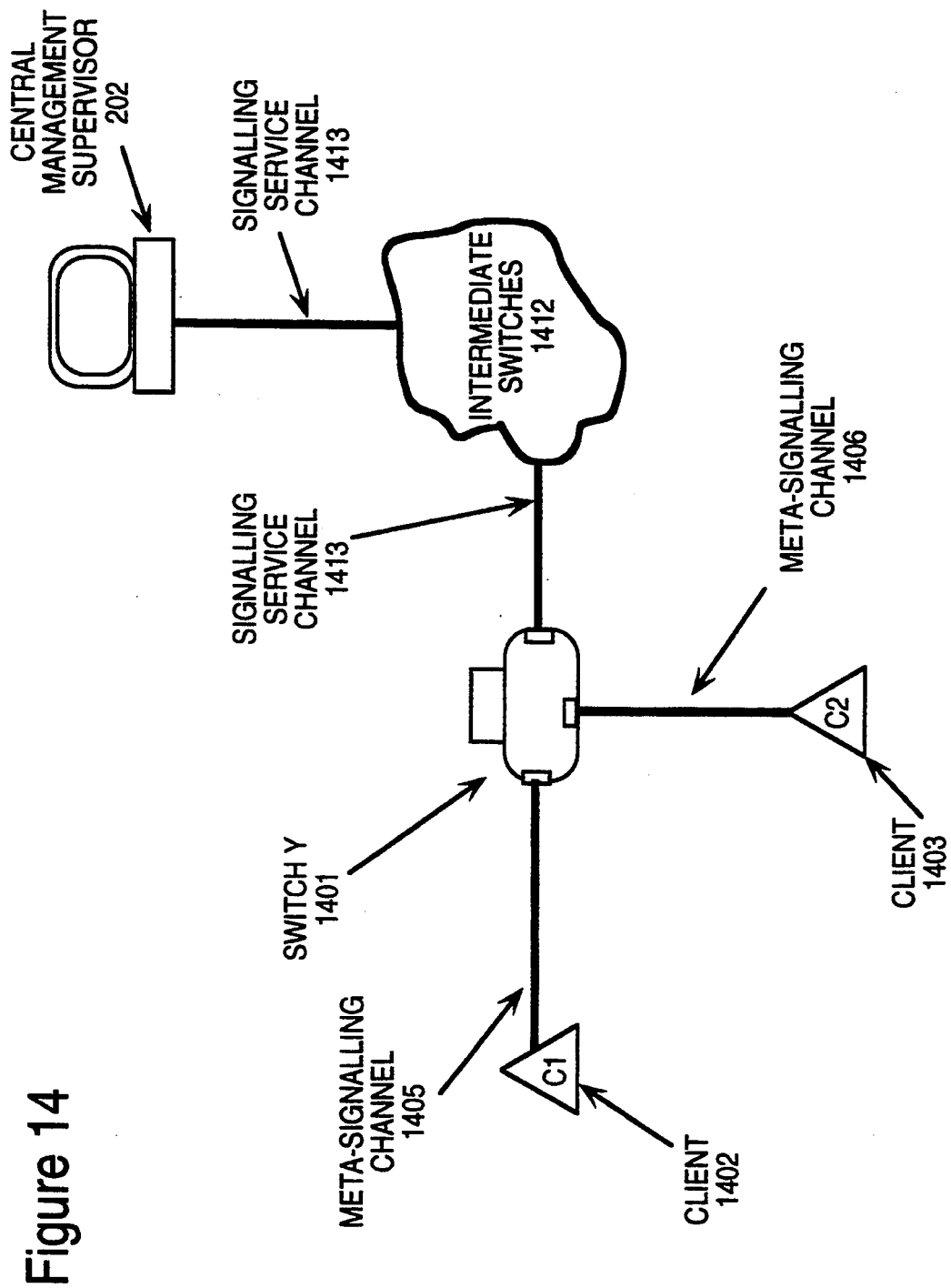
FIG. 14 illustrates transmission of client registration messages in the described system.

FIG. 14 is useful for providing further illustration of dynamic client discovery. Assume that switch Y is active and a VSP has been established for it including signalling service channel 1413. As is illustrated, the VSP may pass through intermediate switches (including a master switch) before reaching the CMS 202.

Client C1 1402 is then attached to switch 1401 and achieves registration by transmitting CRR messages and receiving a CRA message over meta-signalling channel 1405. Client C2 1403 is also attached to switch 1401 and achieves registration by transmitting CRR messages and receiving a CRA message over meta-signalling channel 1406.

Assume that client C1 1402 has provided its logical address as "C1" and client C2 1403 has provided its logical address as "C2". Further assume that client C1 1402 is attached to port 1 of switch Y 1401 and client C2 1402 is attached to port 2 of switch Y 1401. The CMS may then store information providing a one-to-one correspondence between the logical addresses of the clients and their network physical attachment in a client address/location table such as illustrated below:

| Logical Address | Switch Module | Port |
| --- | --- | --- |
| C1 | Y | 1 |
| C2 | Y | 2 |

The above logical address column may represent, for example, a DECnet address. Additional columns may be added to the table to provide for other address types, e.g., AppleTalk.

Based on the information made available to the CMS through this process, it is possible to now display a graphical representation of the network, including the topology of the network using the information obtained through the autotopology scheme described above and the clients attached to the network including their logical and physical addresses.

VI. FORMATION OF HUNT GROUPS

In order to provide for increased reliability and service redundancy, among other advantages, the described system provides for the concept of hunt groups. Membership in a hunt group may be based on one or more of a number of different criteria—namely, membership can be based on the client's address, service type, and/or resource type. The concept may be generally thought of as a process wherein a client registers as a member of a particular hunt group. Then, when the CMS attempts to set up a connection to that client, if the client is busy, urnreachable (e.g., been removed from the network), or otherwise can't service the particular request, the call is redirected, transparent to the requesting client, to an alternative member of the hunt group. It is noted that this concept could be readily extended, for example to provide load-balancing among resources such as amongst a group of servers in a network.

Importantly, it is thought that the concept of hunt groups will have application outside of centrally managed ATM networks certainly in other networks having a central management of resources and potentially even in shared-access non-centrally managed networks.

It might be noted here that a concept referred to as hunt groups is known in the telephone art. As it is understood, a plurality of telephone lines (numbers) are accessed, typically in a round robin fashion, responsive to callers dialing a single telephone number. Importantly, this concept, while similar in name, is distinguished for a number of reasons. For example, in the telephone art, the clients (phone lines) are understood to be grouped into hunt groups based only on their network addresses (phone numbers). Further, as is understood, the telephone art does not provide method and apparatus allowing clients to request to join and to withdraw from hunt groups dynamically.

As one example of use of hunt groups in the described system, it is possible provide for a set of multicast servers which are all members of a given hunt group. A client may then select the hunt group and gain access to an available multicast server.

A. Exemplary Network Employing Hunt Groups

Figure 17:
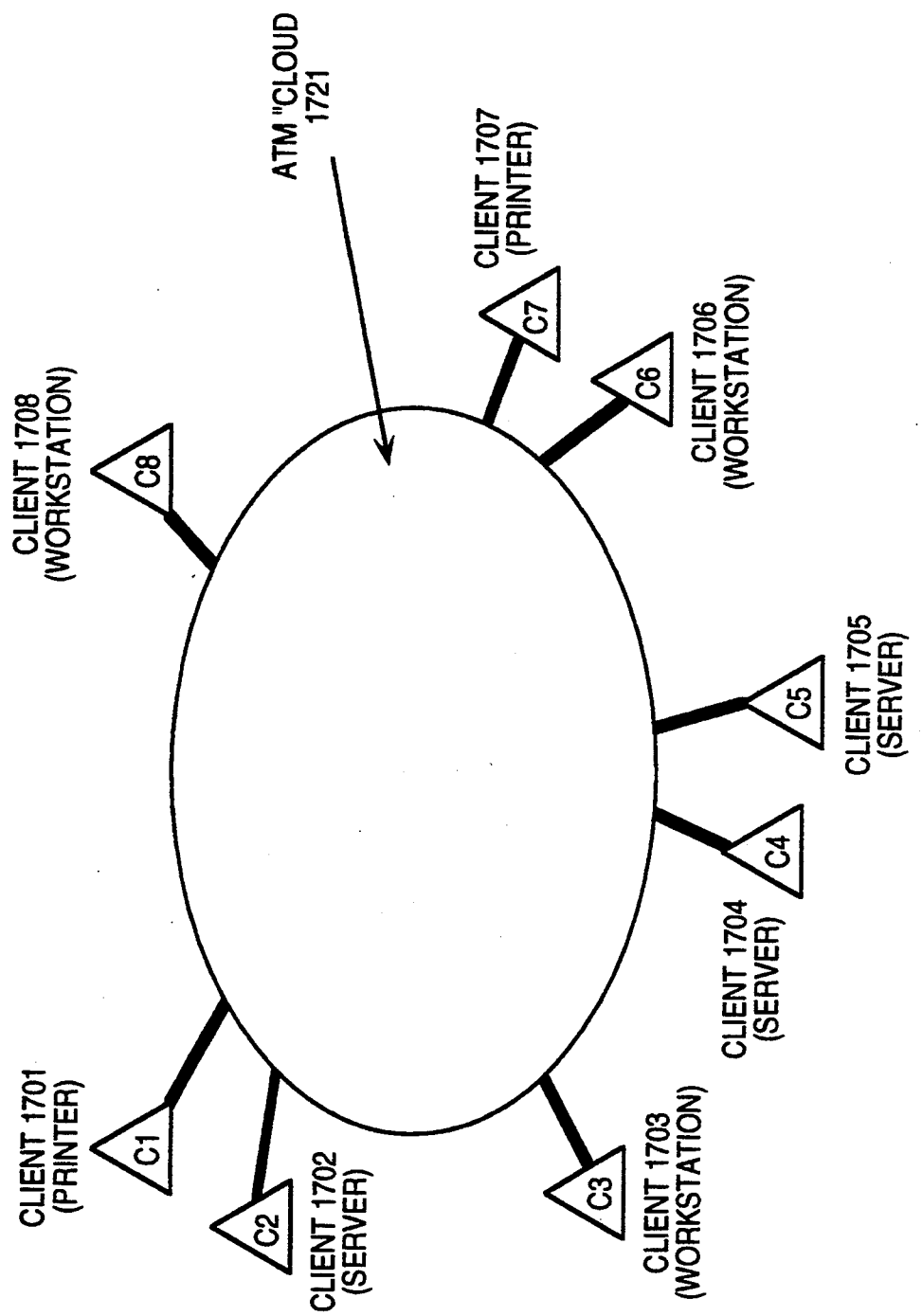
FIG. 17 is a diagram illustrating the concept of hunt groups as may be utilized in the described system.

FIG. 17 is useful for providing an overview of an exemplary network employing hunt groups. FIG. 17 illustrates a plurality of clients 1701-1708 coupled in communication with an ATM cloud 1721. In the illustrated network, clients C3, C6, and C8 (1703, 1706 and 1708, respectively) are workstations. These workstations may require access to various network resources, such as file servers, multicast servers and printers. Clients C1 and C7 (1701 and 1707, respectively) are printers and clients C2, C4 and C5 (1702, 1704 and 1705, respectively) are file servers. In this network, for example, a printer hunt group may exist and the various printers may join the printer hunt group and a file server hunt group may also exist. Assume that file servers C2 and C5 (1702 and 1705) are used to store identical copies of applications software and various databases, while server C4 1704 stores other information unique to it. In this case, file servers C2 and C5 8 may both choose to join a common hunt group. In this way, for example, if workstation C3 1703 attempts to print by requesting access to printer C1 1701 and printer C1 1701 is busy, the CMS may route the call to printer C7 1707. (It might be noted that it will be useful in this case for the CMS to notify workstation C3 1703 of the rerouted call so that the user at workstation C3 1703 may be made aware of the rerouted print job.) Similarly requests for access to file server C2 may be rerouted, transparent to the requesting client, to file server C5.

B. Use of VSPs to Facilitate Setup of Hunt Groups

Figure 18:
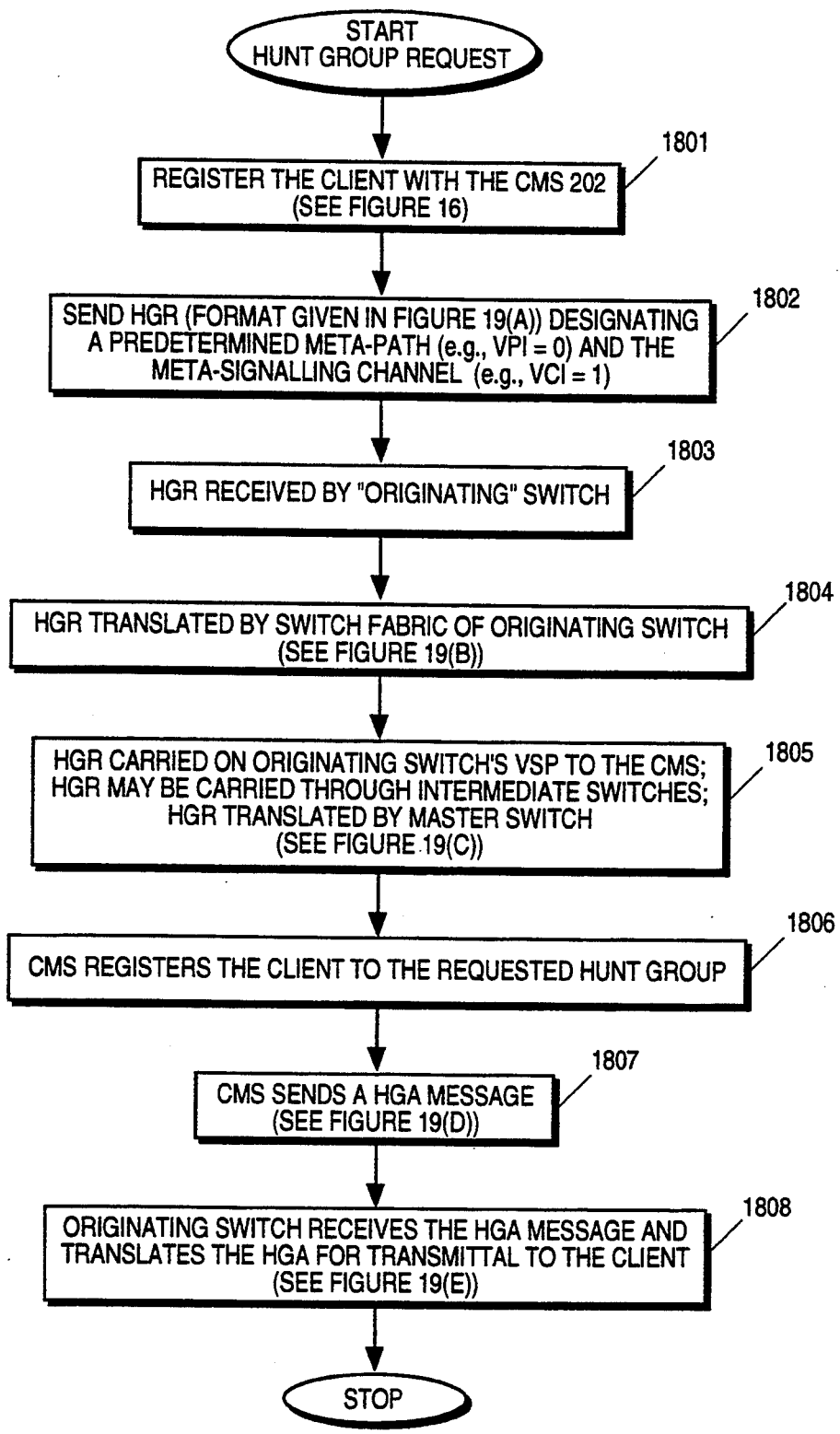
FIG. 18 is an overall flow diagram illustrating the hunt group registration process of the described system.

Importantly, the previously introduced VSP concept is useful for set up of hunt groups. (However, it is noted that alternative embodiments may utilize the described system's concept of hunt groups without use of VSP and without departure from the spirit and scope of the present invention.) The process of adding a client to a hunt group is explained in greater detail with reference to FIG. 18. First, in the described embodiment, the client must be registered with the CMS 202 as was described in connection with FIG. 16, block 1801.

It might be noted that, in an alternative embodiment, hunt group registration may take place as part of client registration, for example, by including a request to be included with a particular hunt group with the original CRR message.

It is also noted that the described process of registering for a hunt group is similar to the process for registering a client initially. This illustrates one of the significant features of the described system in that, once the VSP concept is established, various services may become available relatively readily in the network. Due to the similarities, the below description of the process for registering with a hunt group will be kept relatively brief and reference is made to the description of FIG. 16 for additional details. It might also be noted that the formats for transmission of hung group request (HGR) messages and hunt group acknowledgement (HGA) messages, given in FIGS. 19(a) through 19(e), are similar to the formats described in connection with client registration request (CRR) messages and client registration acknowledgement (CRA) messages given in FIGS. 15(b) through 15(f). Therefore, description of these figures will also be kept to a minimum and reference is made to the descriptions of FIGS. 15(b) through 15(0.

Figure 19A:
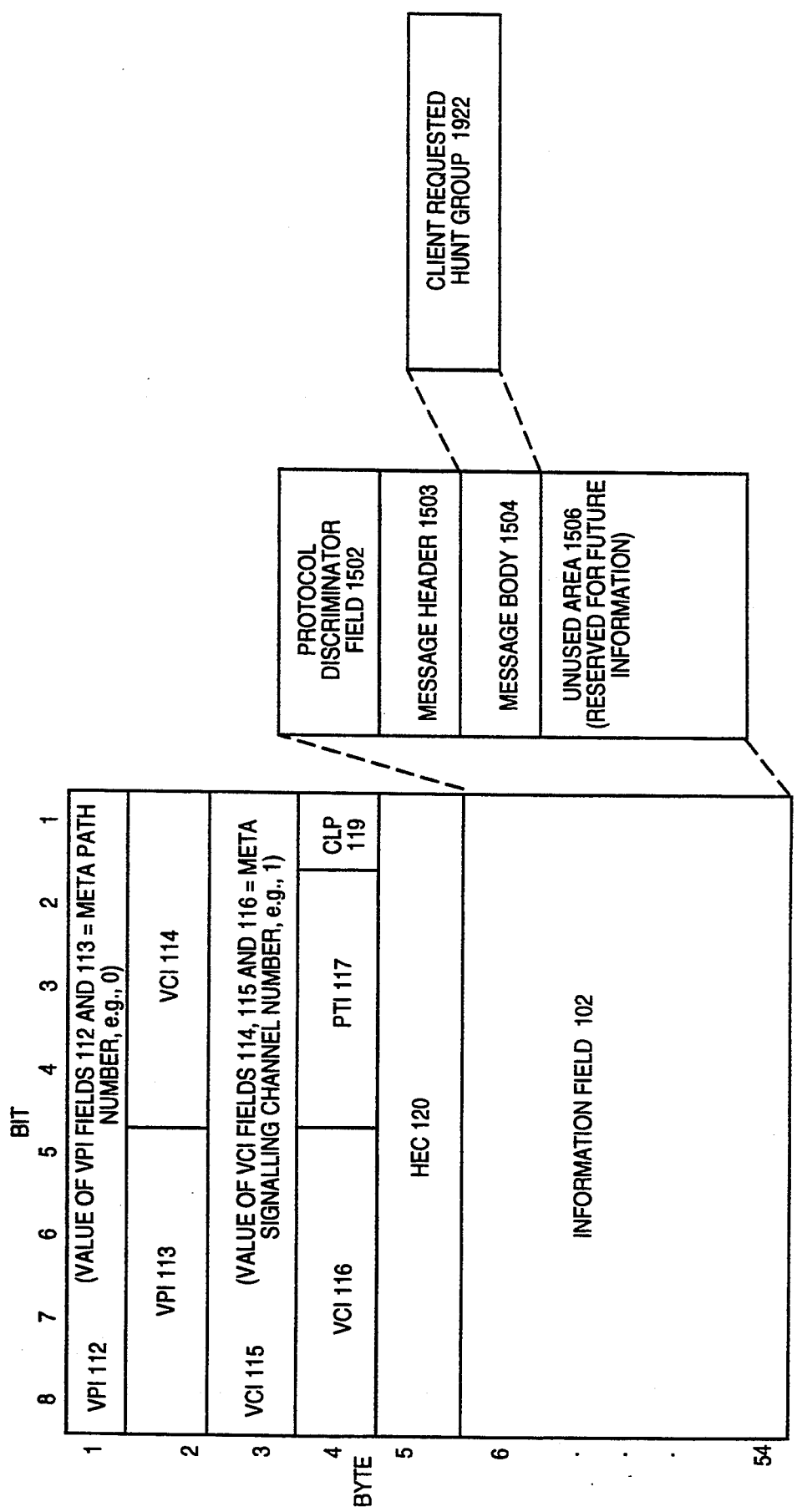
FIGS. 19(a) through 19(e) are useful for illustrating the format of hunt group registration requests and hunt group registration acknowledgements in the described system.
Figure 19B:
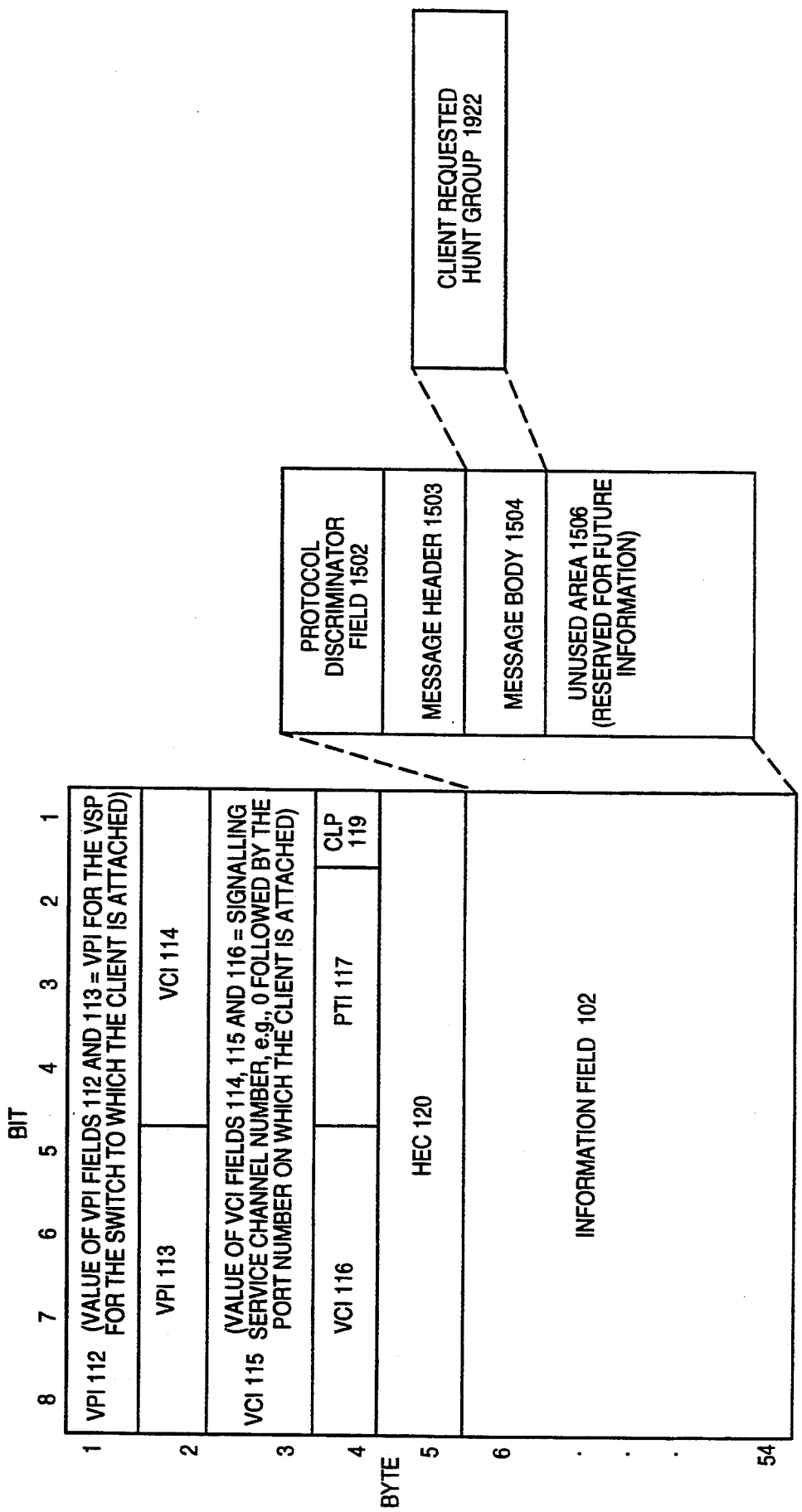
Figure 19C:
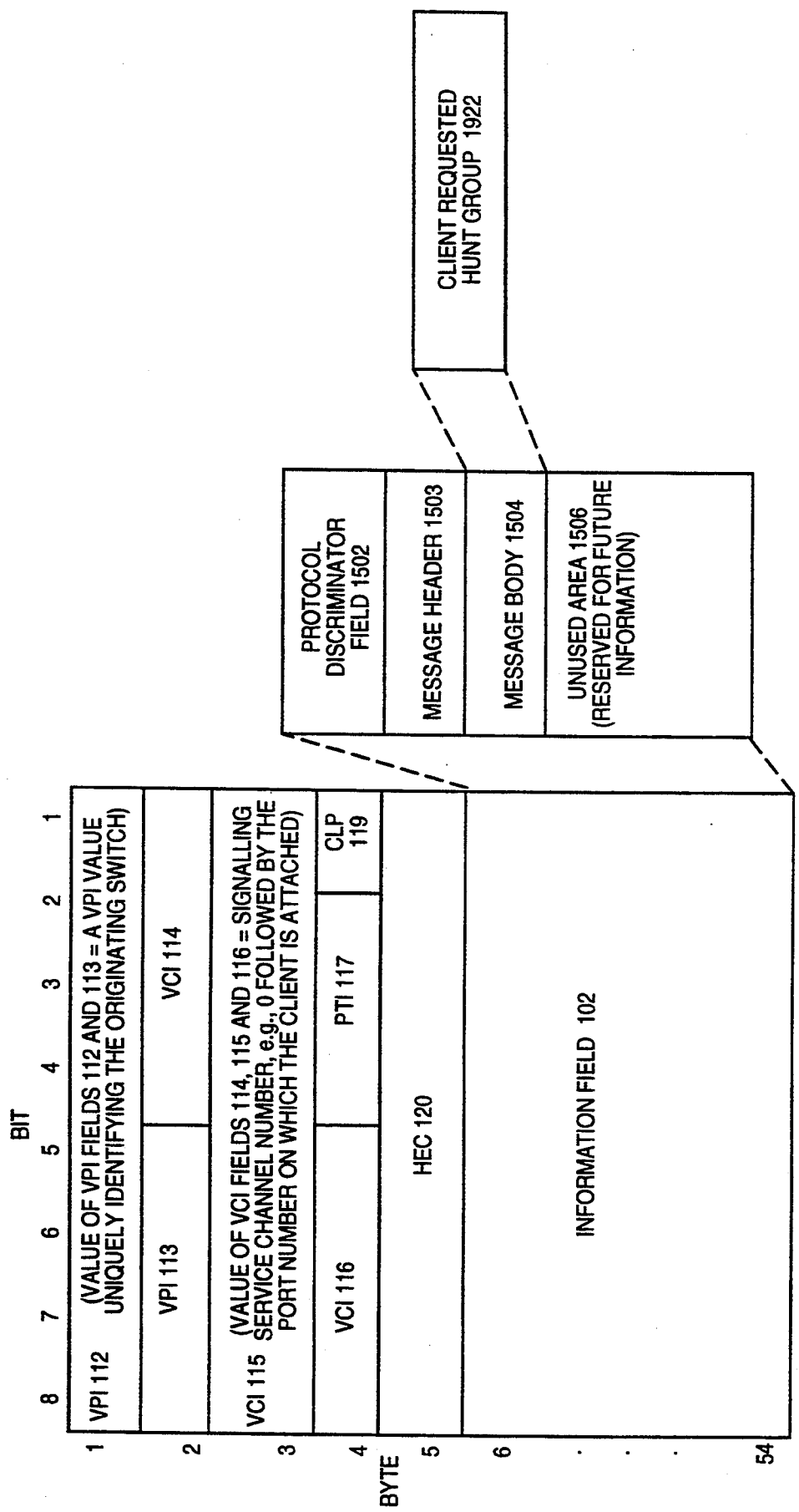
Figure 19D:
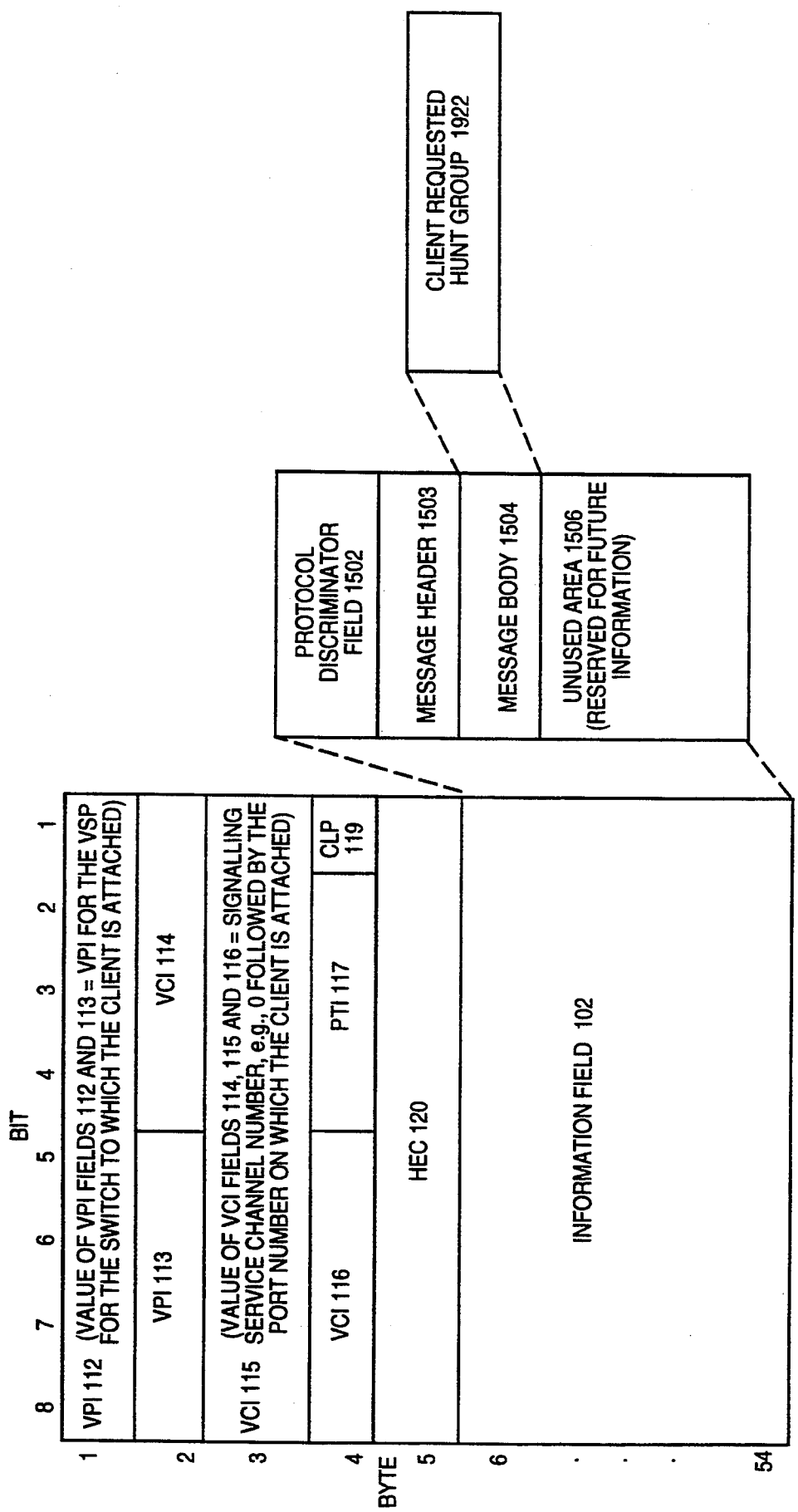
Figure 19E:
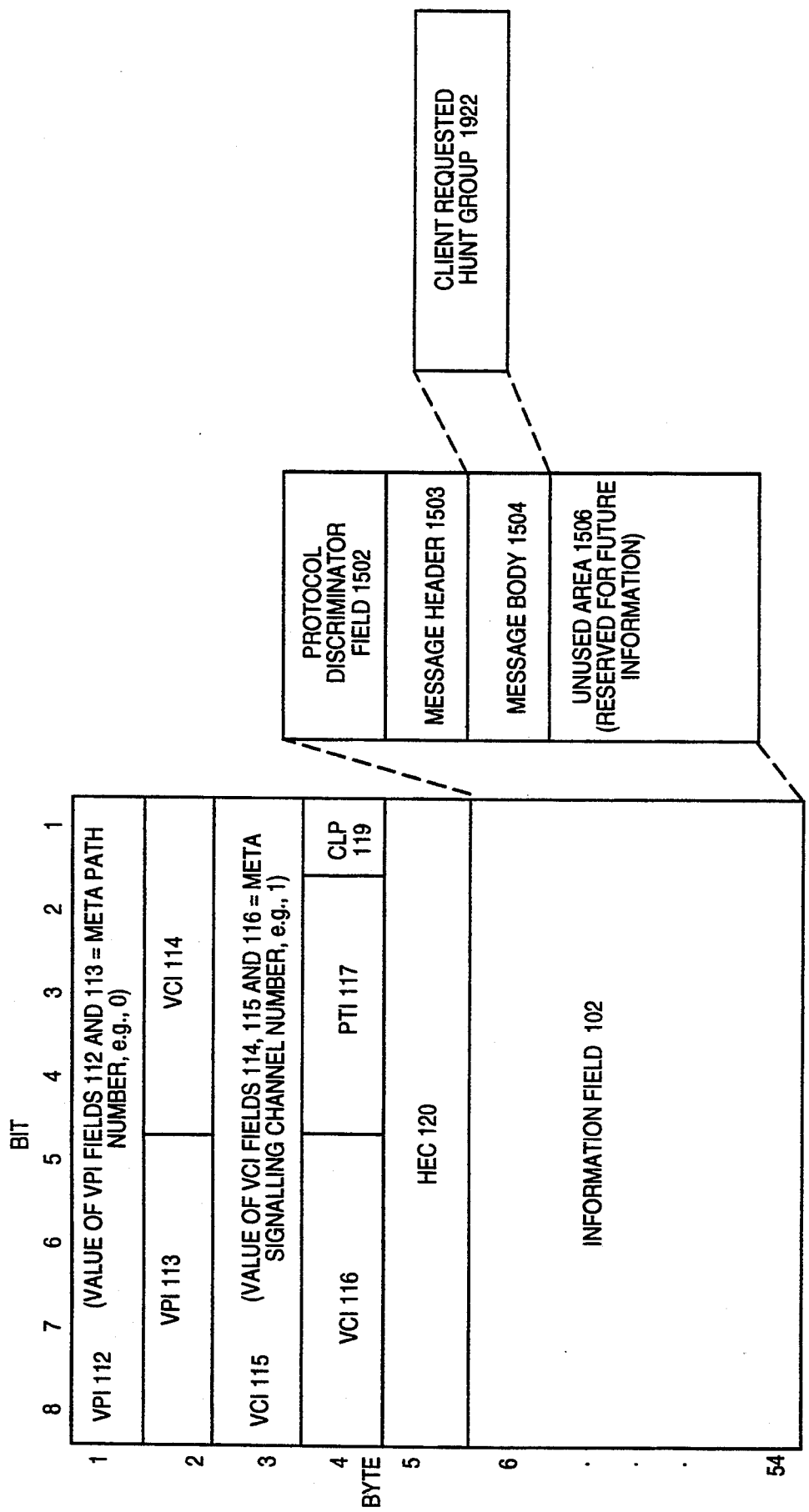

In any event, after registration of the client, the client may transmit a hunt group request (HGR), in the format given by FIG. 19(a), designating the predetermined meta-path and the predetermined meta-signalling channel, block 1802. The HGR is then received by the "originating" switch, block 1803, and translated by the switch fabric of the originating switch, block 1804. The HGR is then carried on the originating switch's VSP to the CMS, block 1805 and the CMS may register the client to the requested hunt group, block 1806. It might be noted that in some embodiments, the CMS may refuse registration of a client to a particular hunt group for various reasons, for example, due to security considerations or due to the client not being the correct type of resource.

In any event, assuming the CMS registers the client to the hunt group, the CMS sends a hunt group acknowledge (HGA) message, block 1807, and the originating switch receives the HGA message, translates the message, and forwards it to the client, block 1808.

Using this same method, a client may register in several hunt groups, if appropriate.

C. HGR and HGA Formats

FIGS. 19(a) through 19(e) are useful for describing the various formats of the HGR and HGA messages. As noted above, the format of these messages are similar to the formats of the CRR and CRA messages described above in connection with FIGS. 15(b) through 15(f), respectively. Significantly, the contents of the protocol discriminator field 1502 differ for hunt group messages from client registration messages in order to indicate the message is a hunt group message. In addition, the message body 1504 differs as illustrated, for example, by FIG. 19(a) which shows the message body 1504 to include a single field 1922 indicating the hunt group which the client is requesting to join. This same information is transmitted back to the client by the CMS in the acknowledgement message (see FIGS. 19(d) and (e)) in order to allow the client to identify which HGR message is being acknowledged (as noted above, a client can request membership in a number of hunt groups.)

The CMS maintains hunt group membership information. For example, in the described embodiment, the CMS maintains a hunt group table indicating the hunt group and physical address of registered clients. In the case of the network of FIG. 17, the table may contain the following information (assumes printer 1701 is coupled with switch Y, port 1; server 1702 is coupled with switch Y, port 2; server 1705 is coupled with switch Z, port 1; and printer 1707 is coupled with switch T, port 4):

| Hunt group | Switch Module | Port |
|---|---|---|
| Printer | Y | 1 |
| Server | Y | 2 |
| Server | Z | 1 |
| Printer | T | 4 |

VII. BOOTSTRAPPING OF ATM SWITCHES

The usefulness of virtual service paths (VSPs) have now been described in some detail. However, when an ATM switch is first powered up and/or connected with the network, the VSP needs to be established in order to allow multiplexing of the various services over the VSP. Further, when the ATM switch is first powered up and/or connected with the network, it requires boot code to be loaded from a centralized boot server.

A. Overview of the Bootstrapping Process

Figure 20:
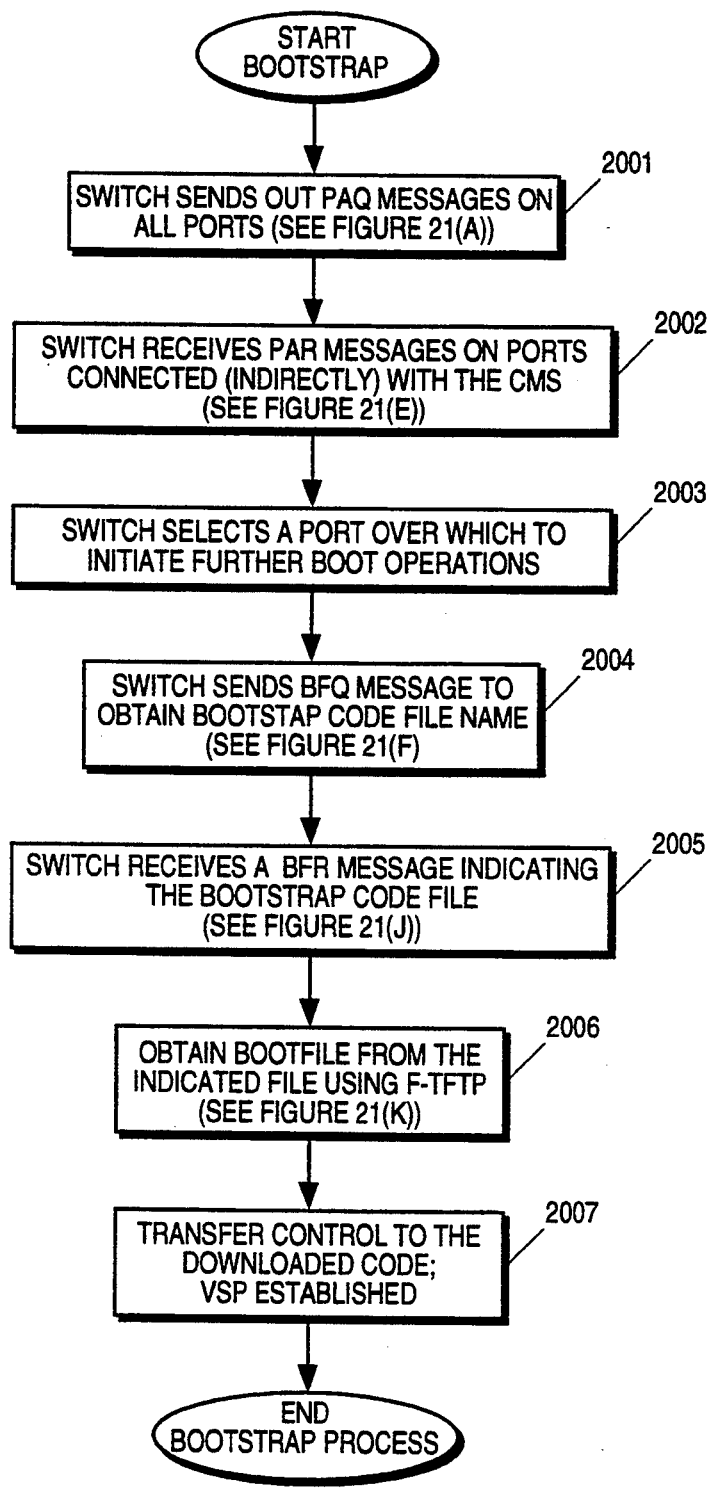
FIG. 20 is an overall flow diagram illustrating the bootstrapping process utilized by the described system.

FIG. 20 is useful for providing an overall flow diagram of the method of boostrapping utilized in the described system.

When a switch is first powered up (or when its power is restored after, for example, a power failure or when it is reconnected to the network after being disconnected for some reason), the switch begins sending out what will be termed path access query (PAQ) messages, block 2001. The format for the PAQ messages, as transmitted by the booting switch, is found with reference to FIG. 21(a). PAQ messages are transmitted over each of booting switches ports over the meta-topology channel and is received by neighboring switches (assuming there are any operational neighboring switches). The PAQ message is transmitted over the topology service channel of each of the neighbor switch's VSPs through the master switch to the CMS. The format for the messages transmitted by the neighboring switches is given by FIG. 21(b). The format for messages transmitted from the master switch to the CMS is given by FIG. 21(c).

In response to receiving each PAQ message, the CMS transmits a path access response (PAR) message onto the topology service channel of the neighbor switch. The format for the PAR messages as transmitted by the CMS is given by FIG. 21(d). This message is received by the neighbor switch and transmitted on the meta-topology channel to the booting switch using the format given by FIG. 21(d), block 2002.

It is worthwhile noting that, in alternative embodiments, some device other than the CMS may function to coordinate providing boot code to the booting switch. For example, a boot server may, in some embodiments, be implemented as an ATM device capable of communicating directly onto the ATM network. In such a case, the boot server may respond to the PAQ messages directly by transmitting PAR messages in response to receiving PAQ messages in a manner similar to what is described for the CMS. Therefore, the functions described herein for the CMS in relation to managing a boot code transfer may sometimes be referred to as a boot management. Further, the CMS when performing boot functions (and variations of the CMS such as a boot server directly providing boot management) may be referred to as a boot manager.

Transmission of PAQ and PAR messages in the network is better illustrated by FIG. 23(a) which shows a booting switch, Switch X 2301 transmitting PAQ messages to its neighbor switches (Switch Y 2302, Switch T 2303, and Switch Z 2304). Each of the various switches 2302 to 2304 transmit over their respective VSPs 2322 to 2324 through master switch 2307 to the CMS 202. Switch Y 2302, for example, transmits the PAQ message over its VSP 2322 through switch 2303 and through master switch 2307 to the central management supervisor. As has been discussed, this transmission occurs without the need for processing of the PAQ message by the neighbor switch or other intermediate switch except for the relatively fast processing which occurs by each switch's switch fabric (in other words, there is no need for intervention by the intermediate switch's controllers.)

The booting switch, after receiving the PAR messages on various ports (a PAR message will have been received on each port which is coupled to a booted neighbor switch), chooses a port to use for the rest of the boot process, block 2003. As will be described in connection with the description of the various message formats, given below, the PAR message includes a field titled CMS cost factor (field 2126) which may, for example, include the number of hops between the neighbor switch attached to the port on which the PAR was received and the CMS. This field is calculated and provided by the CMS based on its tables. It is noted that, although this information is provided to the booting switch, and the booting switch may use it as a factor or the factor in determining which port to use of booting operations, selection of the particular port for use is switch dependent. Any number of algorithms may be employed.

Importantly, the above procedure (i.e., transmission of PAQ/PAR messages) is also used to select a port for the switch's VSP. Therefore, this selection process has important performance implications. Of course, in alternative embodiments, the selection of this port may vary. For example, the CMS may keep track of the various PAQs received and respond only to the one on which the CMS directs the booting switch to use. It might be noted that although the same procedure is utilized for selection of the port for the boot channel as well as the port for the VSP, this does not necessarily imply that the same port will be utilized. There may, for example, be changes in network conditions between booting and establishment of the VSP. It might also be noted that the decision by the CMS may be based on inputs from, for example, a network management module.

In any event, after choosing a particular port, the booting switch transmits a boot file query (BFQ) message on the selected port, block 2004. This message is sent on the meta-boot channel in the format given by FIG. 21(f). The message is received by the neighbor attached on that port and is forwarded on the neighbor's boot service channel, in the format give by FIG. 21(g). The message is then received by the master switch and forwarded to the CMS in the format given by FIG. 21(h).

Responsive to receiving the BFQ message, the CMS uses the information provided in the message, including the physical address (field 2141), switch hardware version (field 2142) and switch software version (field 2143) to determine the correct boot code download file for the switch to use. The CMS then responds with a boot file response (BFR) message in the format given by FIG. 21(i) onto the neighbor's VSP boot service channel. The message includes the IP address of a boot server (field 2151) and a boot file name (field 2152). The message is received by the neighbor switch and forwarded on the meta-boot channel to the booting switch in the format given by FIG. 21(j), block 2005.

It might be noted that the boot file may reside on the same device which is executing the CMS or it may reside on another computer. In the described embodiment, and as illustrated by FIG. 23(a) and 23(b), the CMS is connected over an Ethernet link to other computers, including, for example, boot servers 2351, 2352 and 2353.

Figure 21A:
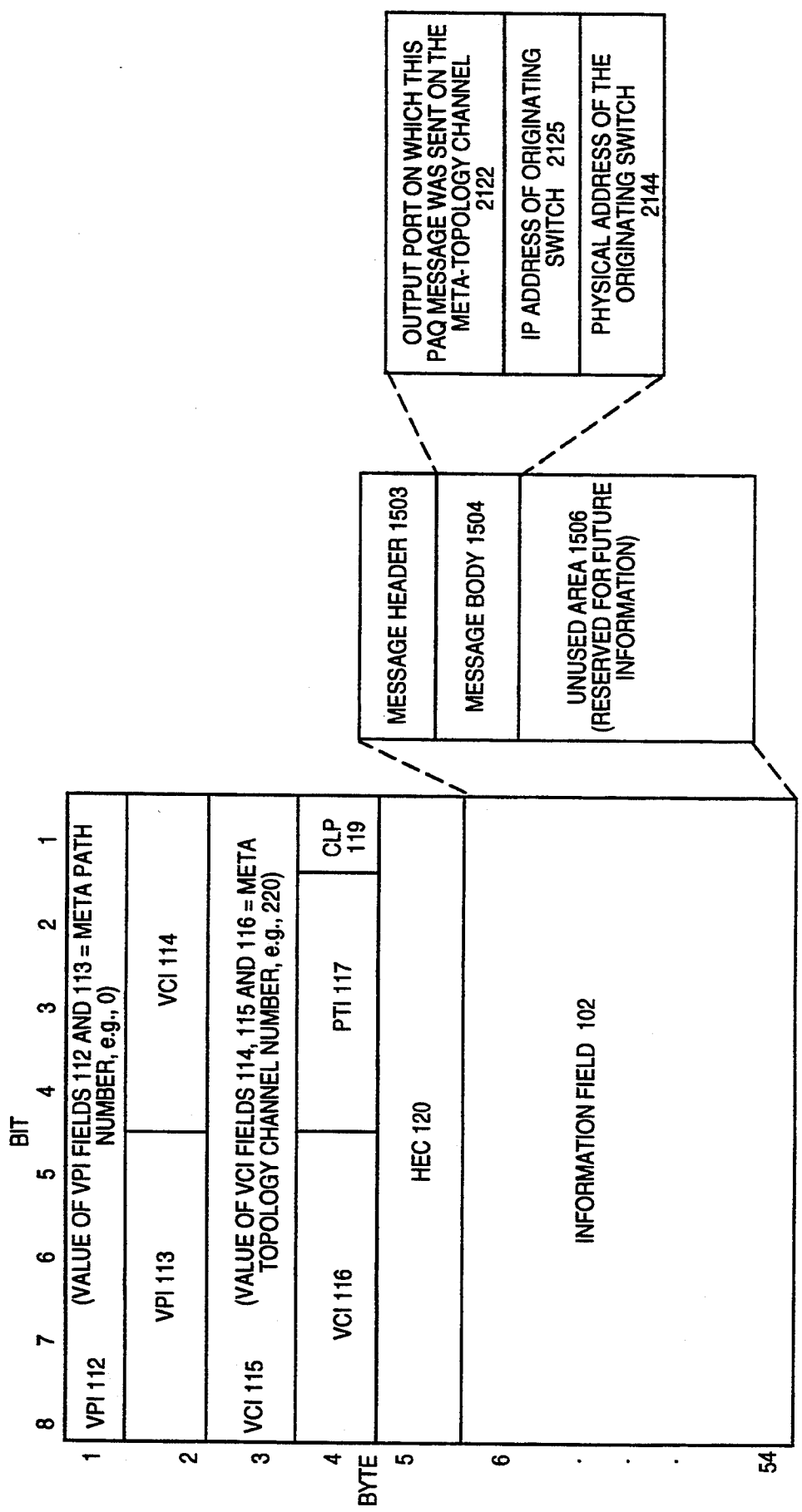
FIGS. 21(a) through 21(k) are useful for illustrating the formats of messages used for booting of switches in the described system.
Figure 21B:
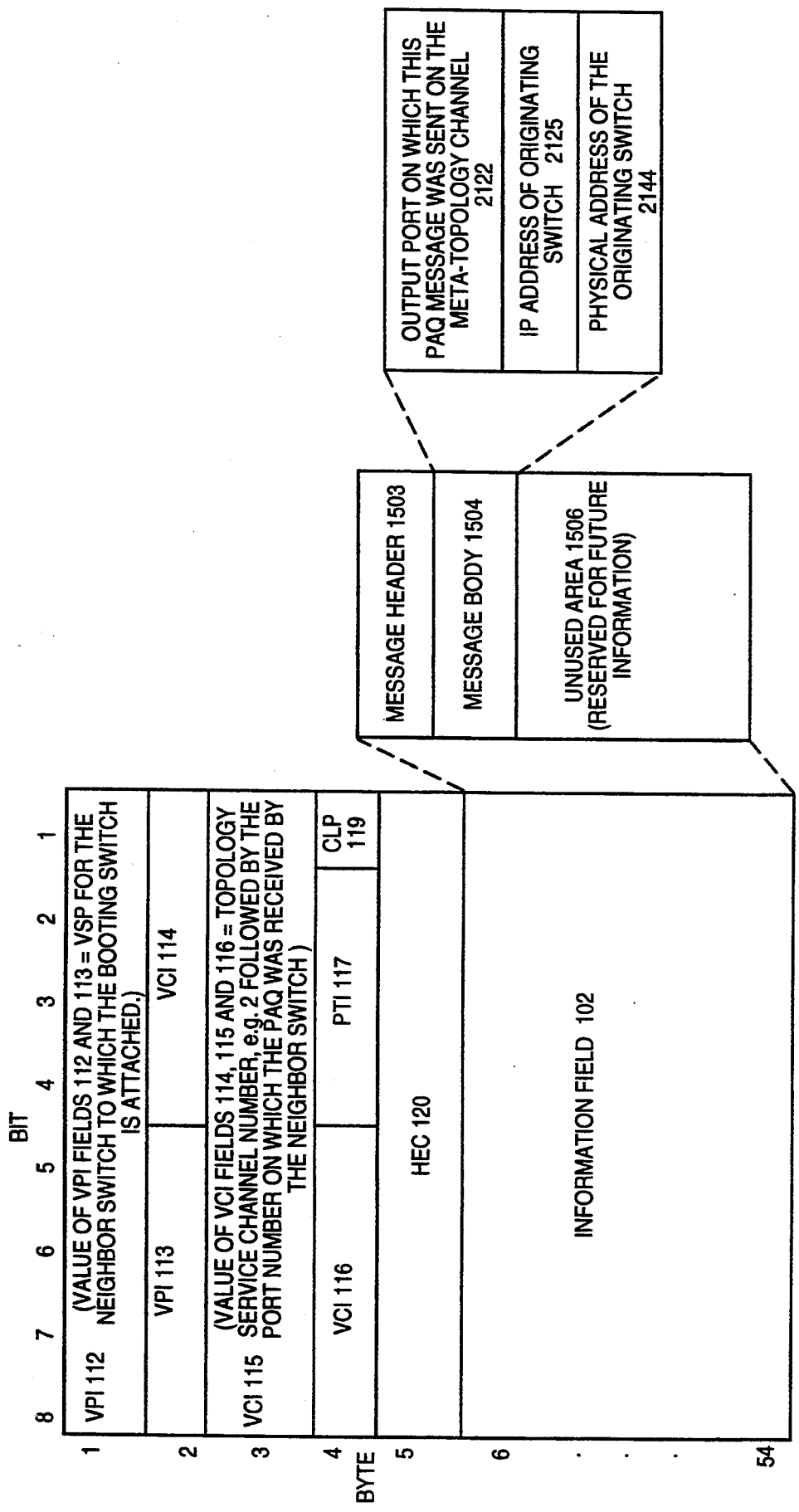
Figure 21C:
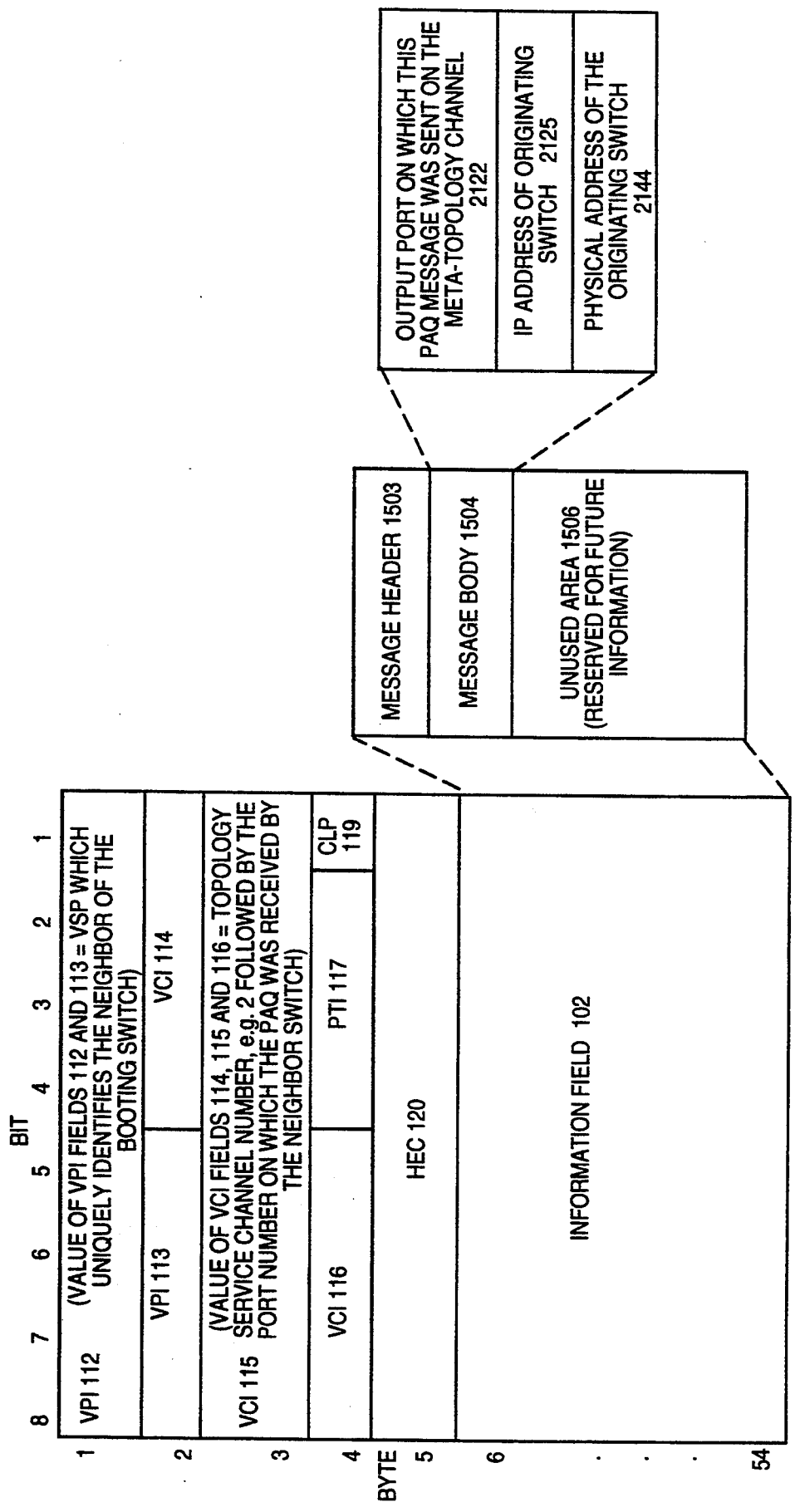
Figure 21D:
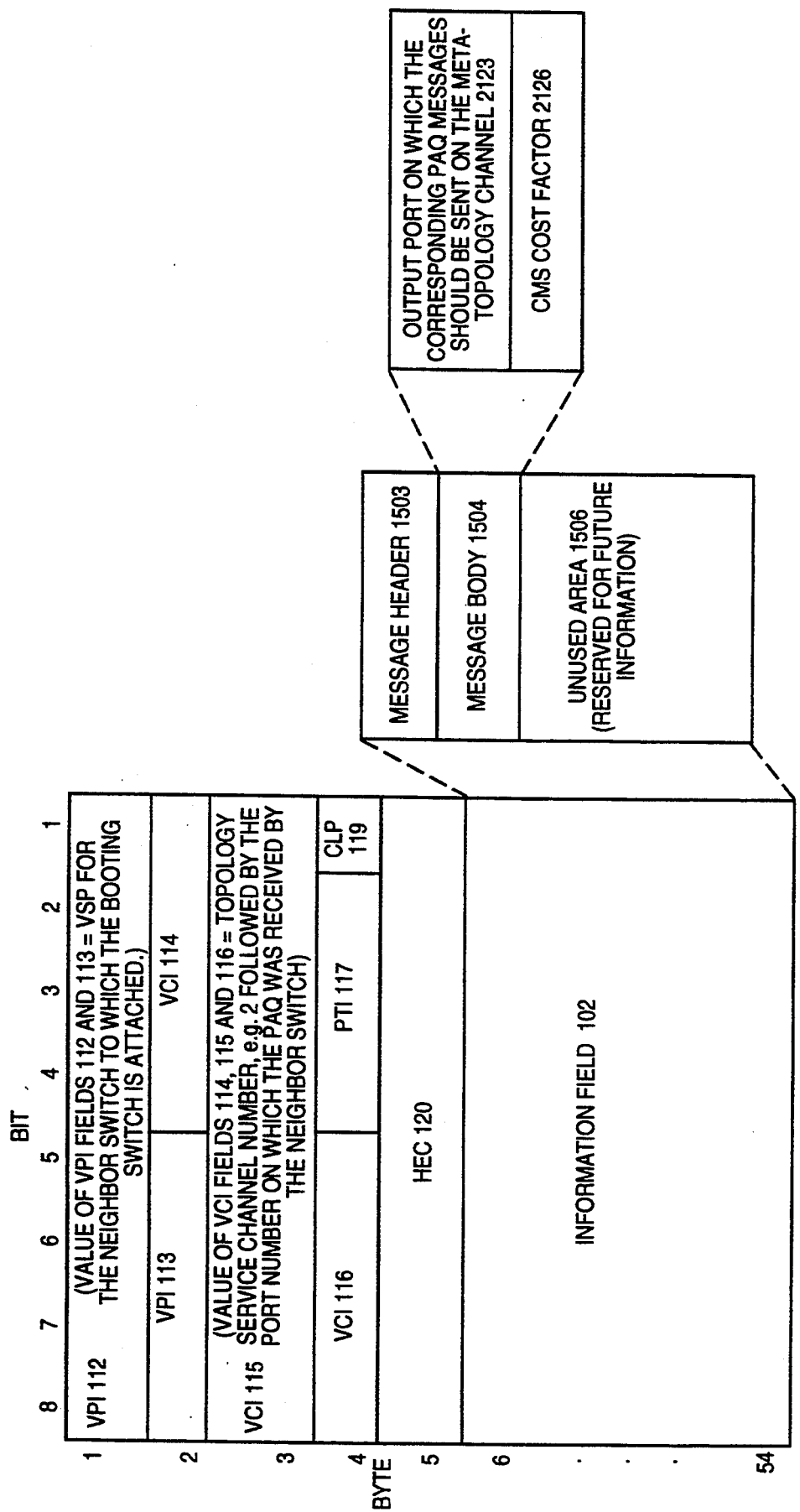
Figure 21E:
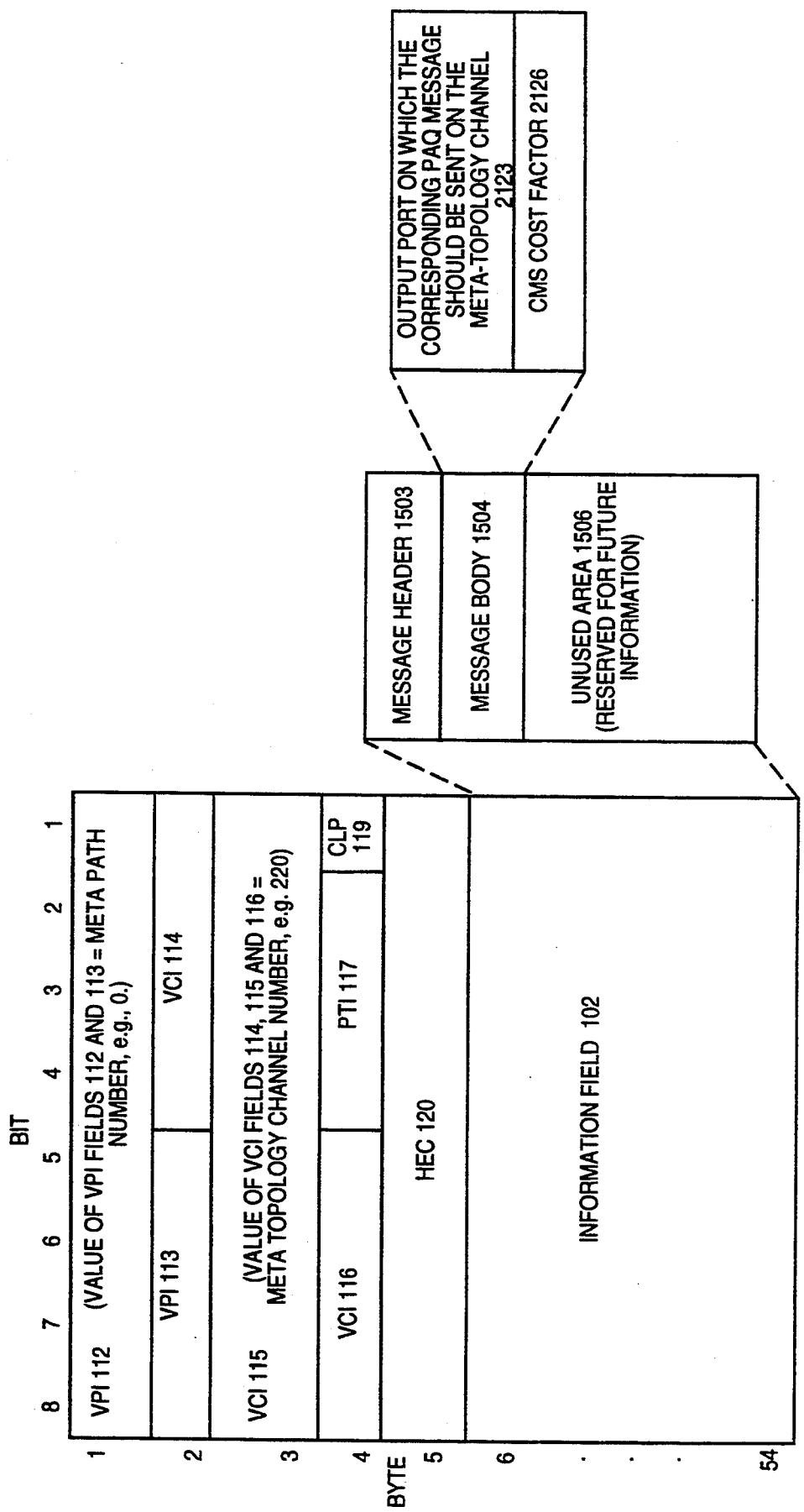
Figure 21F:
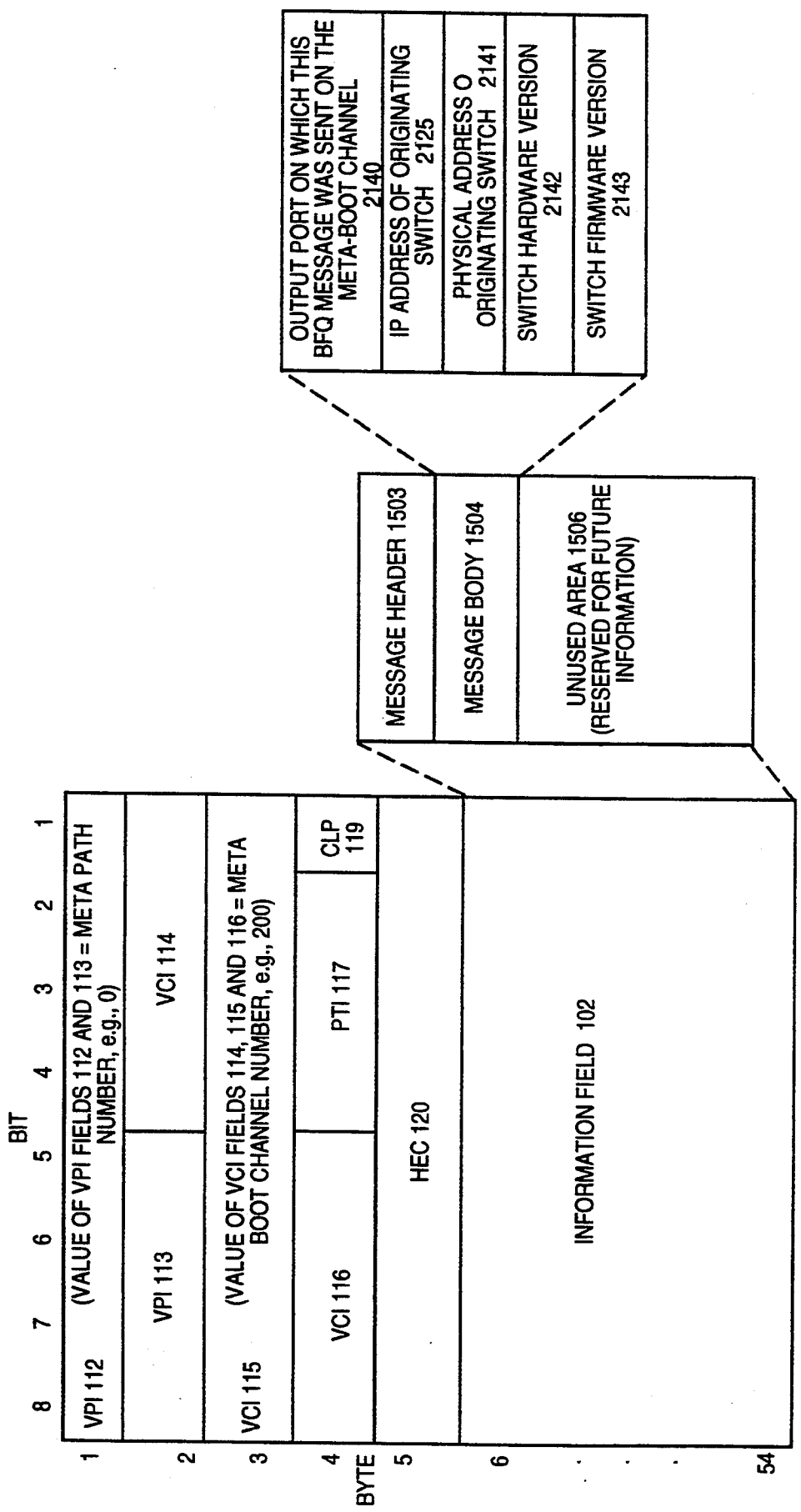
Figure 21G:
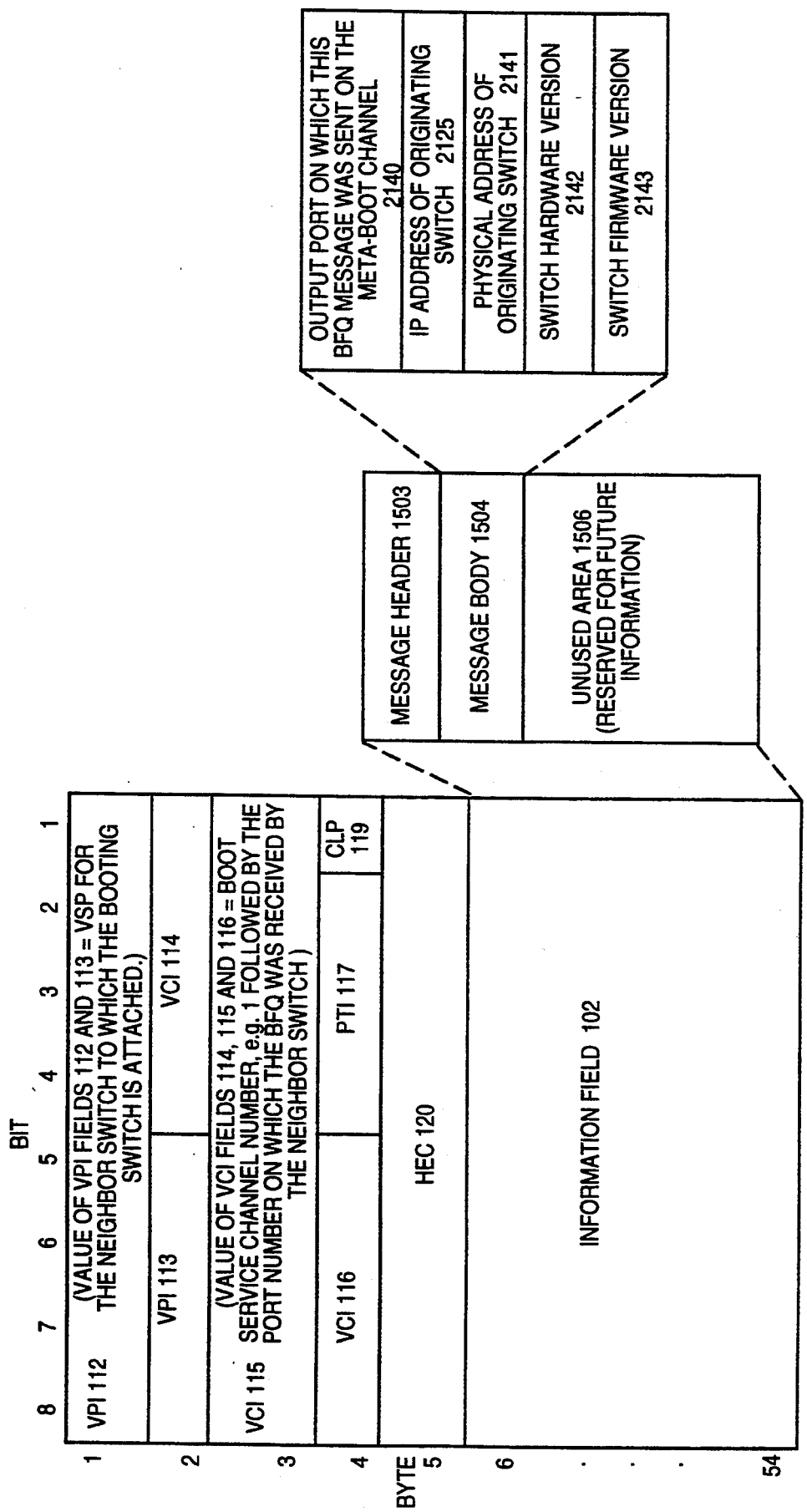
Figure 21H:
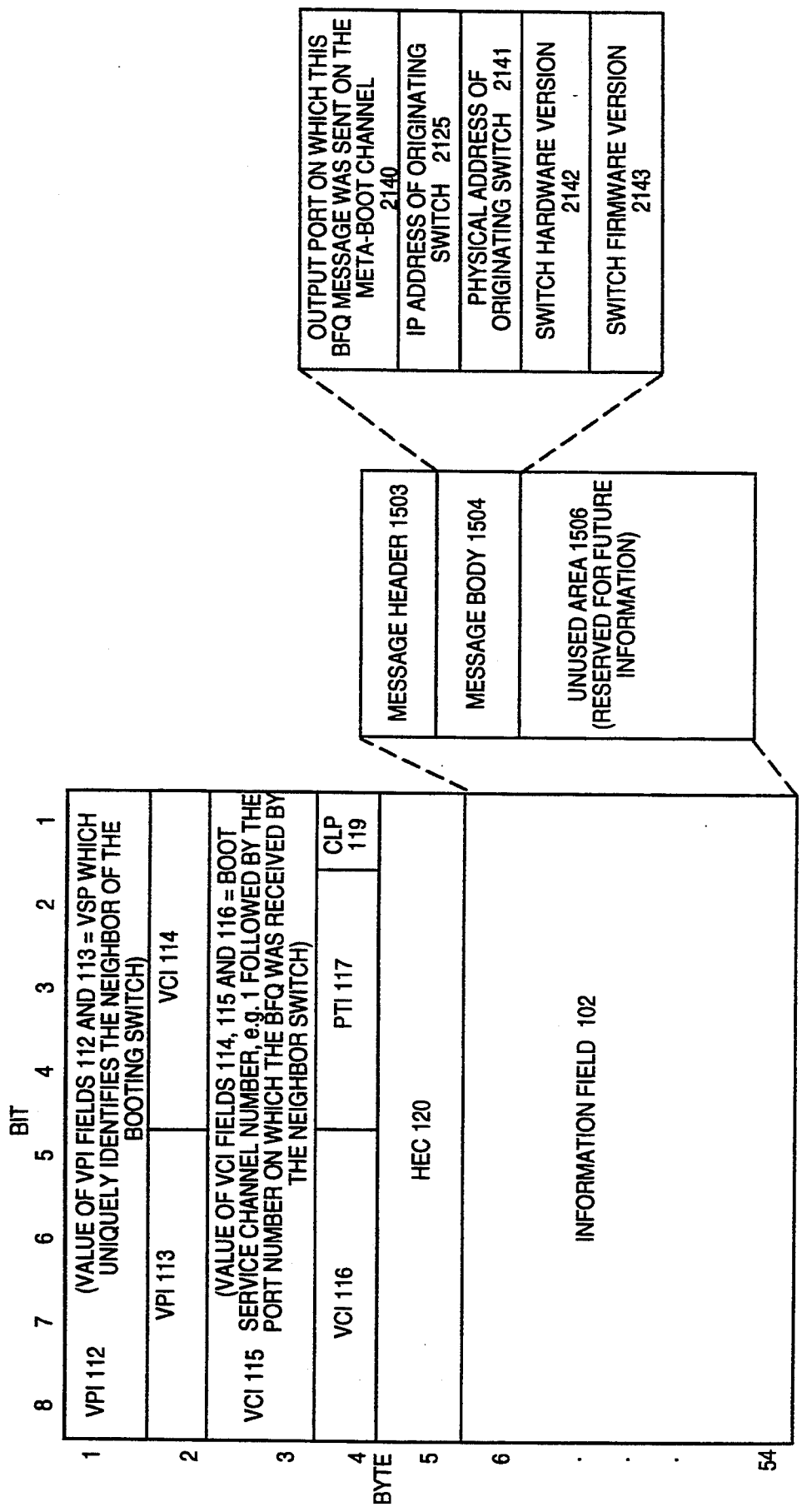
Figure 21I:
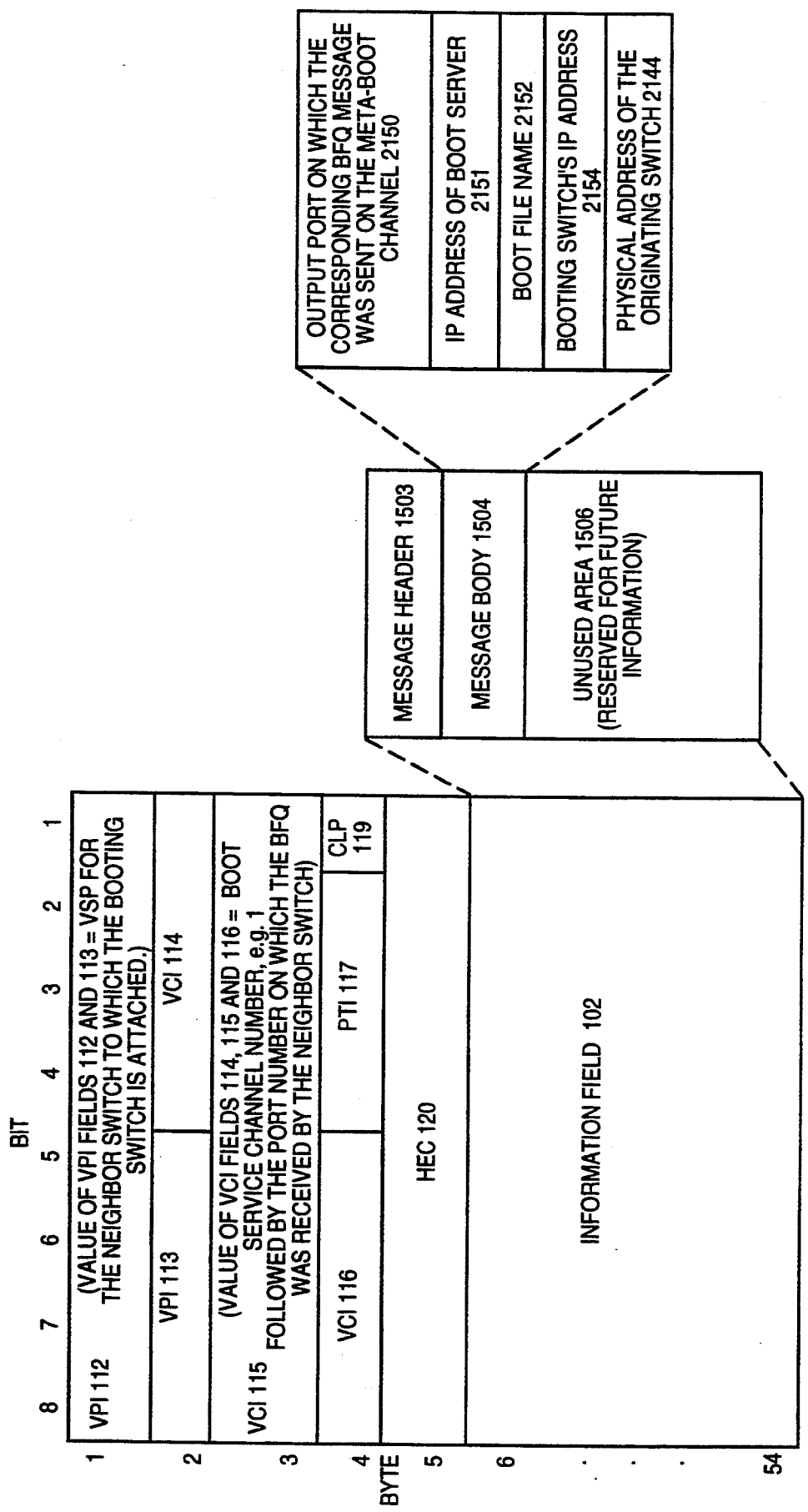
Figure 21J:
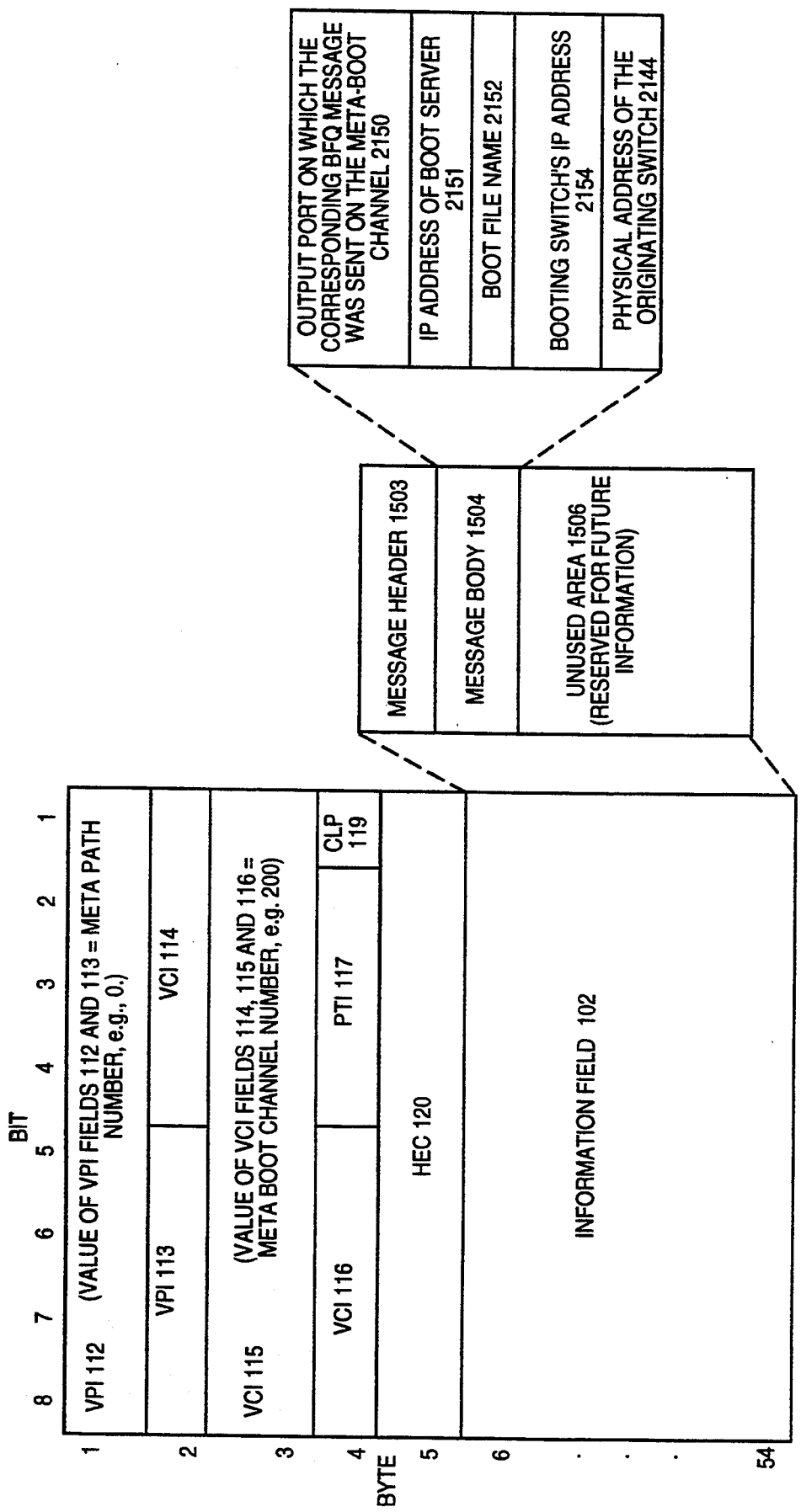
Figure 21K:
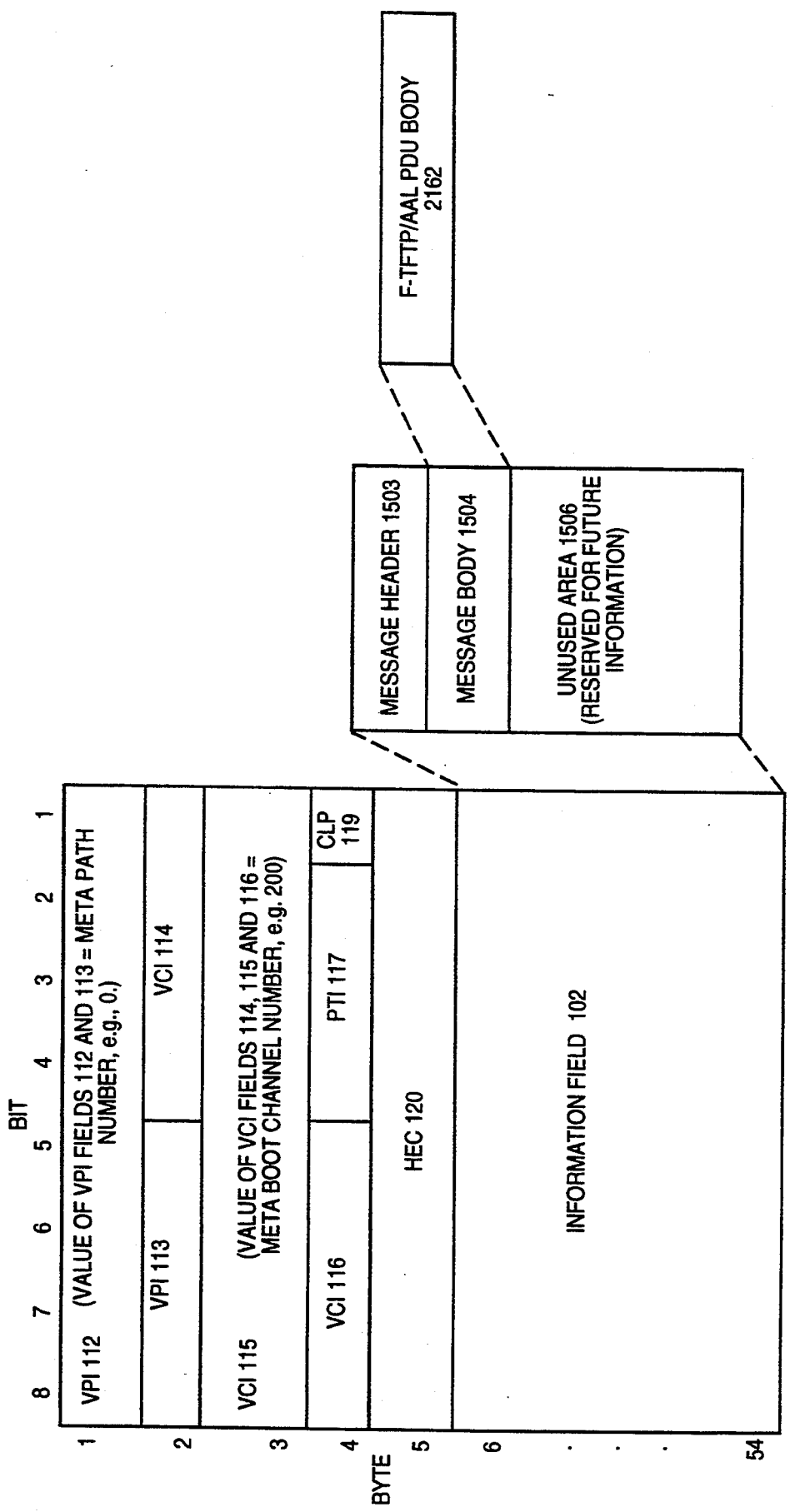

Next, the switch initiates transfer of the boot file by transmitting a fragmented TFTP request message (also referred to as a F-TFTP request message—see format given by FIG. 21(k)) on the meta-boot channel of its selected output port, block 2006. The F-TFTP request message is received by the CMS and the CMS initiates a TFFP file transfer session with the boot server to transfer the boot file. This is more fully illustrated by FIGS. 25 and 26 and will be discussed in greater detail below.

FIG. 23(b) is useful for illustrating transmission of boot code in a network. As illustrated, the booting switch, switch X 2301, has chosen to boot over its meta-boot channel 2333 with switch T 2303. Thus, VSP 2323 is utilized for transmission of the boot code. Once the software code file is successfully downloaded, the switch controller transfers program control to the downloaded code. At this point, the switch repeats the path discovery process (i.e., transmission of PAQ/PAR messages) and initiates switch registration and VSP establishment handshake protocols with the CMS.

Finally, a VSP is established between the booting switch and the CMS by the CMS providing updates to each of the intermediate switches to update their switch fabrics in order to provide for the VSP, block 2007.

B. Message Formats Used in the Bootstrapping Process

The use of various message formats in the bootstrapping process has just been discussed above in connection with the discussion of the overall flow of the bootstrapping process given by FIG. 20.

The message formats generally follow the format which was discussed above in connection with FIG. 15(a). FIG. 21(a) provides the format for a path access query (PAQ) message as it is transmitted from the booting switch out of its various output ports. As can be seen, this message includes in the VPI field 112, 113 the meta path number (e.g, 0 in the described embodiment) and in the VCI field 114, 115, 116 the meta topology channel number (e.g. 220 in the described embodiment). The message header area 1503 is of the format given in FIG. 15(a) and in the message type field 1512 the message type is identified as being a PAQ message. The message body is in the format given in FIG. 21(a) and includes identification of the output port on which the PAQ message is sent (field 2122) and the IP address of the booting switch (field 2125). As has been discussed, PAQ messages are transmitted by the booting switch on each of the booting switch's ports therefore, identification in field 2122 is important to allow later identification of the port on which the particular message originated. It is also noted that when transmitted messages over an Ethernet interface, such as interface 203, this field identifies the Ethernet interface address (in the described embodiment port number 0xFF is used for the Ethernet interface).

FIG. 21(b) illustrates the format of the PAQ message as it is forwarded on the VPI of a neighbor switch. As can be seen, the VPI field 112, 113 is changed by the neighbor switch's switch fabric to indicate the neighbor switch 's VPI and the VCI field 114, 115, 116 is changed, again by the neighbor's switch fabric to indicate the topology service channel (e.g., 2 in the described embodiment) and the port of the neighbor switch on which the PAQ was received. Otherwise, the message, and particularly the information field 102, remains unchanged. Thus, the PAQ message is switched through the neighbor switch without any requirement for intervention by the neighbor switch's controller.

FIG. 21(c) illustrates the format of the PAQ message as it is received by the CMS. During transmission from the neighbor switch to intermediate nodes and onto the CMS, the PAQ's information field is not modified and the only modifications are made in the PAQ's header, by the various intermediate switch's switch fabrics, to switch the PAQ along the neighbor's VSP until the PAQ arrives at the master switch where the VPI 112, 113 is set, by the master's switch fabric to a value which uniquely identifies the neighbor of the booting switch.

When the CMS receives the PAQ, as was discussed in connection with FIG. 20, the CMS determines the cost factor for the route over which the PAQ was transmitted. The CMS then formats a path access response (PAR) message which identifies the output port on which the corresponding PAQ message was sent by the booting switch (field 2123) and the cost factor. The output port is the same port identified in field 2122. The VPI field 112, 113 is set to the VSP of the neighbor switch and the VCI field is set to indicate the topology service channel followed by the port number on which the PAQ message was received by the neighboring switch.

FIG. 21(e) illustrates the PAR message as received by the booting switch. As can be seen, as the PAR message is transmitted from the CMS through intermediate switches to the neighbor switch and onto the booting switch, the information field 102 is unchanged and, as a result, no intervention is required by the various intermediate switch controllers. When the PAR message is received by the neighbor switch, the neighbor's switch fabric translates the VPI field 112, 113 to specify the meta path number (e.g., 0) and translates the VCI field 114, 115, 116 to specify the meta topology channel number (e.g., 220).

It is now appropriate to turn to a discussion of boot channel messages. FIG. 15(a) illustrates the general format for boot channel messages as transmitted by the booting switch with the message field being set to a value indicating the appropriate type of message (i.e., boot file query (BFQ) or boot file response (BFR)).

FIG. 21(f) illustrates the format of a BFQ message as transmitted from the booting switch. As was discussed above, the BFQ message is transmitted on one port of the booting switch, which port is selected by the booting switch. The selection may be based on, among other factors, the cost factor information provided by the PAR messages. As can be seen, the VPI field 112, 113 of the BFQ message as transmitted from the booting switch is set to the meta path number (e.g., 0) and the VCI field 114,115,116 is set to the meta boot channel number (e.g., 200). The message body includes 5 fields: (1) identification of the output port on which the BFQ message was sent by the booting switch, field 2140; (2) the IP address of the booting switch, field 2125; (3) the physical address of the booting switch, field 2141; (4) the booting switch hardware version, field 2142; and (5)

the booting switch firmware version, field 2143. The CMS will use the information regarding the physical address, hardware version and firmware version to determine the correct boot download file for use by the booting switch. It is noted that if the switch controller does not have its IP address, it will set field 2125 to zero indicating to the CMS that it needs its IP address.

FIG. 21(g) illustrates the format of the BFQ message as it is transmitted by the neighbor switch over the neighbor's VSP. As has been discussed above, the described system offers the advantage that the neighbor switch does not have to utilize any processing capability of its controller in performing the switching and, rather relies on its switch fabric to translate the cell header. The information field 102 remains unchanged. The cell header is changed by changing the VPI field 112, 113 to indicate the VSP of the neighbor switch and by changing the VCI field to indicate the boot service channel followed by the port number on which the BFQ was received by the neighbor switch.

FIG. 21(h) illustrates the format of the BFQ message as it is received by the CMS. As can be seen, the message is unchanged from the format of FIG. 21(g) except for the VPI field 112, 113 being changed as it is transmitted along the neighbor's VSP, from one intermediate switch to the next intermediate switch and finally to the master switch, where the field is translated by the master's switch fabric to indicate a value which uniquely identifies the neighbor switch. Again, in the described system, this value is simply the switch number of the neighbor switch although in other embodiments it may be a different value in which case there would be a requirement for a mapping table or the like at the CMS to allow the CMS to identify the neighbor switch. It is advantageous to not require the mapping table at least in that more efficient processing can be provided because there is not a need to look up a value in the table.

FIG. 21(i) illustrates the format of a BFR message as it is transmitted by the CMS. As discussed above, the BFR message provides the booting switch with information identifying the boot server and boot file selected by the CMS for booting the booting switch. The boot server is identified in field 2151 and the boot file name is provided in field 2152. Field 2150 provides identification of the output port on which the corresponding BFQ message was transmitted by the booting channel. This field is simply echoed by the CMS from field 2140 of the received BFQ message. The BFR message also provides the booting switch's IP address in field 2154 if the booting switch had set field 2125 to zero. The IP address is assigned by the CMS from a configuration file based on the physical address of the booting switch.

The VPI field 112, 113 is set to indicate the VSP of the neighbor switch and the VCI field 114, 115, 116 is set to indicate the boot service channel number followed by the port number on which the corresponding BFQ was transmitted.

FIG. 21(j) illustrates the format of the BFR message as received by the booting switch. Again, the message is largely unchanged during transmission from the CMS except that the VPI field 112, 113 was altered by the switch fabric of the neighbor switch to indicate the meta path number and the VCI field 114, 115, 116 is altered to indicate the meta boot channel number.

FIG. 21(k) is provided to illustrate the general format of messages used in the process of transfer of the boot code from the CMS to the booting switch. In particular, FIG. 21(k) illustrates the format of a message transmitted to the booting switch. The message is transmitted over the neighbor's VSP and to the booting switch using the meta path number in the VPI field 112, 113 and the meta boot channel number in the VCI field 114, 115, 116. The message type is identified in the message header as being a boot file transfer message. As will be better understood with reference to the discussion of the bootcode transfer, below, the bootcode is too large to fit in a single cell, therefore, multiple messages of the format given by FIG. 21(k) are transmitted with the boot code in fragmented segments. The booting switch reassembles the boot code from the multiple messages.

C. Bootcode Transfer from the Boot Server to the Switch Controller

FIG. 25 is useful for providing an overview of a network on which a switch 2501 is being booted. Generally, it can be seen that the booting switch 2501 is booted by communicating with the CMS 2502 over a neighbor switch's VSP in a manner as has been described. The CMS 2502 communicates with the selected boot file server 2503 to obtain the boot file code. The CMS 2502 may communicate with the file server 2503 over any number of communication media, such as over an Ethernet communication media as is done in the described embodiment. Alternatively, the boot code file may reside on the same computer system which is executing the CMS.

In any event, communication of the boot file information between the CMS and the boot server 2503 utilizes 512 byte blocks to transmit the file using the well-known trivial file transfer protocol (TFTP). The CMS receives the 512 byte blocks and uses ATM adaption layer type 5 (AAL5) to fragment the boot file into ATM cells. The ATM cells are then transmitted on the network as has been described and are received by the booting switch where they are reassembled, again in accordance with AAL5.

FIG. 26 is useful for providing a more complete description of the process for transfer of the boot file. The booting switch initially generates a request for transmission of its boot file using the F-TFTP format, block 2601. The CMS receives the request (over the neighbor's VSP as has been described), block 2602, and the CMS formats a TFTP request and forwards the request to the boot server, block 2603. The boot server receives the TFTP request and sets up the TFTP connection, block 2604. The boot server then transmits a block of boot code to the CMS, block 2605. The CMS is responsible for fragmenting the received block and transmitting cells containing information from the received block to the booting switch over the neighbor's VSP, block 2606. The booting switch responds to the CMS with an acknowledgement message when all cells comprising the received block have been receive, block 2607. Again, it is noted that the acknowledgement message is transmitted over the neighbor's VSP. The CMS receives the acknowledgement message and reassembles the acknowledgement message for transmission to the boot server. The acknowledgement message is then sent to boot server, block 2608. The process of segmentation of blocks by the CMS and reeassembly of the blocks by the booting switch (and visa versa) follows the fragmented TFFP (F-TFTP) protocol. If there are more blocks of boot code to be transmitted, block 2609, the process of the boot server transmitting a block and the information in the block being transmitted using F-TFTP protocol is repeated.

Importantly, because the booting switch is the ultimate destination of the boot file, the described system provides for the booting switch to formulate acknowledgement messages which are then reassembled by the CMS and forwarded to the boot server. In this way, communication is effectively controlled using the TFTP/F-TFTP protocols by the the boot server, the CMS and the booting switch.

D. Concurrent Booting of Switches

It is pointed out that, as one important advantage of the described system, the described system allows for multiple nodes to be booted simultaneously. This offers significant advantages in the time required to provide network functionality in situations such as where the network is rebooted after a general power failure. FIG. 24 is useful for illustrating this feature of the described system.

FIG. 24 illustrates a network having a master switch 2407 and two other switches which have been booted (switch T 2403 and switch Z 2404). Each of these switches have been booted utilizing the process which has been described above. In addition, the network comprises switch X 2401 and switch Y 2402, both of which are illustrated as currently booting. In fact, as illustrated, both switches are booting over the VSP 2323 of switch T 2403 through their respective meta-boot channels 2433 and 2434. It will be now appreciated that the process of booting these two switches may occur simultaneously over VSP 2323.

VII. ALTERNATIVES TO THE DESCRIBED SYSTEM

There are, of course, various alternatives to the described system which are considered to be within the scope of the present invention. For example, the central management supervisor may be configured as a process running within the switch controller of one of the various ATM switches thus avoiding the need for a communications link such as interface 203 and the need for a separate hardware device.

Alternatively, as has been described, the supervisor may be coupled through one of I/O ports 305,306 to a switch, rather than through a separately provided Ethernet link.

In addition, it is possible to implement a network having multiple service providers (or supervisors-)—perhaps one service provider for each service. In such a network, the virtual service path may be implemented as a multicast connection between the service consumer (i.e., the switch) and the various service providers.

There are, of course, other alternatives to the described system which are within the reach of one of ordinary skill in the relevant art. The present invention is intended to be limited only by the claims presented below.

Thus, what has been disclosed is a method and apparatus which provides for multiplexing of communication services over a virtual path in an ATM network or the like.

What is claimed is:

1. A network of devices, said network comprising:
   (a) a communication medium for allowing communication between devices in said network;
   (b) a first device providing a first class of services coupled with said communication medium;
   (c) a second device providing for said first class of service coupled with said communication medium;
   (d) a third device coupled with said communication medium, said third device requiring services from a device offering said first class of services; and
   (e) registration means registering devices of said first class; and
   (f) control means for receiving communications from said third device requesting establishment of a communication path with a device of said first class and for controlling selection of a registered one of said devices of said first class to set up a communication path with.

2. The network as recited by claim 1 wherein said network is an ATM network.

3. The network as recited by claim 1 wherein said registration means comprises a hunt group table.

4. The network as recited by claim 1 wherein said first device registers with registration means over a virtual service path.

5. The network as recited by claim 4 wherein said registration means communicates registration acknowledgements with said first device over said virtual service path.

6. A method of allowing registration in a hunt group in a network of devices, said method comprising the steps of:
   (a) a first device communicating to a hunt group manager a first request to join a group of devices offering a first class of services;
   (b) said hunt manager receiving said first request and storing information identifying said first device's membership in said group of devices offering said first class of services for later lookup;
   (c) said hunt group manager communicating a first confirmation message to said first device confirming said first device's registration in said group offering said first class of services;
   (d) a second device communicating to said hunt group manager a second request to join said group of said devices offering said first class of services;
   (e) said hunt group manager receiving said second request and storing information identifying said second device's membership in said group of devices offering said first class of services for later lookup; and
   (f) said hunt group manager communicating a second confirmation message to said second device confirming said second device's registration in said group of devices offering first class of services.

7. The method as recited by claim 6 wherein said first device is coupled with said hunt group manager through at least a first switch and said first request being received by said first switch and transmitted on first virtual service path to said hunt group manager.

8. The method as recited by claim 7 wherein said first configuration message is transmitted to said first device through said first switch on said first virtual service path.

9. The method as recited by claim 6 wherein said network is an ATM network.

10. The method as recited by claim 6 wherein said first class of services are services of printers.

11. A method of establishing a communication path in a network, said network comprising a first device for communicating messages and a group of comprising at least a second device and a third device, said second device and said third device offering the same general class of services, said network further comprising a hunt group manager for managing communication in said network, said first device, second device, third device and hunt group manager coupled in communication over communication medium, said method comprising the steps of:
(a) said second device registering with said hunt group manager to provide said class of services;
(b) said third device registering with said hunt group manager to provide said class of services;
(c) said first device communicating a request to said hunt group manager to establish a communication path between said first device and said second device;
(d) said hunt group manager determining said second device is unavailable and said hunt group manager establishing a communication between said first device and said third device responsive to said request.

12. The method as recited by claim 11 wherein said network is an ATM network.

13. The method as recited by claim 12 wherein said second device registers with said hunt group manager by communicating a hunt group request over a virtual service path and said hunt group manager acknowledges said hunt group request over said virtual service path.

14. A method of establishing a communication path in a network, said network comprising a first device for communicating messages and a group of comprising at least a second device and a third device, said second device and said third device providing the same general class of services, said network further comprising a hunt group manager for managing communication in said network, said first device, second device, third device and hunt group manager coupled in communication over communication medium, said method comprising the steps of:
(a) said second device registering with said hunt group manager as a member of a group of devices offering said class of services;
(b) said third device registering with said hunt group manager as a member of said group of devices offering said class of services;
(c) said first device communicating a request to said hunt group manager to establish a communication path between said first device and a device offering said class of services;
(d) said hunt group manager selecting which of said second or third device to allow said first device to communicate with and said hunt group manager establishing a communication between said first device and said selected one of said second or third device responsive to said request.

15. The method as recited by claim 14 wherein said network is an ATM network.

16. The method as recited by claim 14 wherein said second device registers with said hunt group manager by communicating a hunt group request over a virtual service path and said hunt group manager acknowledges said hunt group request over said virtual service path.

17. A method of establishing a communication path in a data communications network, said network comprising a first device for communicating messages and a group of devices comprising at least a second device and a third device, said first device, second device and third device coupled in communication over communication medium, said method comprising the steps of:
(a) said second device registering as a member of a first hunt group;
(b) said third device registering as a member of said first hunt group;
(c) said first device requesting establishment of a communication path between said first device and a device in said first hunt group; and
(d) establishing a communication path between said first device and said second device responsive to said request.

18. The method as recited by claim 17 wherein said first device and said second device register with a hunt group manager as members of said first hunt group.

19. The method as recited by claim 17 wherein said first device further registers as a member of a second hunt group.

20. The method as recited by claim 17 wherein said communication network is a centrally managed network.

21. The method as recited by claim 17 wherein said communication network is an ATM network.

* * * * *